United States Patent [19]

Holmes, Jr.

[11] 4,172,632

[45] Oct. 30, 1979

[54] METHOD AND APPARATUS PRODUCING THREE-DIMENSIONAL SHADOW IMAGES

[76] Inventor: Lawrence Holmes, Jr., 605 Hamburg Turnpike, Apt. 102, Pompton Lakes, N.J. 07442

[21] Appl. No.: 651,202

[22] Filed: Jan. 21, 1976

[51] Int. Cl.² ............... G02B 27/22; G02B 27/26
[52] U.S. Cl. ............................ 350/132; 353/7; 353/8; 340/27 NA
[58] Field of Search ............ 350/132, 131; 353/7, 353/8

[56] References Cited

U.S. PATENT DOCUMENTS

| | | | |
|---|---|---|---|
| 2,218,875 | 10/1940 | Parsell | 350/132 X |
| 2,883,906 | 4/1959 | Rehorn | 350/131 |
| 3,827,793 | 8/1974 | Dudley | 350/132 X |

FOREIGN PATENT DOCUMENTS 1012679 12/1965 United Kingdom ............... 353/7

OTHER PUBLICATIONS

R. L. Gregory, *Nature*, vol. 203, pp. 1407–1408, "Stereoscopic Shadow Images", 9/26/64.

*Primary Examiner*—Paul A. Sacher
*Attorney, Agent, or Firm*—Phillips, Moore, Weissenberger, Lempio & Majestic

[57] ABSTRACT

Spaced-apart light sources, a screen and means for restricting light from each source to separate eyes of each observer cause perception of a seemingly solid or three-dimensional shadow of an object or objects. The shadow is detached from the object and does not necessarily appear to be in the plane of the screen but may be perceived as floating in space in front of the observers. The seemingly solid shadows of objects including active human performers or even an observer may be caused to appear to be within the context of a previously filmed 3D still or motion picture scene. The system may be used for purposes additional to creating unique entertainment effects. The navigation of aircraft including instrument landing system approaches to airports is greatly facilitated by creating a realistic three-dimensional shadow depiction of an airport landing runway or the like in front of the pilot and by providing mechanisms, responsive to conventional radio and gyro instrument signals, which cause the apparent orientation, location and distance of the depictured airport to change as necessary to conform with the actual disposition of a real airport relative to the real aircraft. Instead of having to mentally translate data from dials, pointers and the like of conventional instrument flight aids, the pilot need only fly the depicted aircraft to the depicted airport using the controls of the real aircraft. At the final stages of landing, the pilot may look up to perceive the real airport in the same spatial relationship to the real aircraft as was the depicted airport to the depicted aircraft. Realistic 3D images of earth surface features, compass headings, localizer course line, glide slope markers and the like may also be presented in the artificial scene to further assist navigation.

15 Claims, 49 Drawing Figures

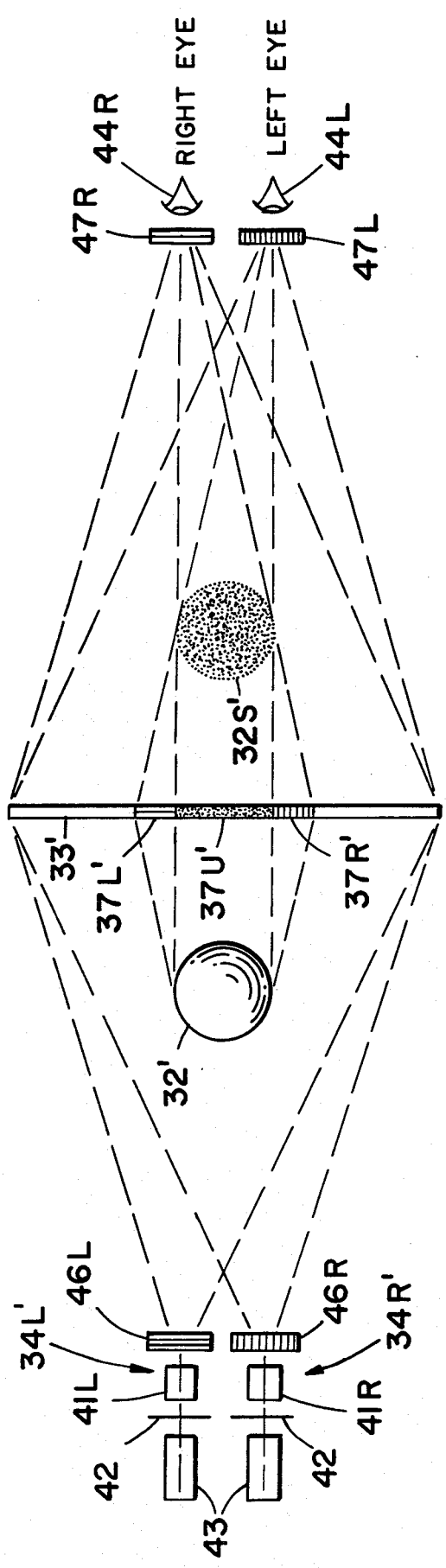
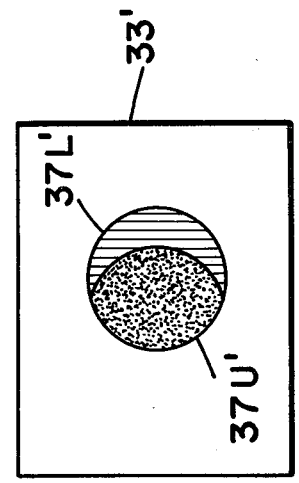
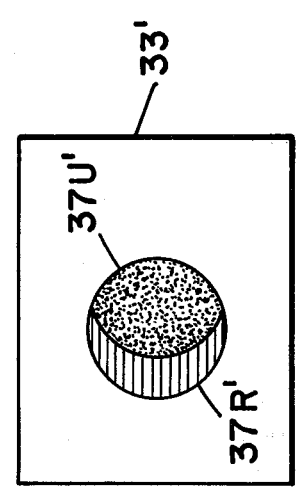
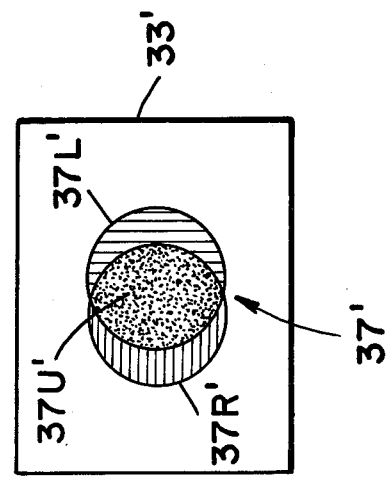
FIG_2
FIG_3A
FIG_3B
FIG_3C

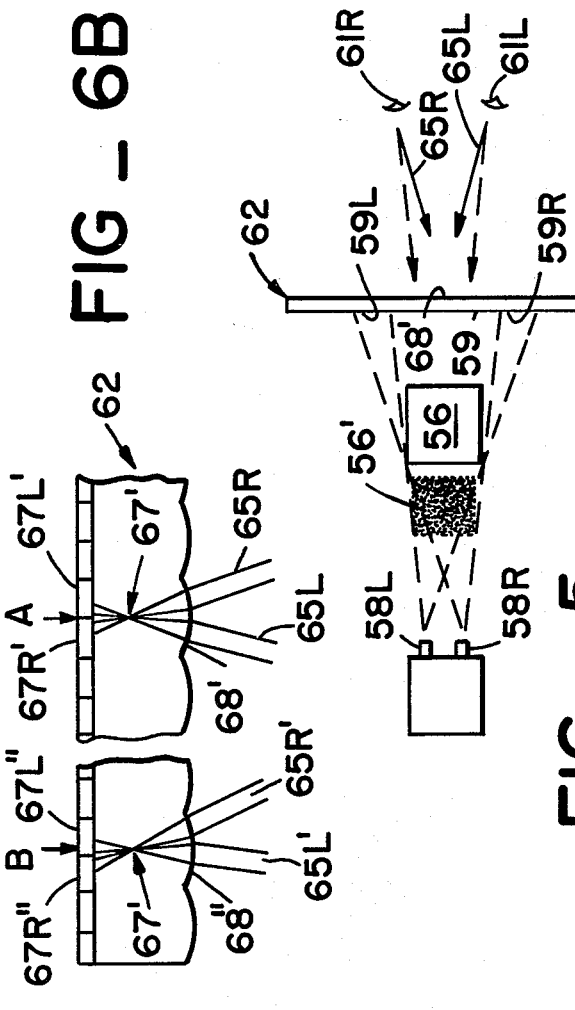
FIG_6A
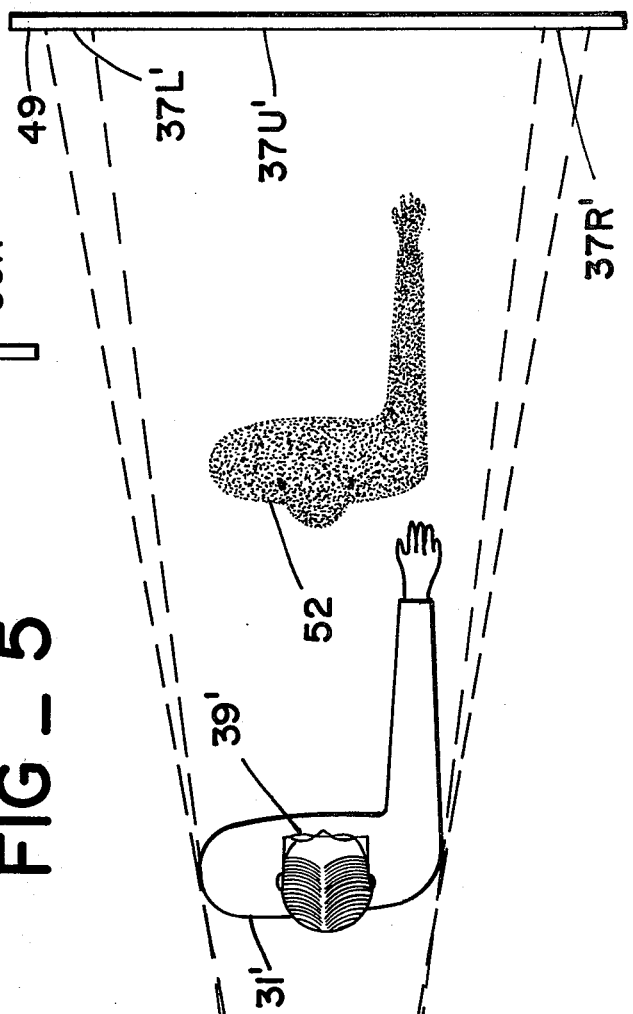
FIG_6B
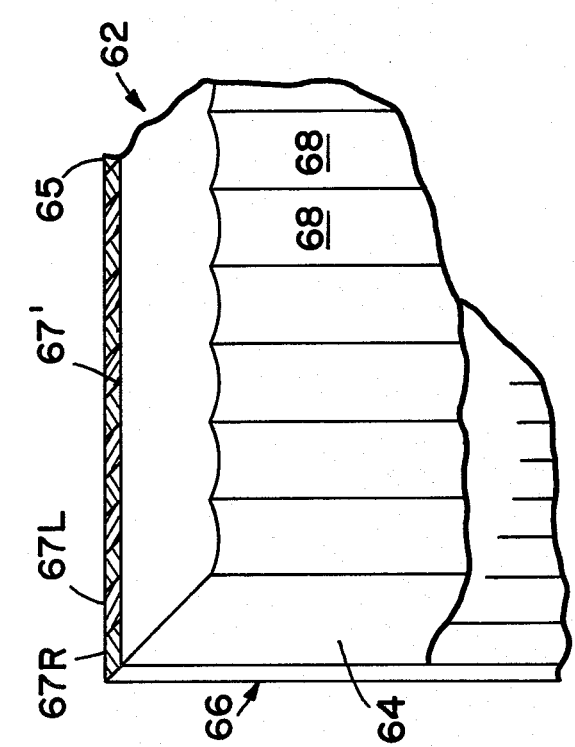
FIG_5
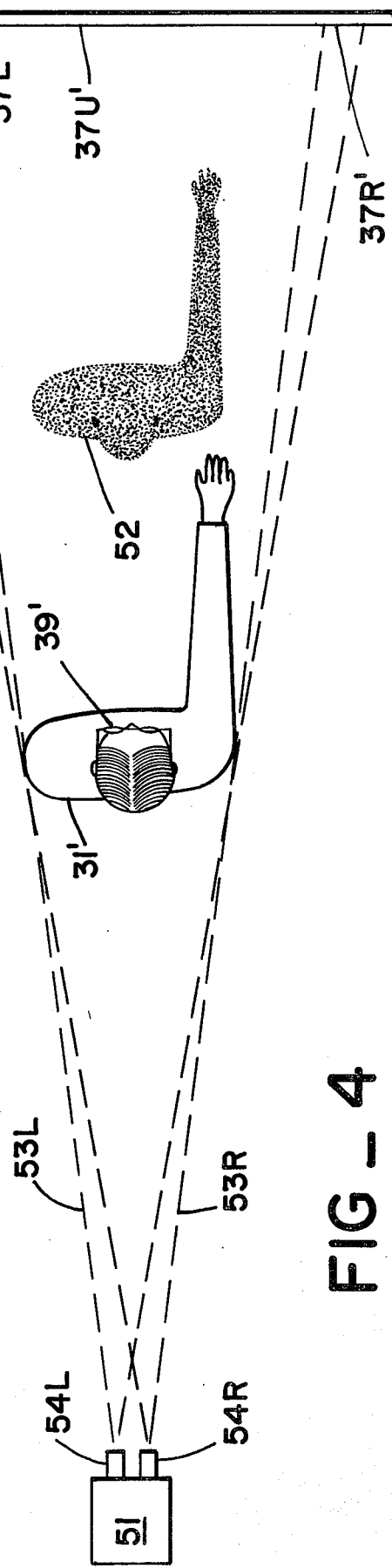
FIG_4

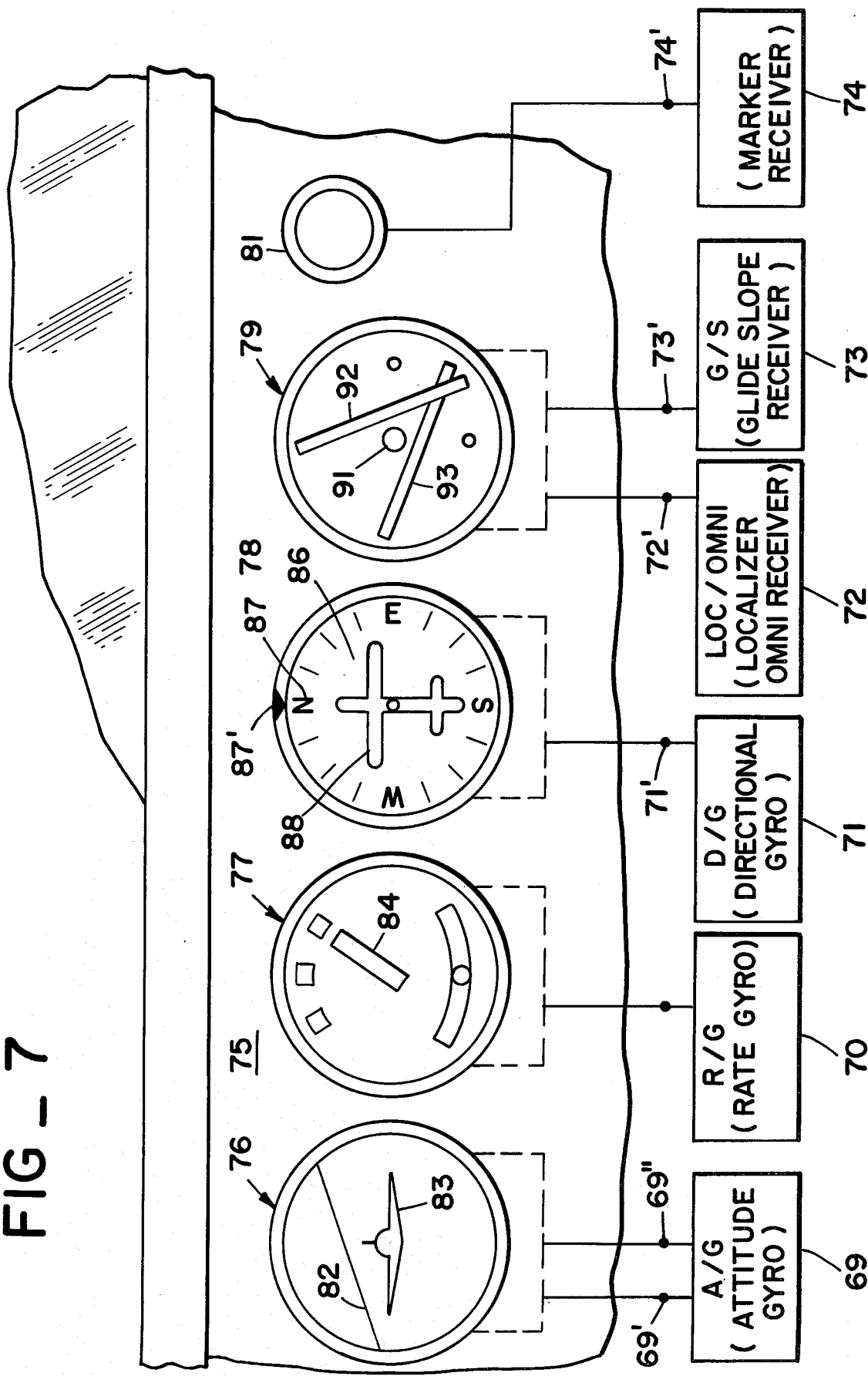

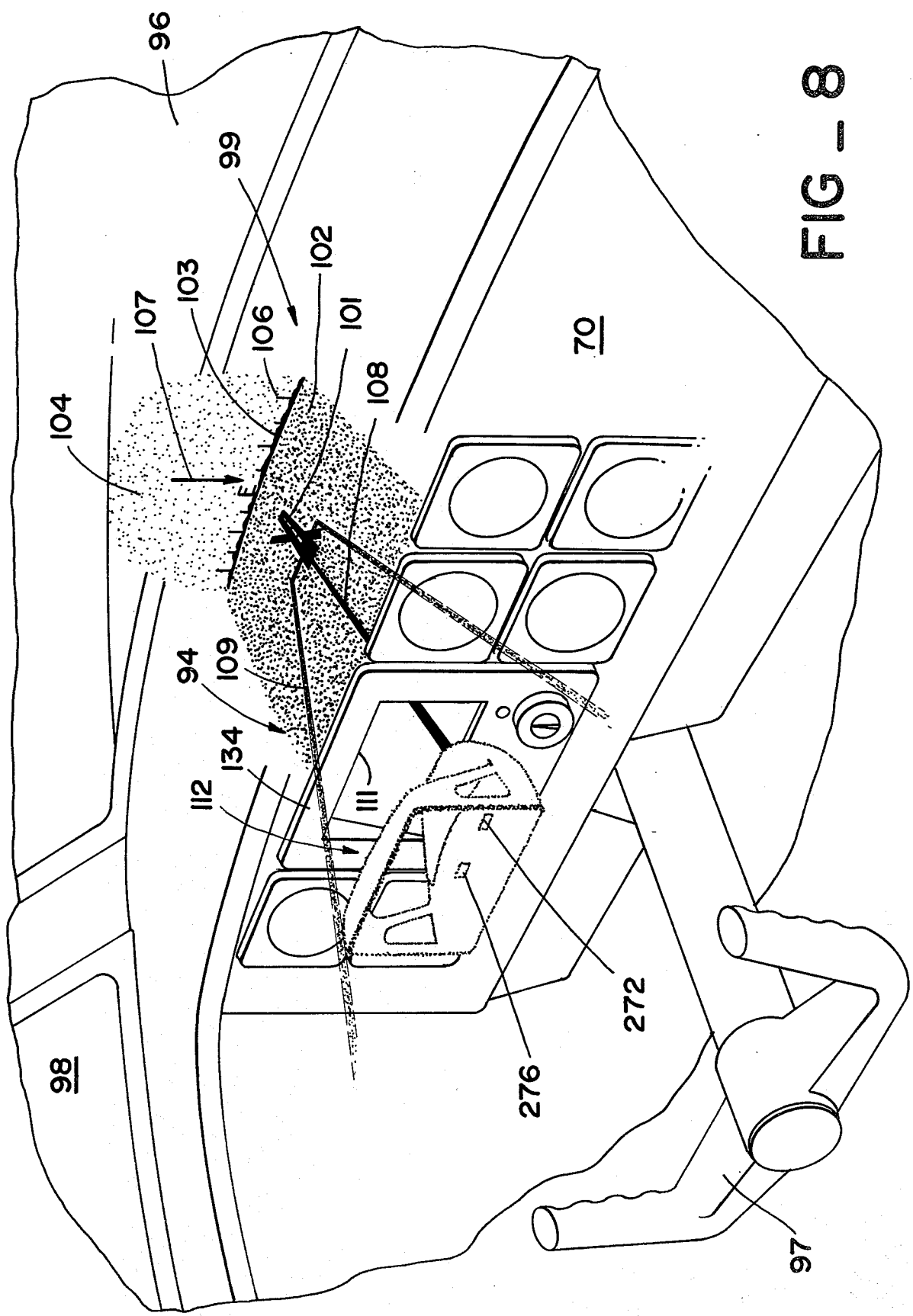

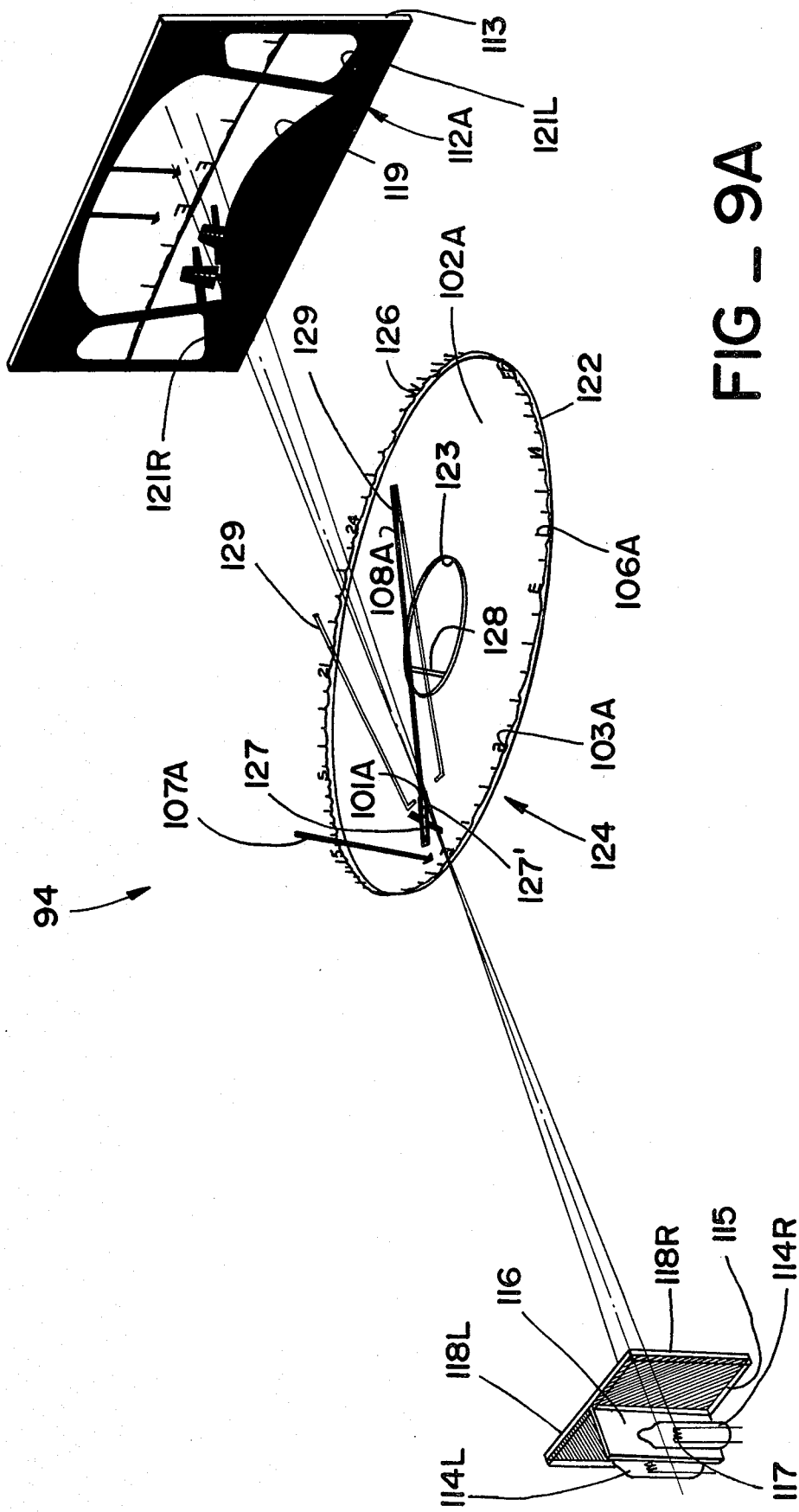
FIG_9A

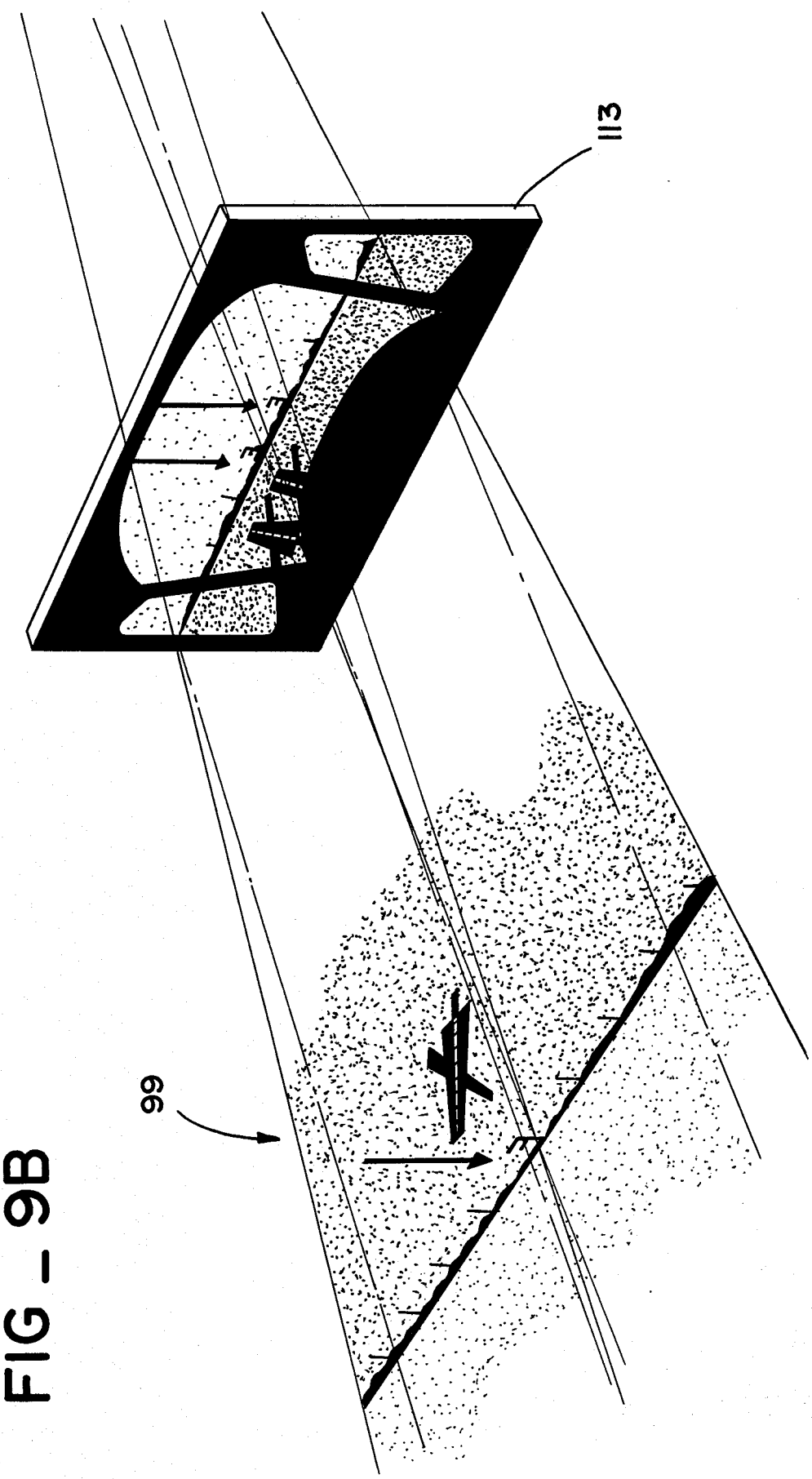

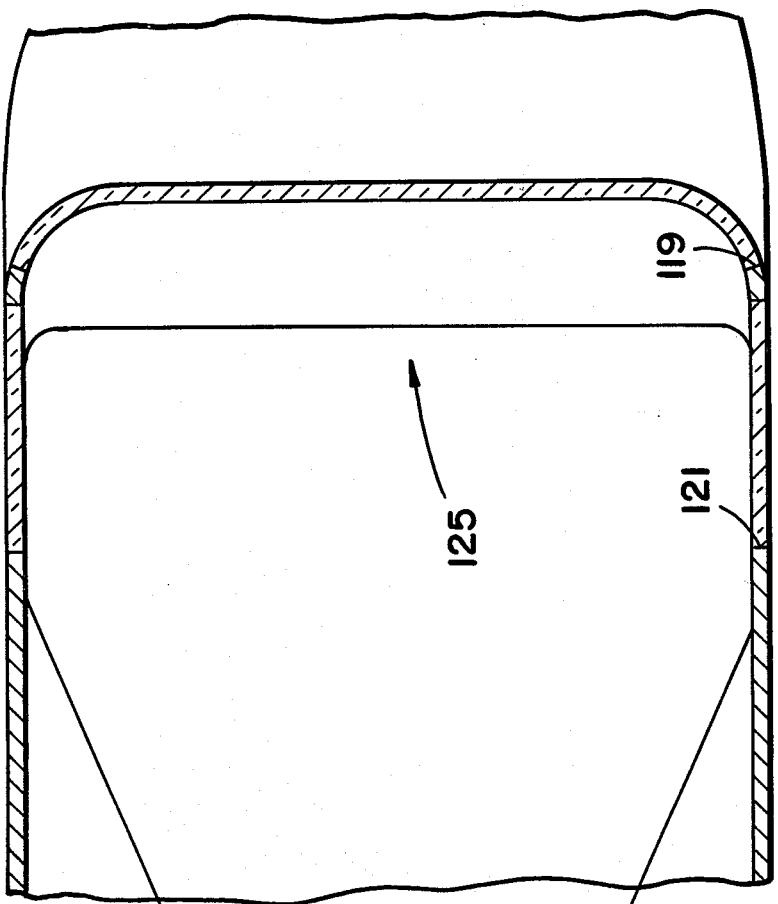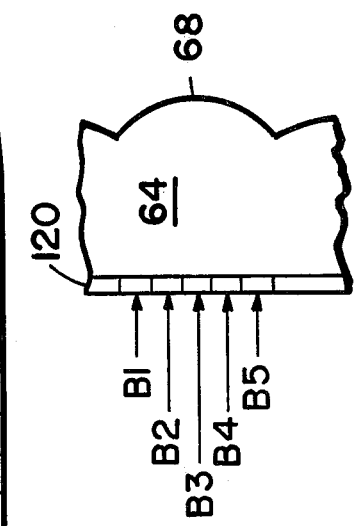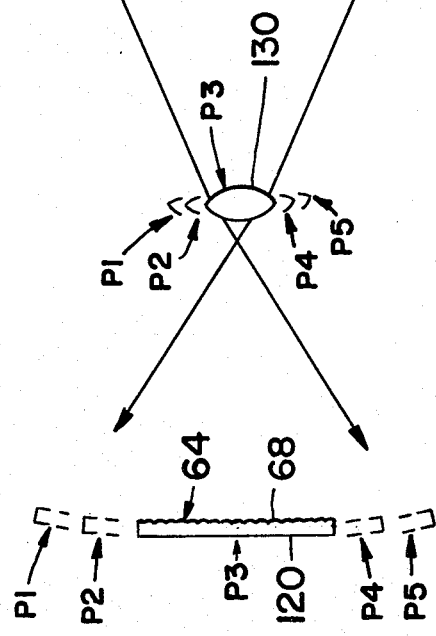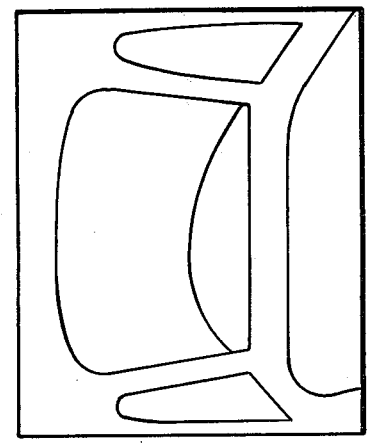
FIG_10A
FIG_10B
FIG_10C
FIG_10D

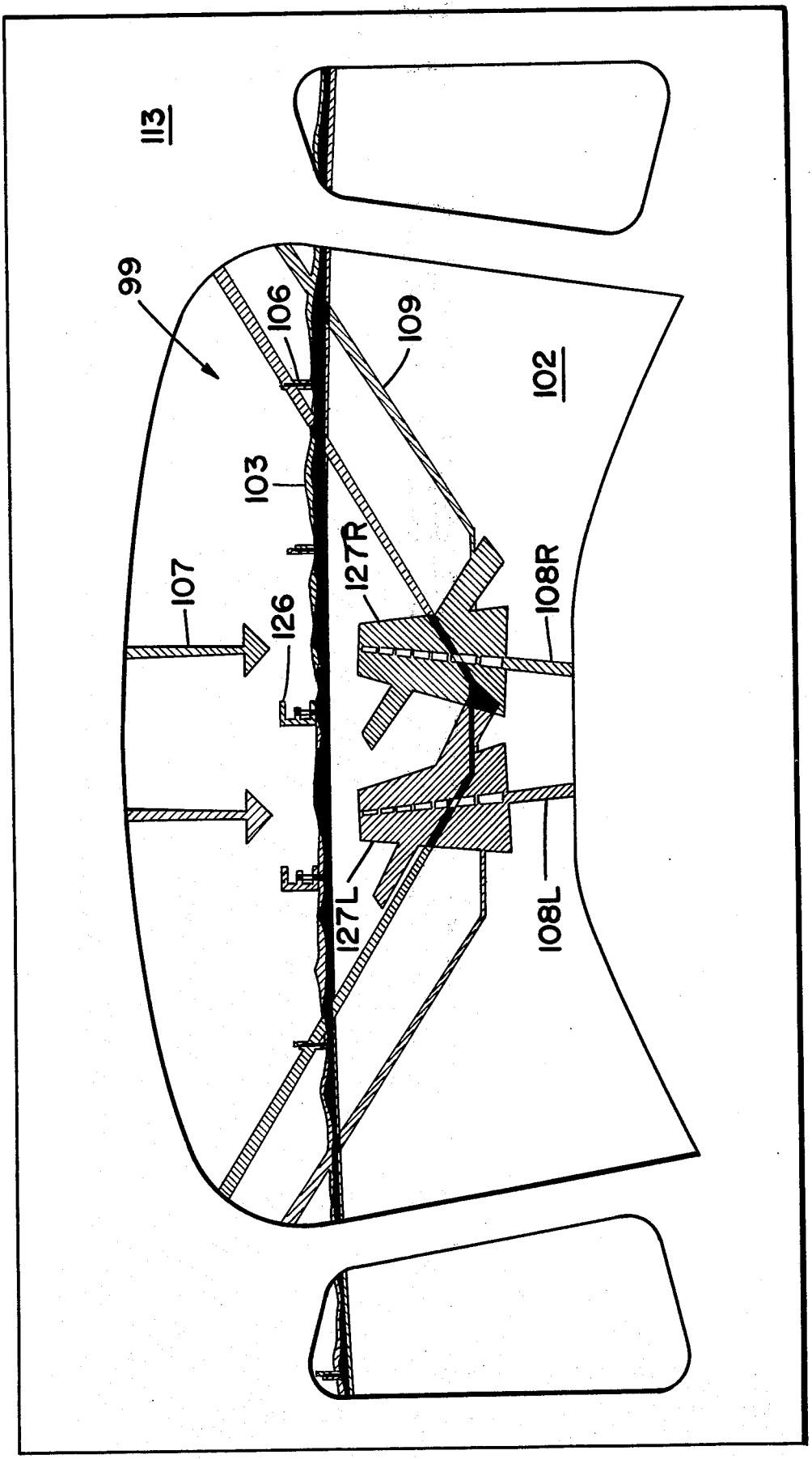
FIG_11A

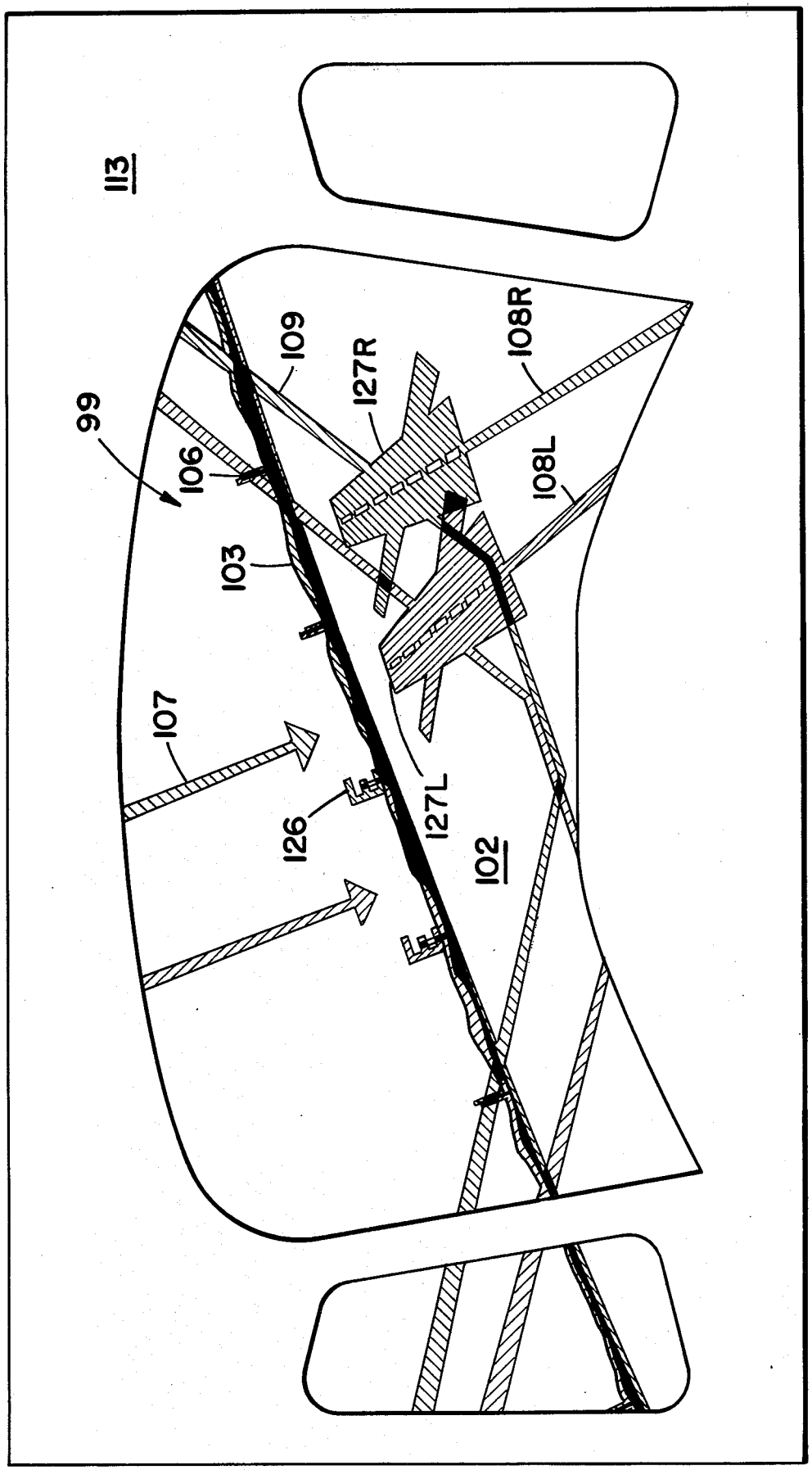
FIG_11B

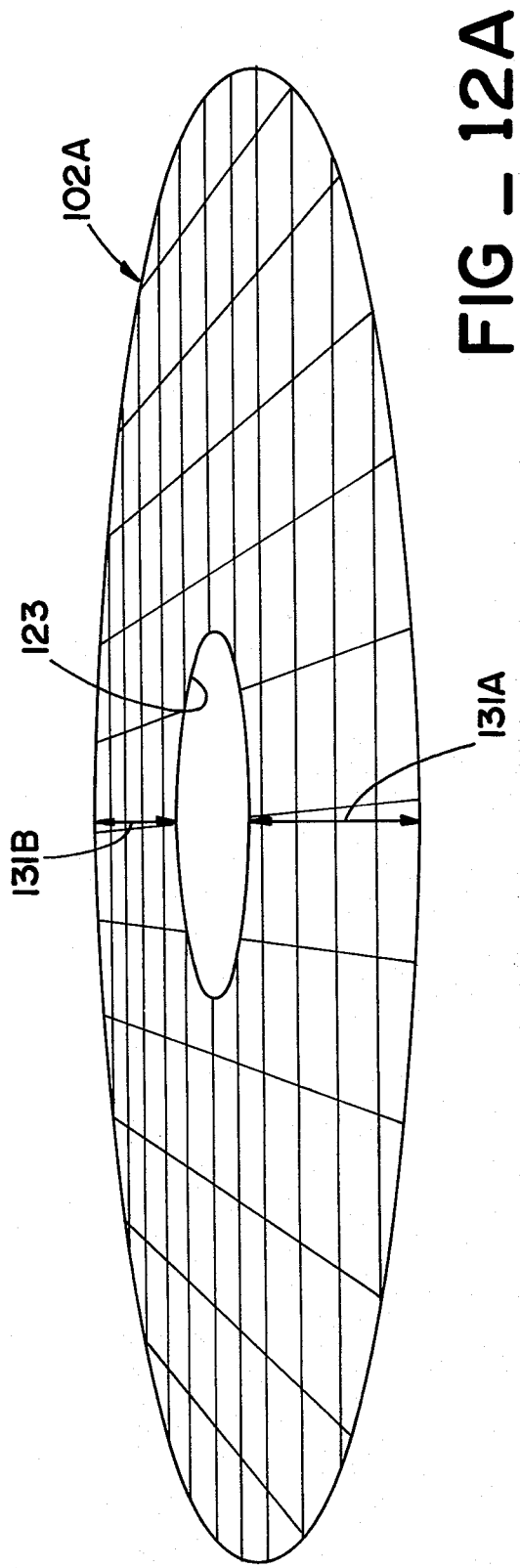
FIG_12A
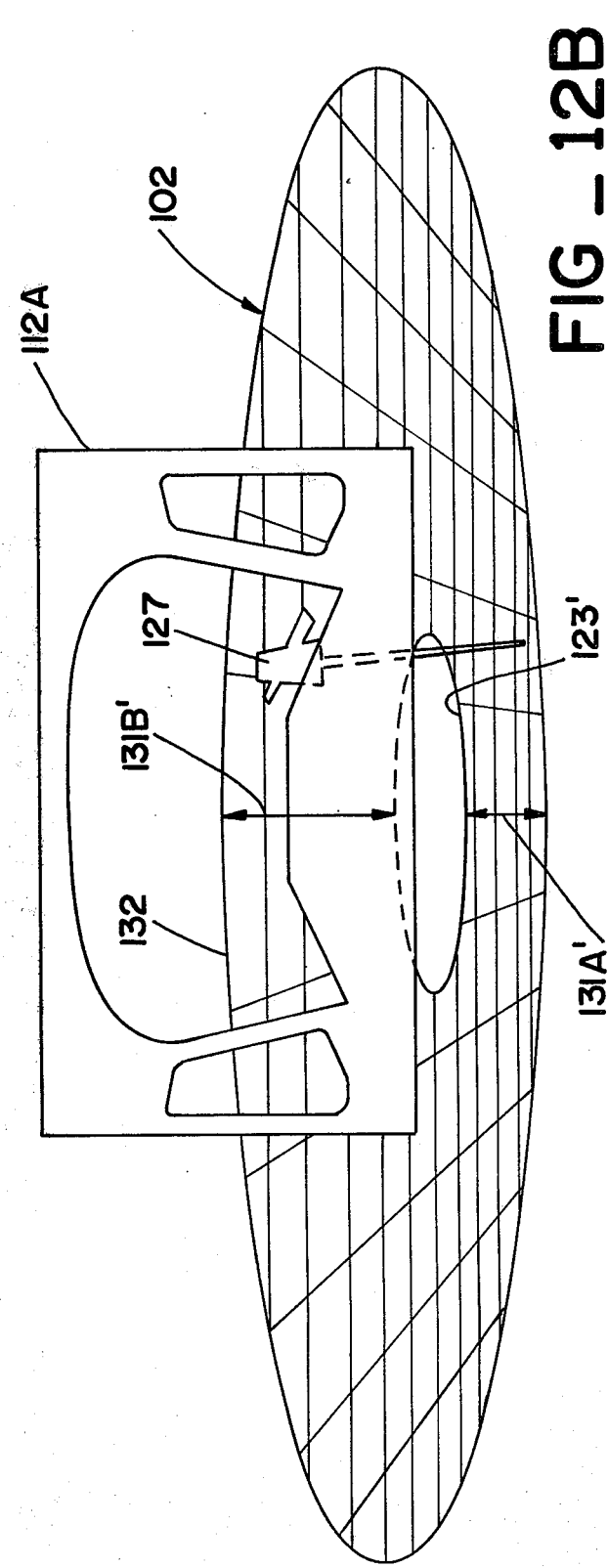
FIG_12B

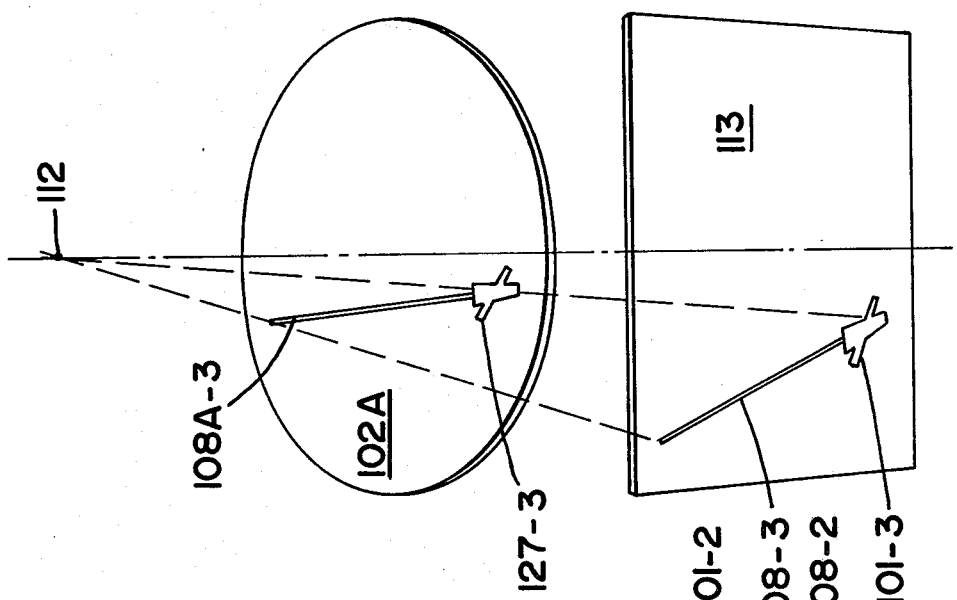
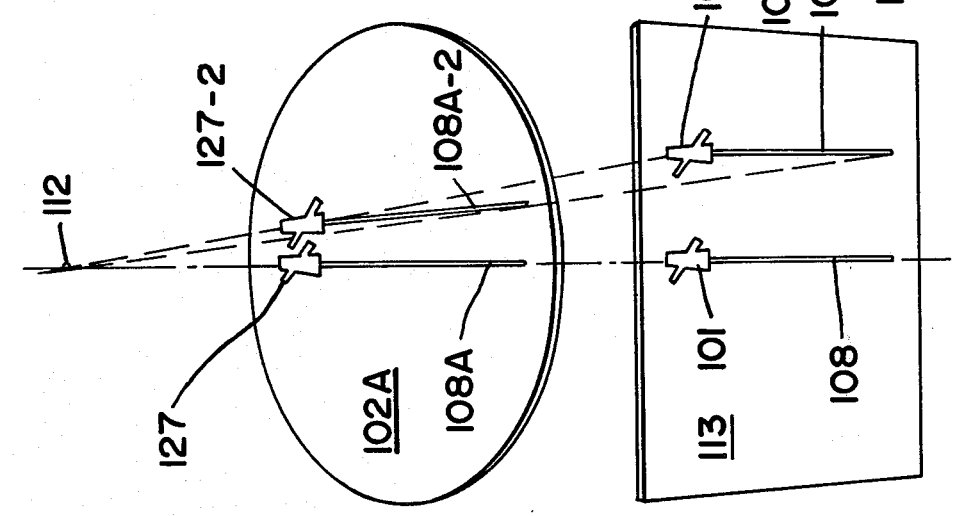
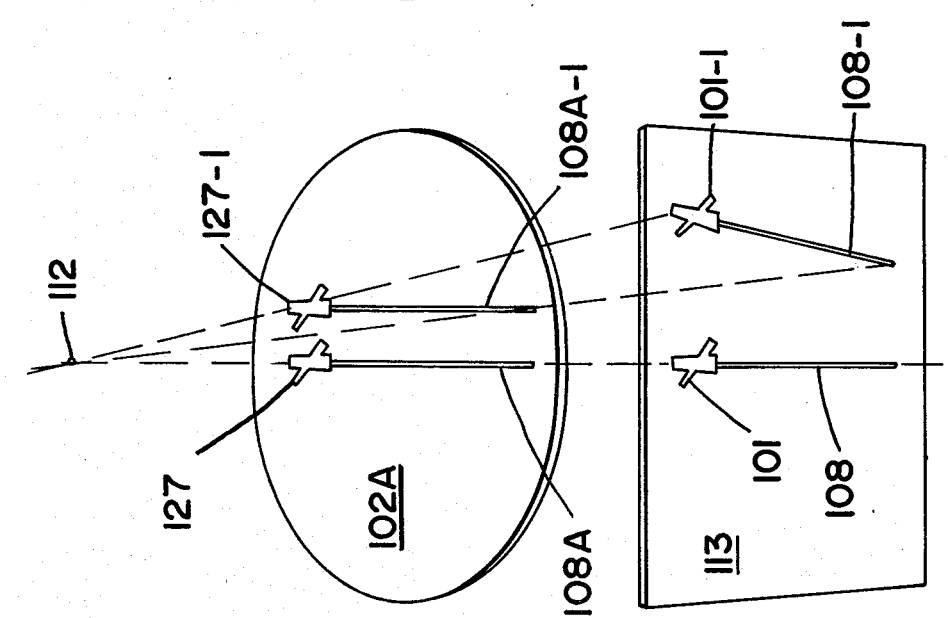
FIG_13A  FIG_13B  FIG_13C

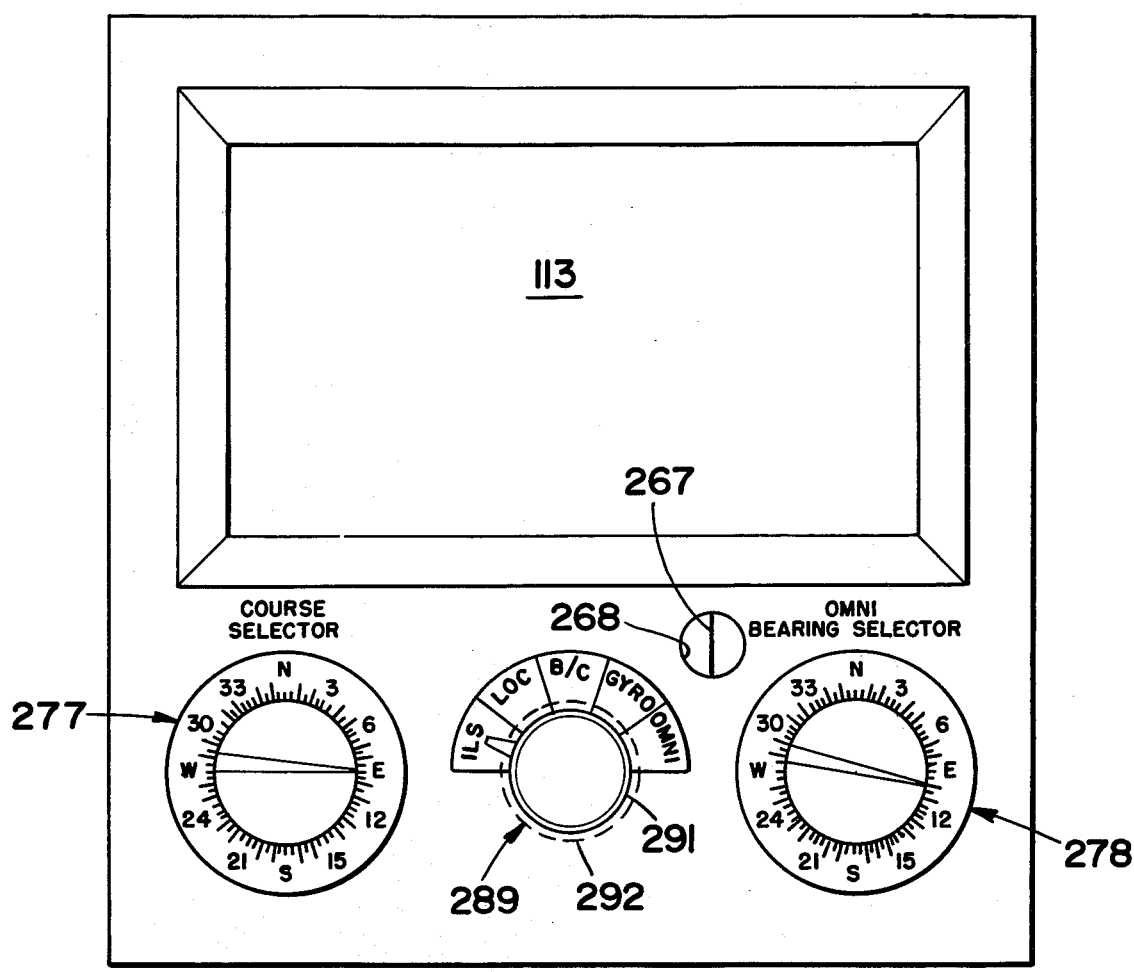
FIG_17

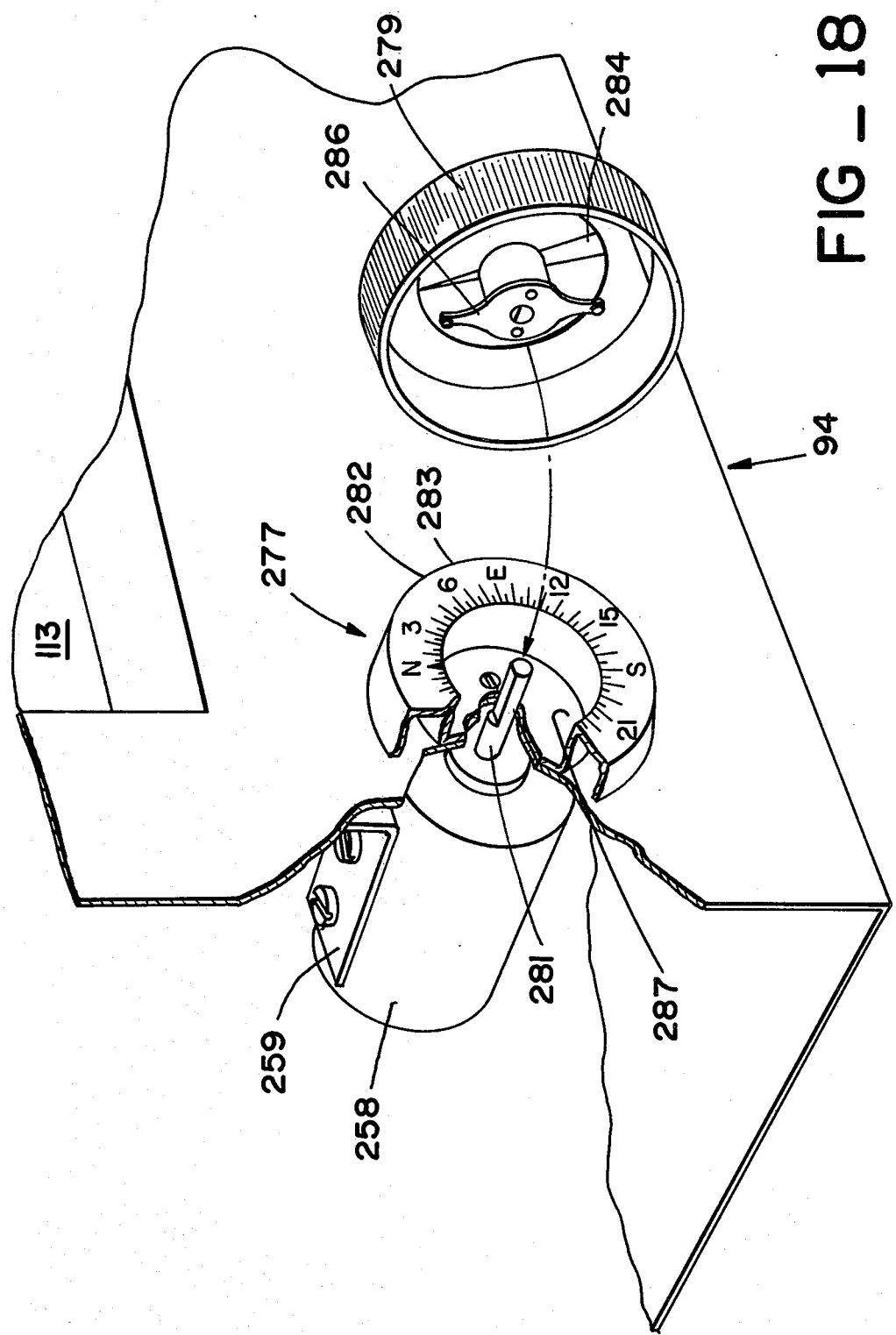

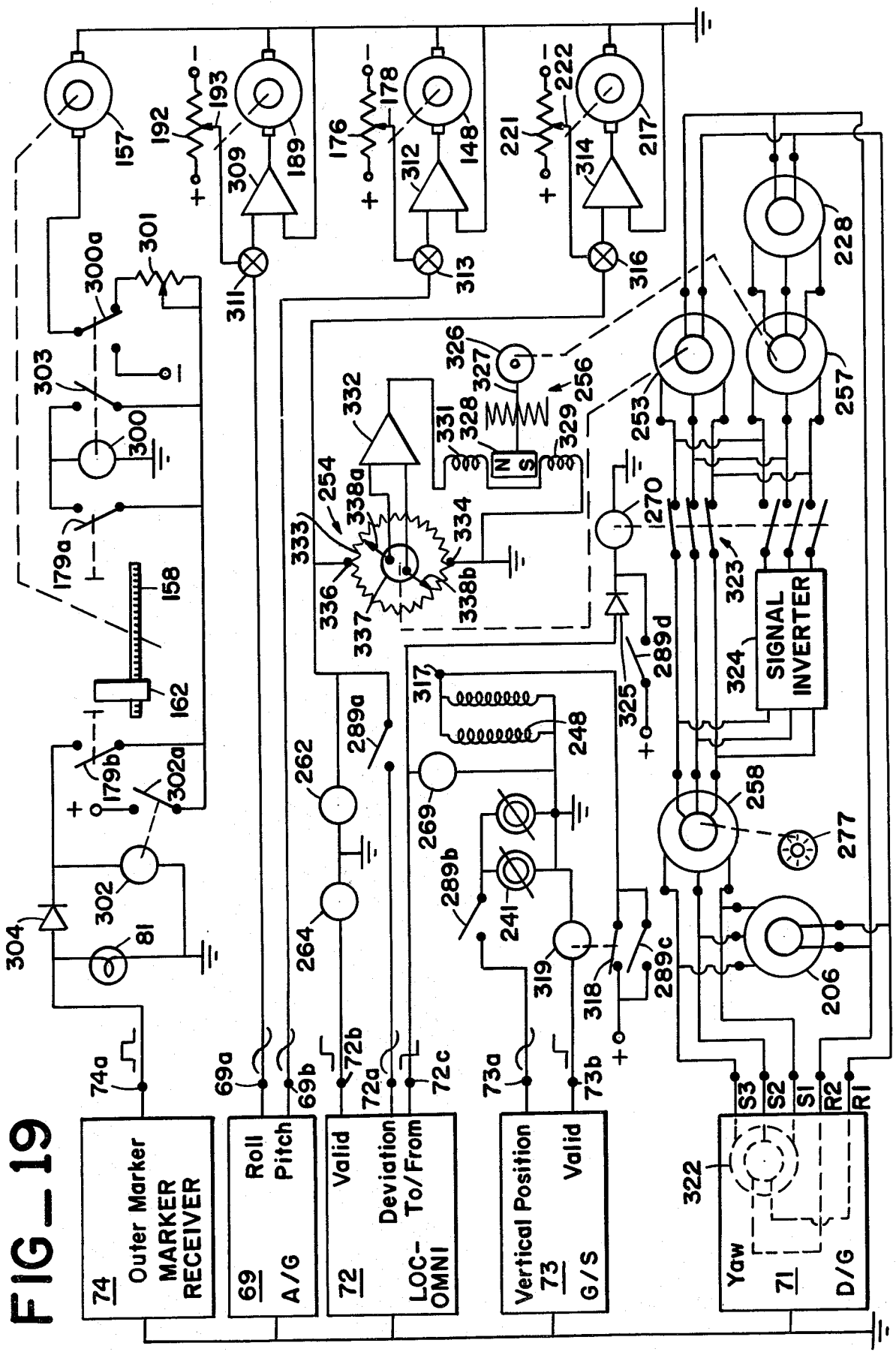
FIG_19

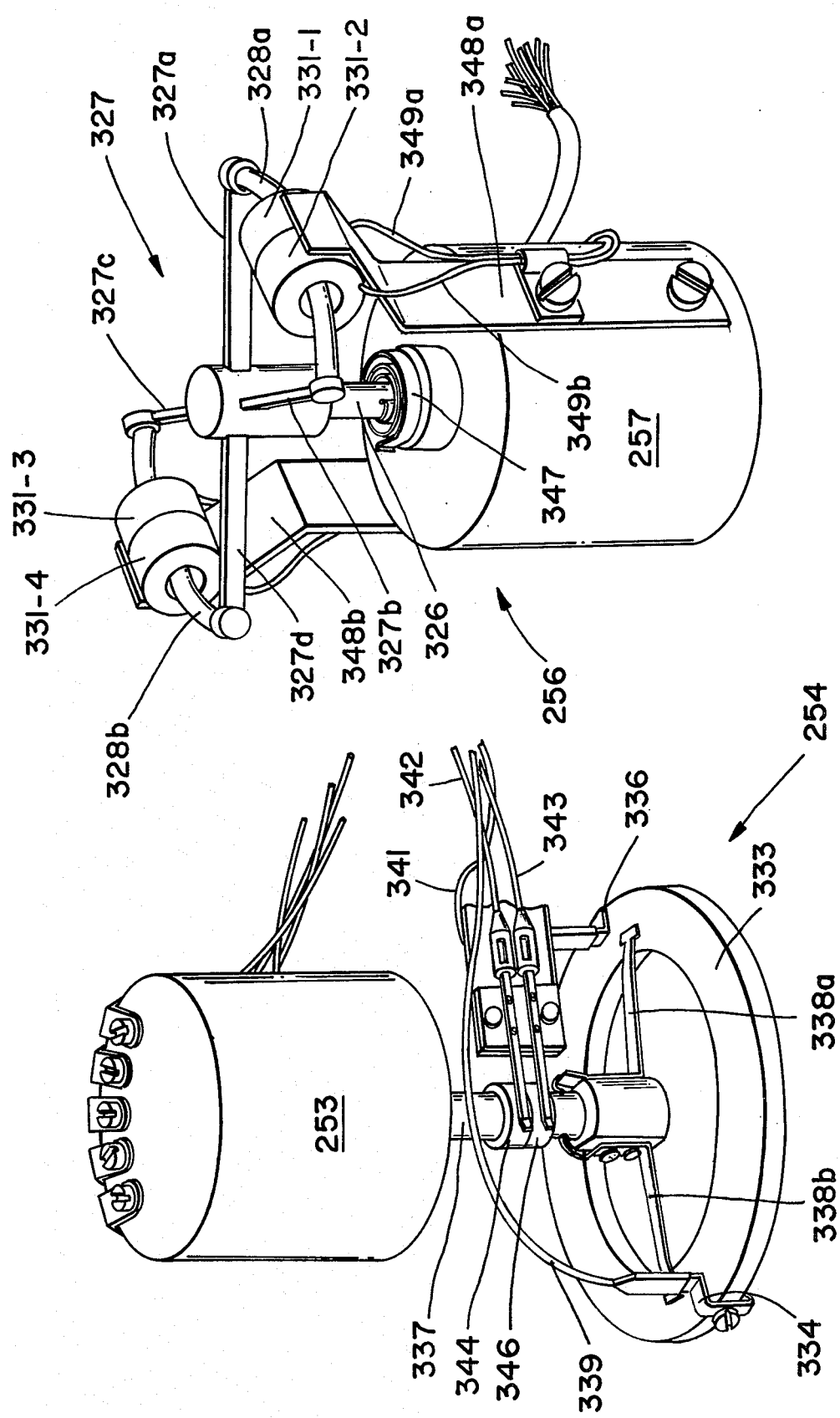

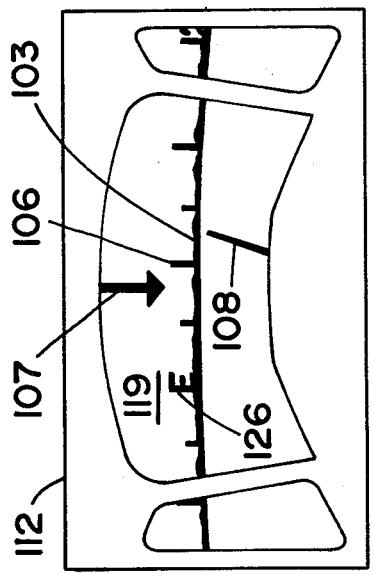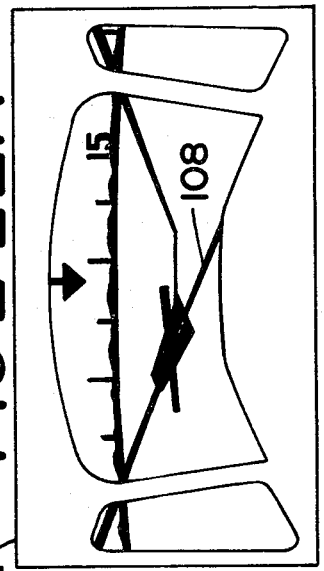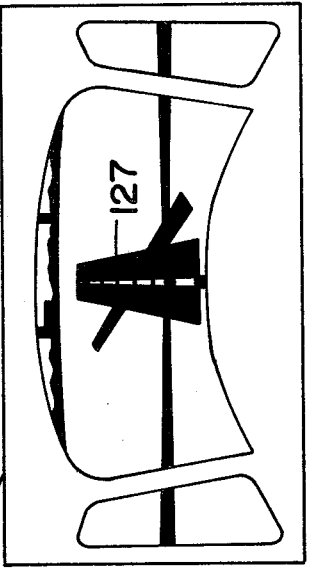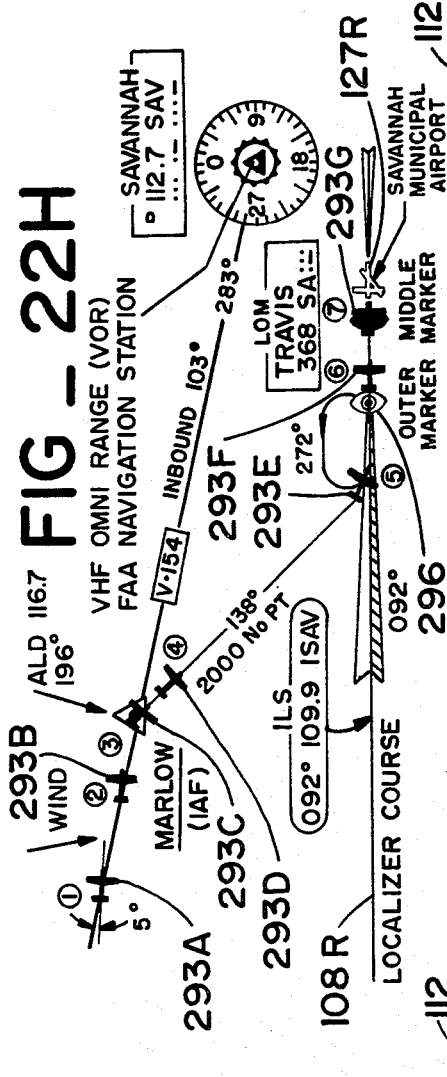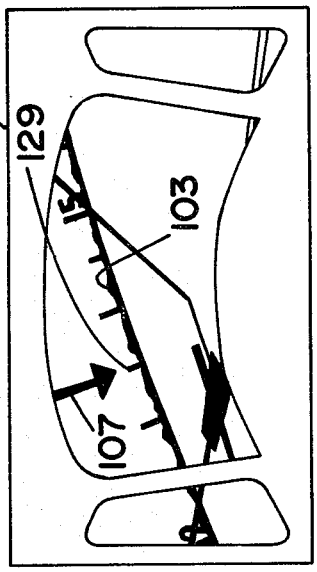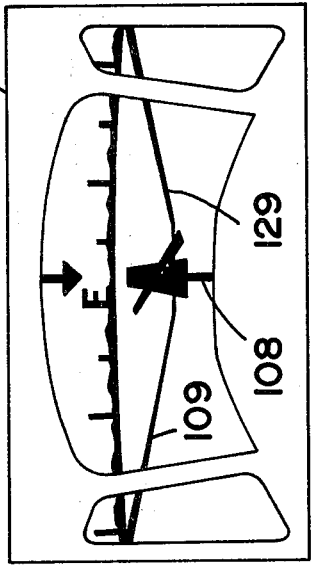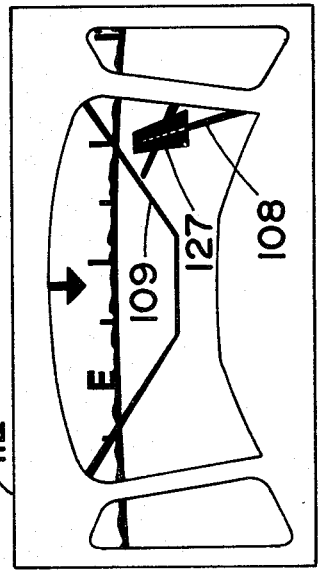

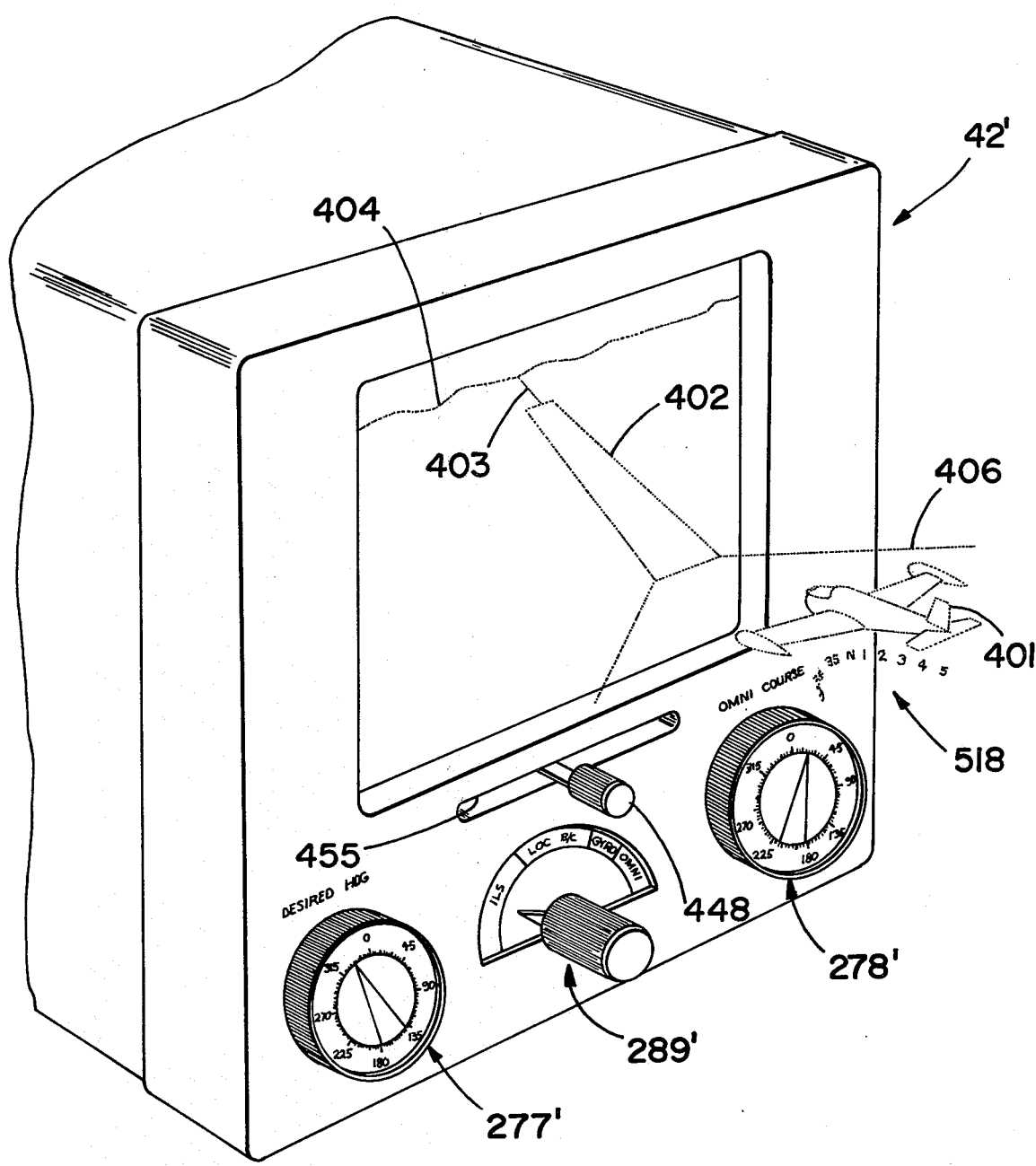
FIG _ 23

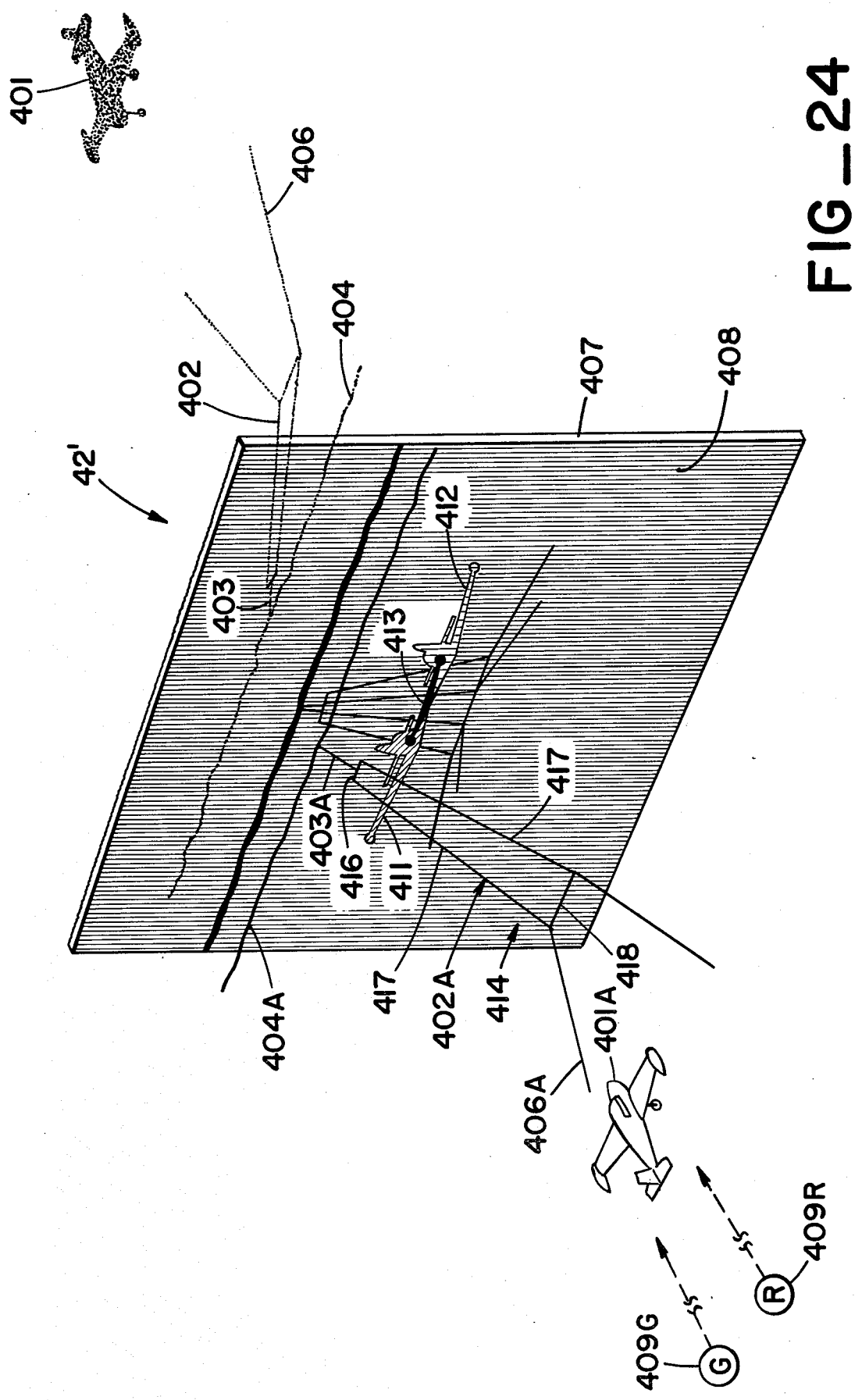

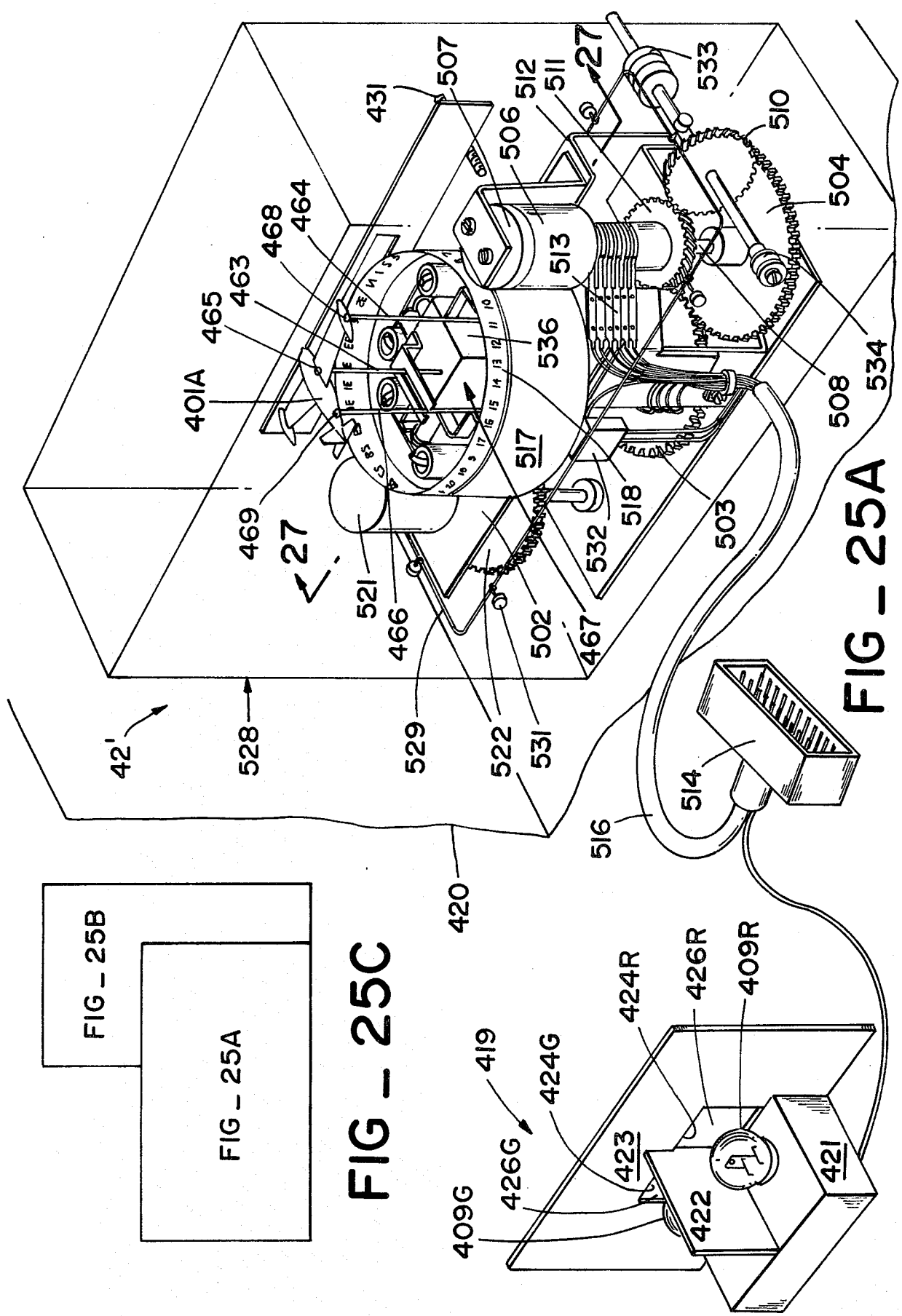

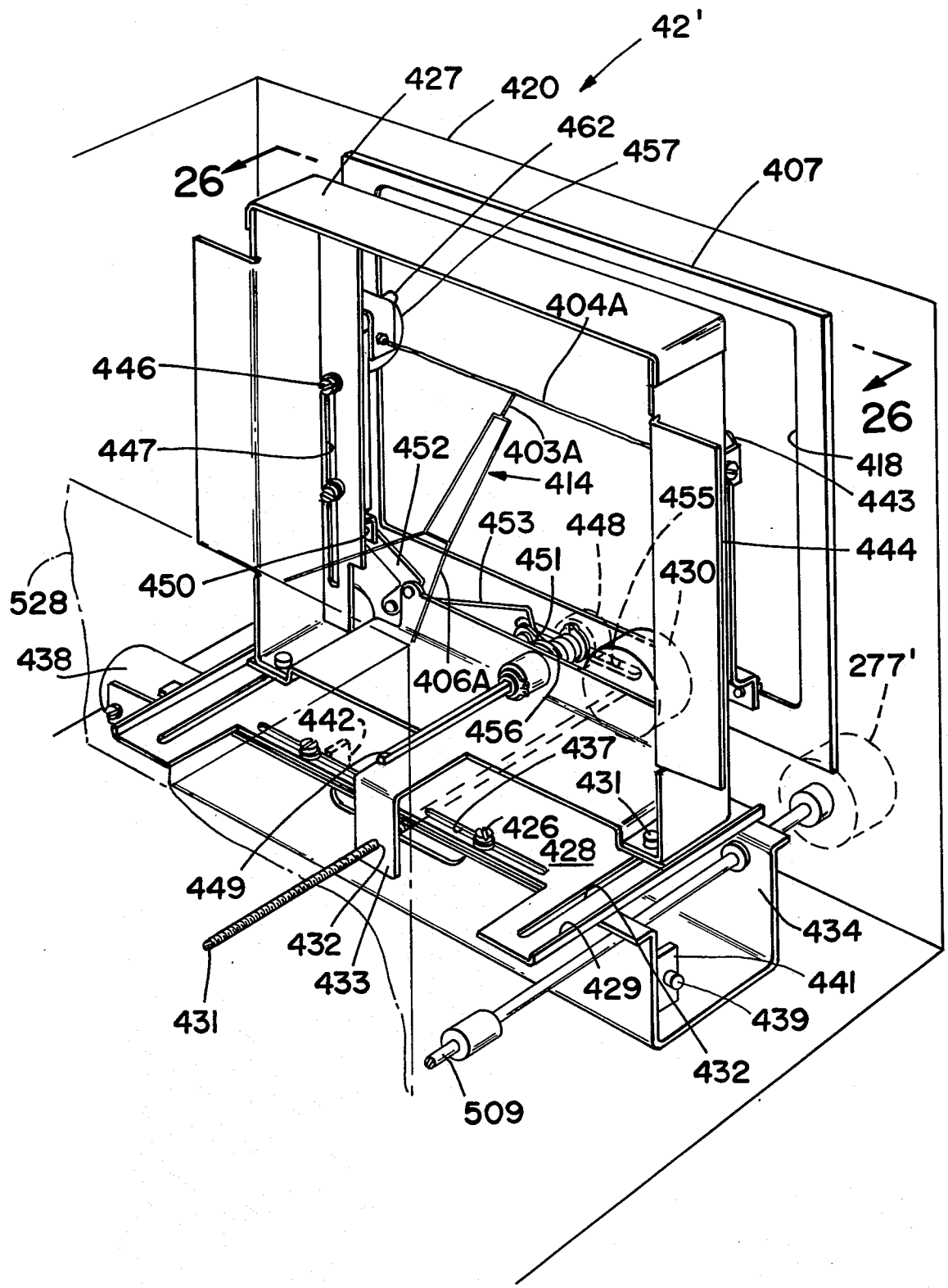
FIG_25B

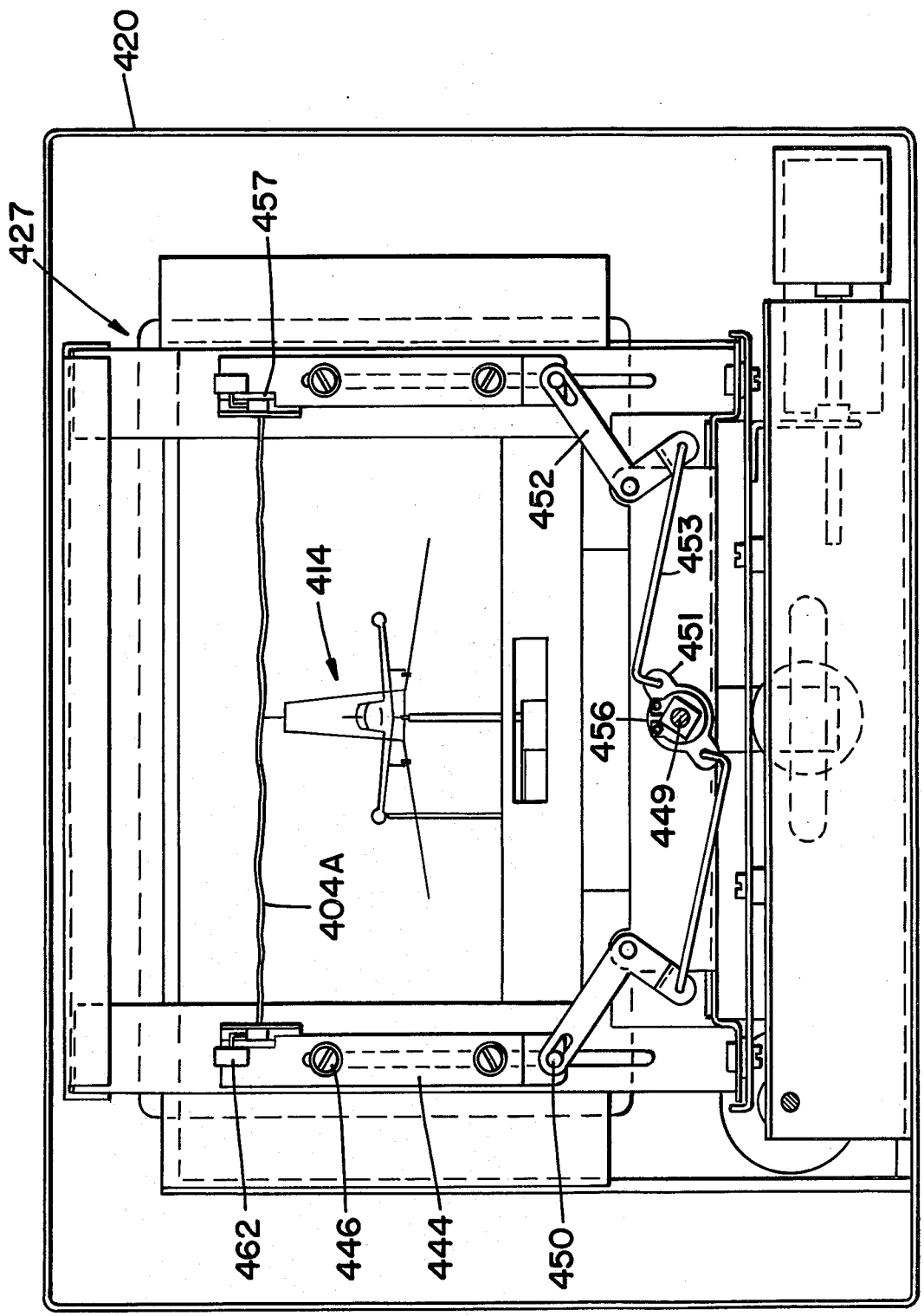
FIG_26

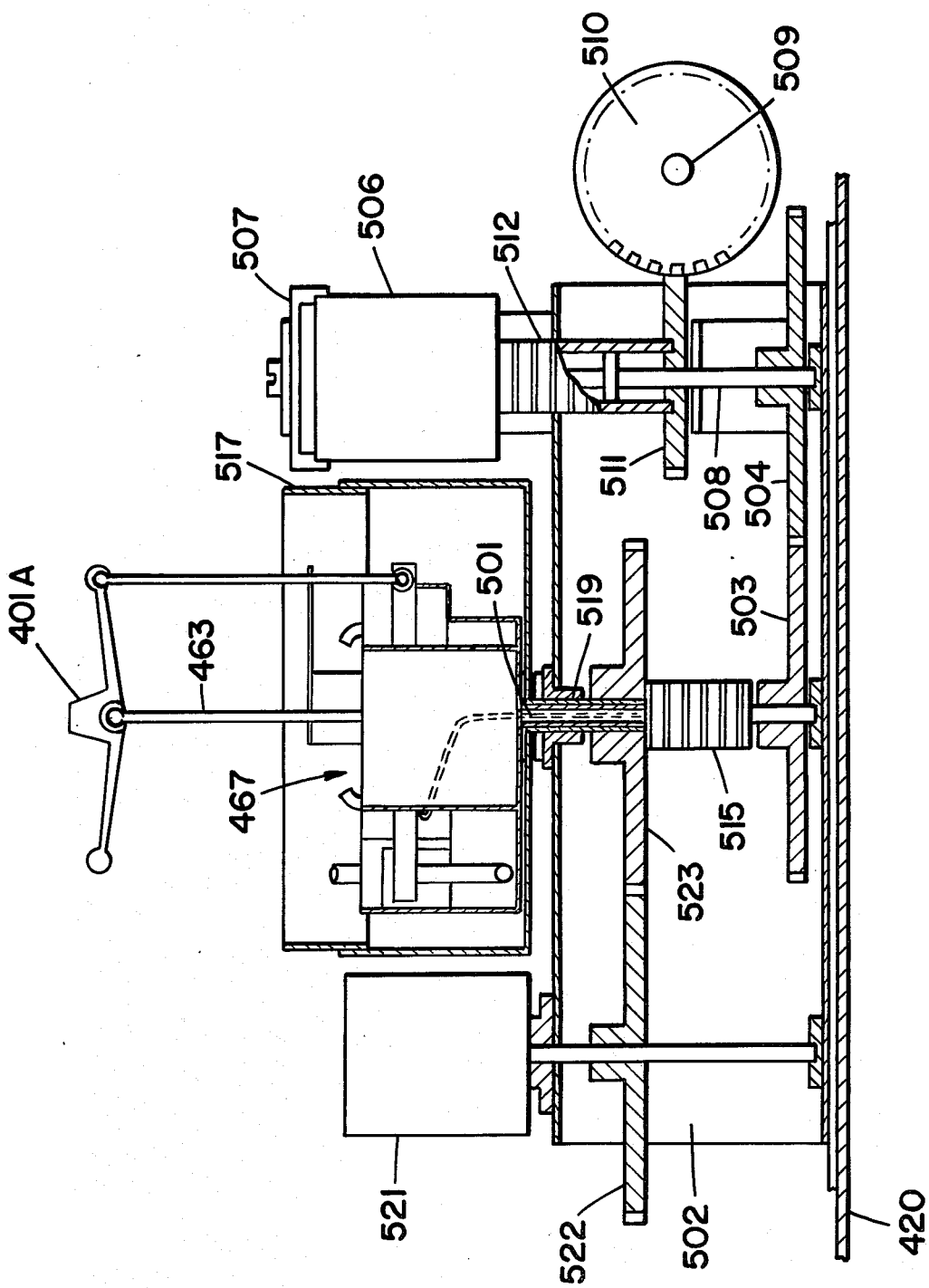
FIG_27

METHOD AND APPARATUS PRODUCING THREE-DIMENSIONAL SHADOW IMAGES

BACKGROUND OF THE INVENTION

This invention relates to stereoscopy and more particularly to a method and apparatus for creating shadows which are perceived as having a three-dimensional or seemingly solid configuration. In one form of the invention, three-dimensional shadow images are utilized to facilitate the instrument navigation of aircraft or other vehicles where the visibility of landmarks is limited or absent.

The casting of a shadow by an object exposed to a source of light is a familiar phenomenon which has heretofore been used for practical purposes only to a very limited extent. The art of portraiture by silhouette is one example and the sundial is another. Shadows, sometimes animated, have been cast upon walls or screens for amusement and entertainment purposes.

Considered as an image, conventional shadows not only exhibit a total lack of detail, aside from a flattened outline of the subject, but are also essentially two-dimensional. Technically, a conventional shadow may have three dimensions if cast upon a curved or angled surface but this simply results in distortion of the image rather than adding any true depth perception as far as a viewer's reactions are concerned. As an image, the conventional shadow is very low in information content and presents a very unrealistic representation of a solid object. The conventional shadow of an object having a frontal appearance which differs from the rear appearance conveys no information as to whether the shadow is taken from the front or the back.

Prior systems for causing observers to perceive a more realistic three-dimensional representation of an object or scene require complex processing of the image data and in most cases are not capable of providing a live or immediate representation. Stereoscopic still pictures or 3D motion pictures and the more recently developed holographic techniques involve the projection of light through a film on which the image data must be previously recorded and stored. In each of these techniques, the 3D image is not created directly from the depicted objects but is instead reconstructed from data stored on film and a sizable period of time and considerable processing effort is needed for this purpose. While a live or immediate 3D television image presentation may be arranged by using dual cameras and other accessory equipment, in this case the image data must first be reduced to electronic signals and is then reconstructed into an optical image.

Considering another aspect of the background of the invention, instrument flight and instrument landing systems for aircraft and the like use radio signals from ground stations and signals produced aboard the aircraft by gyroscopic devices and the like to determine the lateral and vertical location of an aircraft relative to an airport or other geographical site and to determine the orientation of the aircraft about roll, pitch and yaw axes. This data is conventionally presented to the pilot through a series of visible dials, pointers, indicators, meters, and the like which may also advise if the aircraft is deviating from a desired course. This does not provide the pilot with a realistic visual depiction of the position and orientation of the aircraft relative to an airport or relative to the earth. Instead, the pilot must interpret the readings of the several instruments and mentally convert the data into a visualization of the situation of the aircraft. The pilot must then manipulate the controls of the aircraft in response to his understanding of the meaning of the various dials and indicators instead of reacting directly to visual perception of the earth and the airport. Conventional instrument landings on this basis are taxing and subject to serious misinterpretations of data by the pilot. Landing is generally considered to be the most hazardous stage of aircraft operation and this is particularly true when the landing approach must be made blind on the basis of conventional instrument readings. This is a common situation where clouds or fog obscure the landing site.

SUMMARY OF THE INVENTION

This invention provides a method and apparatus for causing the viewer of a screen to perceive a three-dimensional seemingly solid shadow of one or more objects. The shadow may be perceived as being at a location apart from that of the actual object and is not necessarily perceived as being in the plane of the screen but may seemingly be in front of or behind the screen or to be moving including movement in a direction normal to the screen. In one form of the invention the solid-appearing shadow images of objects, which may include active human performers or even a viewer of the image, may be caused to appear to be within the context of a previously filmed realistic 3D still or motion picture scene.

The invention may be used to create unique optical effects for entertainment purposes and also has other usages such as aiding in the navigation of aircraft or other vehicles. In one form of the invention, an instrument landing system approach to the landing of an aircraft or the like is facilitated by presenting the pilot with a realistic appearing three-dimensional image which may include a depiction of a distant airport and preferably a depiction of an aircraft or at least a portion of an aircraft such as a cockpit windshield through which the airport depiction is seen. Mechanisms are provided which manipulate the components of the depicted scene in response to radio location signals, course signals, gyroscope signals and the like to cause the depicted aircraft to maintain the same apparent spatial relationship to the depicted airport as the real aircraft bears to the real airport at which it is to be landed. Three-dimensional representations of designated course and glide slope may also be injected into the artificial scene if desired and the earth's surface including a horizon line and compass headings may also be represented in the scene.

The pilot need not rely on his interpretations of conventional instrument flight aids which do not provide a realistic visual picture of the aircraft's relationship to the earth and to an airport. Instead, the pilot may simply fly the depicted aircraft to the depicted airport using the controls of the real aircraft. Provided legal landing weather minimums exist, as the final stage of the landing begins, the pilot need only glance up and out through the real windshield to perceive the real airport in the same relationship to the real aircraft as is depicted in the artificial scene.

To create an apparent three-dimensional shadow image of an object, the object is situated between a screen and a pair of spaced-apart light sources. Light from one source is coded in one way, by polarization or color filtering for example, while light from the other source is coded in a different way by being differently polarized or filtered to be of a different color for example. The shadow of the object as cast upon the screen then consists of right and left penumbras each partially illuminated by light coded in a differentiatable manner and, under many conditions, a central dark area or umbra.

Means are provided for causing light which is coded in one way to be received by only one eye of the viewer while light which is coded in the other way is received by the other eye. Eyeglasses having different polarization planes at each eye or having different colored light filters at each eye may be utilized depending on the form of coding employed in the light sources. Where the use of eyeglasses is inconvenient or undesirable, the primary screen may be supplemented with an analyzing lenticular screen which causes light originating from one source and its associated shadows to be directed to only one eye of the viewer while light originating from the other source and its associated shadows is received only by the other eye of the viewer, provided the viewer is situated in a predetermined position relative to the lenticular screen. Where the invention is used as an aircraft flight or landing aid as described above, the light sources, coding means, screen, and the objects which create the appearance of the earth, an airport and other components of the artificial scene are arranged for installation in the cockpit of the aircraft together with the mechanisms which manipulate the objects in response to location and attitude signals.

Under the conditions described above, the human biovisual system perceives the shadow pattern on the screen as a three-dimensional, seemingly solid representation of the object or objects. The apparent distance of the shadow image of an object from the viewer is determined by the position of the object relative to the light sources and the screen. By effecting relative movement of one or more of these elements, the 3D shadow may be caused to appear to enlarge and move nearer to the viewer or to shrink and recede.

If the object is formed of a light transmissive colored material then that portion of the light spectrum which passes through the object does not contribute to the shadow formation. Consequently the shadow of the object created by the other light wavelengths carries the coloration of the object material resulting in perception of an apparently colored three-dimensional shadow.

In one form of the invention, photographed or drawn stereographic still or motion pictures may also be projected onto the screen and the three-dimensional shadow of the object is then perceived as being located within the context of the filmed scene. While the viewer may be situated on the same side of the screen as the light sources and object, it is often more effective to utilize a translucent screen and rear projection techniques as the object is then readily concealed from the viewer. Viewers positioned between the light sources and the screen perceive a three-dimensional shadow of themselves detached from their bodies and seemingly floating in space.

Accordingly, it is an object of this invention to provide for the creation of shadows which are perceived as having depth as well as height and breadth.

It is an object of this invention to provide for the creation of solid-appearing shadow images of objects of subjects, which may variously be stationary or moving, including animate living subjects if desired, which appear to be spatially separated from the objects or subjects from which the shadow images are derived.

It is an object of the invention to provide a method and apparatus for causing perception of apparently three-dimensional shadows of objects wherein the shadows may be perceived as having coloration including colorations differing from that of the actual objects.

It is another object of the invention to provide for the insertion of three-dimensional shadow images of selected objects or animate subjects into the context of previously filmed or depicted three-dimensional still or motion picture displays.

It is still another object of this invention to facilitate the navigation of aircraft or other operator-controlled vehicles.

It is an object of the invention to provide the pilot of an aircraft or the like with a realistic-appearing three-dimensional visual presentation of the current attitude of the aircraft and the current spatial relationship of the aircraft to a fixed reference point such as the earth's surface or a landing runway or both whereby the pilot may fly a depicted aircraft to the depicted landing runway by manipulating the controls of the real aircraft and in the process the real aircraft is flown to a real landing runway or the like.

The invention, together with further objects and advantages thereof, will best be understood by reference to the following description of preferred embodiments taken in conjunction with the accompanying drawings.

BRIEF DESCRIPTION OF THE DRAWINGS

In the accomanying drawings:

FIG. 2 is a diagrammatic plan view of modified apparatus for causing perception of a seemingly solid or 3D shadow image and wherein the shadow image is perceived as being within the context of a previously filmed 3D or stereoscopic still or motion picture scene, FIGS. 3A, 3B and 3C respectively depict the total shadow pattern cast on the screen of FIG. 2, the portion of the shadow pattern perceived by the right eye of a viewer and the portion of the shadow pattern perceived by the left eye of the viewer, FIG. 4 is a diagrammatic plan view of another variation of the invention wherein an observer is caused to perceive a seemingly solid shadow image of himself within the context of a previously filmed scene the image being perceived as being situated on the same side of a screen as the observer, FIG. 5 is a diagrammatic plan view of a variation of the invention wherein the viewer need not wear light-analyzing eyeglasses as employed in the system of FIGS. 1 to 4, FIG. 6A is an enlarged broken-out perspective view showing a suitable detailed construction for a light-analyzing lenticular screen used in the system of FIG. 5 and FIG. 6B diagrammatically illustrates optical effects within the assembly, FIG. 7 is a view of a portion of the instrument panel of an airplane cockpit showing certain conventional instruments used to facilitate non-visual navigation and landing of the airplane and including components which generate electrical signals indicative of the displayed data, FIG. 8 is a perspective view of the instrument panel region of an airplane cabin having a navigation instrument in accordance with the present invention and illustrating, to the extent possible in a two-dimensional drawing, the nature of an artificial scene which may be presented to the pilot to facilitate instrument navigation of the airplane, FIG. 9A is a perspective view of certain basic internal elements of the navigation instrument of FIG. 8 and illustrates operating principles thereof, FIG. 9B is a perspective view of a screen shown in FIG. 9A illustrating how dual two-dimensional shadow patterns cast on the screen are integrated by a viewer's biovisual responses into a three-dimensional visual perception of the situation of the aircraft in which the instrument is used, FIG. 10A illustrates a light-analyzing lenticular screen and techniques for forming the screen for use in the system of FIG. 9A, FIGS. 10B and 10C illustrate stereo images of an aircraft cabin as presented to separate eyes of a viewer by the screen and FIG. 10D is an enlarged plan section view of a portion of the screen, FIG. 11A illustrates the two-dimensional shadow pattern of objects in the system of FIG. 9A as cast upon a screen thereof, FIG. 11B illustrates the two-dimensional shadow pattern of FIG. 11A as altered by typical changes in the attitude and location of the aircraft in which the system is used, FIG. 12A is a perspective view, taken from the pilot's position in an aircraft, of a disc element of the navigation instrument of FIG. 9A as it would appear to the pilot if other structure shown in FIG. 9A were absent, FIG. 12B is a view of the shadow image of the disc element of FIG. 12A as it is actually perceived by the pilot in the presence of the structure of FIG. 9A and illustrating a reversal of the normal effects of perspective which is brought about by the system of FIG. 9A, FIGS. 13A, 13B and 13C illustrate a form of optical distortion which could occur in the navigation instrument system of FIG. 9A under certain conditions and further illustrate techniques for avoiding such distortion, FIGS. 14A and 14B, which may be juxtaposed end to end to form a single continuous figure, are broken-out perspective views showing a suitable detailed construction for an aircraft navigation instrument of the form depicted more generally in FIG. 9A, FIG. 17 is an elevation view of the face of the navigation instrument of FIGS. 14A and 14B as seen by the pilot of an aircraft in which the instrument is used, FIG. 18 is a broken-out perspective view of one corner of the face of the navigation instrument of FIG. 14A and 14B showing a suitable construction for a Course Selector assembly of the instrument, FIG. 19 is a circuit diagram showing control circuit interconnections and additional circuit elements for the navigation instrument of FIGS. 14A and 14B, FIG. 20 is a perspective view showing a suitable detailed construction for a polarity reversing potentiometer used in the circuit of FIG. 19, FIG. 21 is a perspective view showing a suitable detailed construction for an imbalance adjuster used in the circuit of FIG. 19, FIGS. 22A to 22G illustrate the scene which the navigation instrument of FIGS. 14A and 14B presents to the pilot of an aircraft at successive stages of a typical instrument landing system approach to a specific existing airport, except insofar as the three-dimensionality of the depicted scene cannot be realistically represented in the two-dimensional figures, FIG. 22H shows approach plate data for the specific airport of FIGS. 22A to 22G with airplane outlines added to depict the actual positions of the aircraft at the successive times represented in FIGS. 22A to 22G, FIG. 23 is a perspective view of the face of a second embodiment of an aircraft navigation instrument and illustrates the nature of a modified form of three-dimensional artificial scene which a pilot is caused to perceive in order to facilitate aircraft navigation, FIG. 24 is a perspective view of certain basic elements of the navigation instrument of FIG. 23, FIGS. 25A and 25B, which may be juxtaposed in the manner outlined in FIG. 25C to form a single continuous figure, constitute a broken-out perspective view showing a suitable detailed construction for the second embodiment of the navigation instrument of FIGS. 23 and 24, FIG. 26 is a cross-section view taken along line 26—26 of FIG. 25B further illustrating the detailed structure of the second embodiment of the navigation instrument, FIG. 27 is a cross-section view taken along line 27—27 of FIG. 25A further illustrating the detailed structure of another portion of the second embodiment of the navigation instrument.

DESCRIPTION OF PREFERRED EMBODIMENTS

Figure 1:
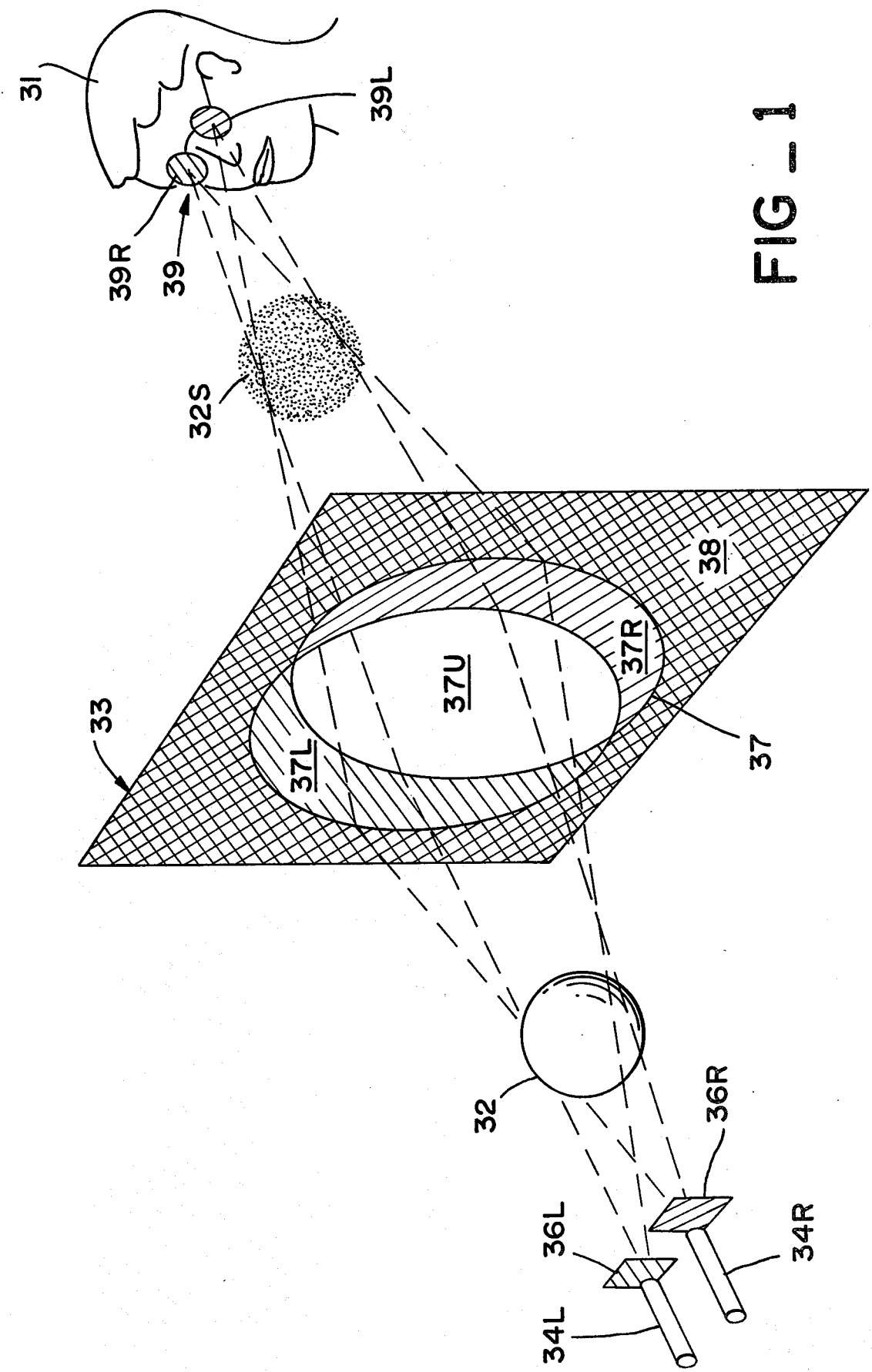
FIG. 1 is a diagrammatic perspective view illustrating equipment and techniques for causing an observer to perceive a seemingly solid shadow of an object.

Referring initially to FIG. 1, basic techniques for causing an observer or viewer 31 to perceive a seemingly solid or three-dimensional shadow 32S of an object 32 are illustrated. The object 32 in the example depicted in FIG. 1 is a solid sphere but any other opaque or partially opaque object or objects of any configuration may also be employed. The object may be a moving one, such as a human performer, in which case the three-dimensional shadow 32S is perceived as undergoing related movement including movements towards or away from the observer.

To create the apparent three-dimensional shadow image 32S, the object 32 is disposed between a screen 33 and a pair of spaced-apart light sources 34L and 34R. Light sources 34 are arranged to direct light towards the object 32 and the more distant screen 33 and in most instances are spaced apart a distance corresponding at least approximately to the average spacing of the two eyes of human observers although greater or less spacing of the light sources may be used if exaggerated or diminished perspective of the shadow image 32S as perceived is desired.

Light from each of the two sources 34L and 34R is differently coded so that light from one source may be restricted to one eye of the observer 31 while light from the other source may be restricted to the other eye of the observer. In the example depicted in FIG. 1, this is accomplished by inserting a polarizing filter 36R in front of source 34R while another polarizing filter 36L is inserted in front of source 34L, with the polarization planes of the two filters being oriented at right angles to each other. As will be pointed out in connection with other examples of the invention, the coding of the light may also be accomplished anaglyphically by using filters of different colors instead of the polarizing filters of the arrangement of FIG. 1.

The screen 33 in this instance is formed of a flat translucent material since rear projection techniques are utilized in the example of FIG. 1, the observer 31 being situated on the opposite side of the screen from the light sources 34 and the object 32. Since polarization is utilized for light coding in this example, the screen material should be of a non-depolarizing composition. Coated glass and various known plastics are suitable materials for the screen 33. In an anaglyphic system where color rather than polarization is used for light coding, frosted glass or thin paper are also suitable rear projection screen materials.

Under the above-described conditions, object 32 creates a two-dimensional shadow pattern 37 on the screen which consists of a central umbra area 37U in the region where light from both sources 34 is blocked by the object 32, a partially illuminated left penumbra area 37L and a partially illuminated right penumbra area 37R. Left penumbra 37L occupies the area of the screen which receives light from source 34L but no light from source 34R while the right penumbra 37R is defined by the area of the screen which receives light from the source 34R but none from source 34L. Since the light received at the screen in each penumbra area originates at only a single one of the light sources, the light in each penumbra is differently coded, by exhibiting different polarization planes in this particular example. The fully illuminated area 38 of the screen, outside the shadow pattern area 37, receives light from both sources 34 and thus includes light coded in both ways.

If the observer 31 were simply to view the screen 33 without the assistance of means, such as analyzing eyeglasses 39, for restricting light originating at one source 34 to one eye and for restricting light originating at the other source to the other eye, the observer would simply perceive the two-dimensional shadow pattern on the screen in the form described above. The observer 31, under those conditions, would see the umbra 37U as a flat dark area, the two penumbras 37 as partially illuminated flat areas and the remainder of the screen as a more brightly illuminated area. This would not provide a highly realistic three-dimensional shadow representation of the object 32.

The eyeglasses 39 in this example have a polarization analyzing right lens 39R with a polarization plane oriented similarly to that of the left light source polarizing filter 36L and have a left polarization analyzing lens 39L in which the polarization plane is oriented similar to that of the right light source polarizing filter 36R. Therefore, when wearing the eyeglasses 39, the right eye of the observer 31 can see only light which originated at left light source 34L while the observer's left eye can receive only light which originated at the right light source 34R.

While wearing the eyeglasses 39, each eye of the observer perceives only a portion of the total shadow pattern 37 on the screen. The observer's right eye perceives the central umbra area 37U and the right penumbra area 37R as a continuous dark area which is of circular configuration in this particular example owing to the spherical shape of the object 32. The observer's right eye does not perceive the left penumbra 37L since it is illuminated by light from left light source 34L and that light may pass through the right lens 39R of the eyeglasses. Thus to the observer's right eye, the left penumbra 37L appears as a lighted area continuous with the lighted area 38 which lies outside the shadow pattern 37 on the screen. The observer's right eye does not detect any difference in the degree of illumination of left penumbra 37L and the surrounding fully illuminated area 38 since one-half of the light falling on area 38 is blocked from the right eye by analyzing lens 39R.

For similar reasons, the left eye of the observer perceives only the central umbra area 37U of the shadow pattern on the screen together with the left penumbra area 37L which are jointly perceived as a single circular dark area in the example. The observer's left eye does not perceive the right penumbra area 37R since the left eye perceives the illumination of this area by right light source 34R.

Owing to the separation of the two light sources 34, the portion of the two-dimensional shadow pattern of object 32 on screen 33 that is perceived by one eye of the observer is cast from a slightly different angle than the portion of the shadow pattern perceived by the other eye. If the two light sources 34 are considered to be analogous to the eyes of a viewer of the object 32, then one light source may be characterized as looking slightly more around one side of the object 32 while the other light source is looking slightly more around to the other side of the object. The binocular human biovisual system reacts to slightly disparate views of a scene at each eye by perceiving the scene three-dimensionally. In other words the impression that various portions of the scene are at different distances from the viewer is created. Although the observer 31 in the example of FIG. 1 is situated on the opposite side of the screen 33 from light sources 34, the analyzing eyeglasses 39 cause a perception similar to what would occur if the observer's eyes were located in the position of the light sources 34 except insofar as it is a shadow outline that is perceived rather than the actual object 32. Consequently the shadow image 32S is perceived as being solid, that is the observer perceives different portions of the shadow image as apparently being at different distances from his eyes. In this particular example the shadow image 32S has the general appearance that a solid black ball situated in front of the observer would have. If the object 32 is another person such as a performer, then the shadow image 32S appears somewhat like a black statue of the performer, illuminated from behind by more than one light source, although this analogy is strictly true only if the performer does not move. Any movement of the performer causes the three-dimensional shadow image to move in a similar, but mirror-imaged, manner unlike a fixed statue. With the observer on the opposite side of the screen from the object 32 under the conditions depicted in FIG. 1, the solid-appearing shadow image 32S is perceived as if viewing the actual object 32 from the side of the object that is remote from the observer, that is from the point of view of the light source 34, except for the mirror image reversal effect.

While the sphere 32 shown for purposes of example in FIG. 1 is featureless and appears essentially the same from all angles, surface detail is detectable in the peripheral areas of the solid shadows of other objects which do have distinctive configurations. When the object 32 is a person, for example, such detail as hair on the back of the hands or at the top and side regions of the head and neck is detectable in the shadow image (assuming the person is facing the light sources). Loose threads on clothing or filmy or lacy clothing or the like is also detectable in the solid shadow. Surface detail in the more central areas of the solid shadow may not be detectable although in the case of a human subject, there is an interesting tendency for an observer to mentally fill in known detail such as facial features which may not actually be represented in the image. In general, the solid shadow image of a person known to the observer tends to be recognized immediately.

Considering now the apparent location of the 3D shadow image 32S, it has been pointed out that the shadow area on screen 33 which is perceived by one eye of the observer is slightly displaced in the plane of the screen from the shadow area perceived by the other eye. The right eye perceives a shadow area situated slightly to the observer's left while the left eye sees a shadow pattern located slightly to the right. Upon focusing on these perceived shadow patterns on the screen 33, the two eyes of the observer must converge slightly so that the optical axes of the two eyes cross at a point in front of the screen. The human biovisual system inherently triangulates in such a manner that the object is perceived as being situated at the region where the optical axes or lines of sight of the two eyes converge while the eyes focus on the screen. Thus in the present example, the 3D shadow image 32S is perceived as being situated between the observer 31 and the screen 33.

This apparent distance of the shadow image 32S from the observer 31 is determined by the position of the real object 32 between the light sources 34 and the screen 33. If the real object 32 is moved closer to the screen, the two-dimensional shadow pattern 37 on the screen diminishes in size, penumbra areas are diminished relative to the umbra area and the separation of the areas of the shadow pattern on the screen which are perceived by each eye is diminished. Under this condition, the observer perceives the 3D shadow image 32S as apparently receding when in fact the real object 32 is moving closer to the observer. For similar reasons, if the real object 32 is moved towards the light sources 34, the shadow image 32S is perceived as moving closer to the observer since the observer's eyes must then converge to a greater extent in focusing on the shadows on the screen, while the size of the shadow patterns on the screen has increased and the amount of penumbra has increased relative to umbra area.

In practice there may be a large number of observers 31 and more than one real object 32. The system may be used to create a variety of unique entertainment effects. A theater or nightclub audience, for example, may be caused to perceive seemingly solid animated images of any of various kinds of performers, such as pantomimists, dancers or the like seemingly floating in space. The system also has uses in addition to entertainment as will hereinafter be described.

In this discussion of the method and suitable apparatus for causing one or more viewers to perceive what appear to be solid three-dimensional shadows, the term "perceiving" or "perception" has been used with reference to the viewer's reactions instead of referring to "seeing" the shadow image although the latter term might be loosely employed for the same purpose. Strictly speaking, one does not "see" a shadow whether of the 3D form or the conventional two-dimensional form. A shadow is actually a lack of seeing within a certain area or region.

Referring now to FIG. 2, a variation of the system is depicted wherein anaglyphic or color filtering means are used for coding light instead of polarization techniques. FIG. 2 further illustrates techniques by which 3D shadow images of inanimate or animate objects may be injected into the context of a previously filmed stereoscopic still or motion picture presentation, the shadow injection techniques being applicable to systems using polarization light coding, as described above, as well as to an anaglyphic system of the kind depicted in FIG. 2.

In the example of FIG. 2, the spaced-apart light sources 34L' and 34R' are the objective lenses 41R and 41L which define the dual optical projection paths of a 3D still or motion picture projector containing film 42 on which slightly disparate views of a scene have been recorded, light from suitable sources 43 being directed through the film and each objective lens 41 in order to project disparate stereo-images of the scene on a screen 33' in the known manner.

Color coding for restricting perception of light originating at source 34L' to the right eye 44R of a viewer and for restricting perception of light from the other source 34R' to the left eye 44L of the viewer in this example is provided by color filters 46L and 46R respectively which transmit different wavelengths. Filter 46L may be a red filter disposed between source 34L' and screen 33' while filter 46R may be a blue filter situated between source 34R' and the screen. If a three-dimensional object 32', again represented as a sphere for purposes of the example only, is disposed between the light sources and the screen, the resulting two-dimensional shadow pattern 37' on the screen would appear as shown in FIG. 3A to an observer having no color coded eyeglasses or other analyzing means, FIG. 3A being taken from the point of view of an observer situated on the opposite side of the translucent screen from the light sources and the real object. The shadow pattern 37' again consists of a central dark umbra 37U', a right penumbra 37R' and a left penumbra 37L'. In this connection it may be noted that the right penumbra appears on the left from the point of view of FIG. 3A while the left penumbra appears on the right. This results from the fact that FIG. 3A shows the side of the screen which is opposite from the light sources. The designations "right" and "left" are retained for the penumbras in FIG. 3A to be consistent with FIG. 2 and also since the right penumbra 37R' is perceived as shadow only by the right eye 44R of the viewer for reasons which will be explained.

Referring again to FIG. 2, in order to cause light originating from source 34L' to be perceived only by the right eye 44R of the viewer, another red filter 47R is disposed in front of the viewer's right eye. In order to cause light from source 34R' to be received only by the viewer's left eye 44L, a green filter 47L is situated in front of the left eye.

The reason that the color of left eye analyzing lens filter 47L in this example does not match that of coding filter 46R at the right light source 34R' is that the combination of filter colors described above results in the shadow image and the 3D scene from film strip 42 being perceived in shades of grey, in the so-called "black and white" presentation familiar to movie and television viewers. The projected image which reaches the screen through coding filter 46L appears in shades of red whereas the disparate image which reaches the screen through coding filter 46R appears in shades of blue. To an observer not equipped with the analyzing filters 47, the areas of the screen 33' outside the umbra or penumbra shadows of object 32' would appear in shades ranging from red through pink, purple to blue, depending on the contents of the projected scene. The left penumbra 37L' would appear solely in red while the right penumbra would appear solely in blue. The central umbra 37U' would appear black as no illumination reaches the umbra area.

Red analyzing lens 47R passes only light in the red regions of the spectrum. Consequently, lens 47R causes the right eye to perceive the image on the screen solely in shades of red or pink except for the umbra shadow area 37U' and the right penumbra 37R' both of which are perceived as black since the blue light of the right penumbra cannot pass through the red analyzing lens 47R. As the analyzing lens 47L at the left eye is green, the left eye perceives the scene on the screen in shades of cyan except for the shadow umbra area 37U' and the left penumbra area 37L' which are perceived as black inasmuch as the red illumination of the left penumbra cannot pass the green filter at the left eye. The scene is perceived by the left eye in shades of cyan since blue light observed through a green filter appears in that hue. Where one eye is presented with an image in shades of pink and the other eye is presented with the image in shades of cyan, the human biovisual system inherently reacts by combining the colors to perceive the scene in shades of grey.

Thus, the observer, when equipped with the analyzing lenses 47 or other analyzing means, perceives a filmed three-dimensional scene except that injected into the scene is a seemingly solid shadow image 32S' of object 32'. If the object 32' is an animate human performer an arresting effect of something alive moving into a previously filmed scene is created.

The injection of the shadow image 32S' into the filmed scene results from effects essentially similar to those previously described. Upon focusing upon the screen 33', the left eye 44L of the observer perceives a shadow pattern consisting of the central umbra 37U' and the left penumbra 37L'. As the right penumbra 37R' is not perceived by the left eye the total shadow image appears to that eye to be displaced to the right as depicted in FIG. 3C. For similar reasons the right eye perceives only the central umbra 37U' together with the right penumbra 37R', as depicted in FIG. 3B, and the perceived shadow area appears shifted to the left. Presented with these disparate slightly spaced-apart perceptions of the shadow pattern on the screen, the viewer's biovisual system synthesizes a solid three-dimensional shadow 32S' as shown in FIG. 2. For the reasons previously discussed, the 3D shadow image 32S' in this particular example appears to be between the viewer and the screen, while objects in the background 3D movie or still picture scene are perceived as being at varying distances from the viewer depending on conditions under which the filmed scene was photographed.

Using the combined stereo film and three-dimensional projection technique, four combinations of presentation are possible with respect to the apparent location of objects in the scene. These include: stereo film scene behind the screen and 3D shadow behind the screen, stereo film scene behind the screen and 3D shadow in front of screen, stereo film scene in front of screen and 3D shadow in front of screen, and stereo film scene in front of screen and 3D shadow in back of screen.

The in-front-of or behind-the-screen perception of the stereo film scene is a factor of circumstances at the time of photography as understood in that art. The in-front-of or behind-the-screen 3D shadow is a factor of light coding. For example, using two 35 mm. slide projectors, each oppositely light coded, and using analyzing glasses to view the superimposed stereo film images, a 3D image will be perceived. If the positions of the projectors are then interchanged so that the left projector is on the right and the right projector is on the left the same filmed 3D image will be seen as before. But if a shadow-casting object is disposed in the projection paths in the first instance the shadow image appears to be on the opposite side of the screen from where it appears to be in the second instance. In other words, the disparate stereo views on the film have not changed but the disparate shadows have changed since the shadow-casting coded lights have traded places.

Where an image is injected into the context of a pre-existing scene in conventional movie or television systems, by means of matting or the like, problems are often encountered from fringing or tear-through effects. The boundary between the injected image and the background often appears to have unnatural emphasis or to exhibit optical effects which make the superimposition apparent to a viewer. It is of interest that in the present system as described above, the fit of the 3D shadow images 32S' into any previously filmed 3D scene displayed on the screen 33' is exact and free from the effects described above. This results from the fact that the injected 3D shadow image is created simply by the blocking out of light from the filmed background scene.

The system described above with reference to FIG. 2 produces a 3D shadow image 32S' which appears black to the observer. It is possible to produce such shadow images having apparent coloration by utilizing objects 32' formed of a material partially transparent to the light transmitted through one of the color coding filters 36 but which is less transparent or opaque to the color of light received from the other filter. If the object 32' is formed of a material which transmits some red light, such as appropriately colored glass for example, some red light will be transmitted into the shadow pattern area 37U' on the screen and impart a similar coloration to the shadow image 32S' perceived by the viewer and refraction effects may appear in and around the image depending on the configuration of the object. Other colorations may be imparted to the shadow images by utilizing other combinations of colored filters 46, analyzing lenses 47 and objects 32' formed of materials which are semi-transparent to the desired wavelengths.

The range of shadow image coloration available by such techniques is increased if light coding by polarization, as previously described with reference to the system of FIG. 1, is employed together with color filters situated between the light sources and a semi-transparent colored object, since the color filters and eyeglass lenses then need not be limited to those which will enable restriction of light from each source to a single eye of the observer.

The 3D shadow-creating systems as described above with reference to FIGS. 1, 2 and 3, cause the perception of the shadow image as apparently being situated between the observer and the screen. If, with reference to the system of FIG. 1 for example, the light coding is reversed, then the shadow image is perceived as being located behind the screen. In other words, if the polarizing filters 36R and 36L of FIG. 1 are interchanged or if the lenses 39R and 39L of the viewer's eyeglasses are interchanged, the observer 31 will then perceive the shadow image 32S as being situated in the general region of the real object 32. The real object itself is not seen because of the presence of the screen. Such reversal of the filters 36 or the eyeglass elements 39 causes the observer's right eye to perceive the left penumbra 37L instead of the right penumbra while the left eye perceives right penumbra 37R. Under that condition the lines of sight of the observer's two eyes do not converge and cross in front of the screen but, instead, converge at a point situated behind the screen. The observer's biovisual system then construes the location of the 3D shadow image to be at that convergence point behind the screen.

When the light coding is reversed as described above, the shadow image is perceived with a reversal of normal perspective. Specifically, portions of the shadow image which are perceived as being closer to the observer appear diminished in size while those portions of the shadow image which are perceived as being more distant appear enlarged in contradiction to the ordinary principles of perspective. This property of reversing perspective may be advantageously used in certain applications of the process as will hereinafter be described. In instances where such distortion may be undesirable, it may be corrected for by shaping the real objects 32, which create the 3D shadow image, to compensate for the reversed perspective. The portions of the real object which will appear to be closer to the observer in the shadow image, that is the portions of the real object which are farthest from the light sources 34, may be formed to have a larger size relative to the portions of the object closer to the light sources than would be the case in a similar object having normal proportions. A specific example of this technique will hereinafter be described in more detail.

In the examples of the invention as described to this point, the observer has been situated on the opposite side of a translucent screen from the light sources and from the object which creates the shadow image. Referring now to FIG. 4, it is also possible to situate the observer 31' on the same side of the screen 49 as the dual light sources 51. Moreover, an observer 31' may be the object of which a three-dimensional shadow image 52 is created. In this arrangement, viewers may be caused to perceive seemingly solid shadows 52 of themselves seemingly floating in space. If the spaced-apart dual light sources 51 are defined by the two projection channels of a 3D still or motion picture projector 51, the observer 31' will perceive his solid-appearing shadow 52 as having entered into the context of the projected scene and to be moving about within the scene if he moves himself. In this variation of the process, the illusion of a seemingly solid shadow 52 arises in essentially the same manner as in the previously described embodiments. If the light 53R projected through the right objective lens 54R of projector 51 is coded in one manner by polarization or by anaglyphic means while the light 53L projected through the other objective lens 54L is oppositely coded and if the observer-object 31' wears analyzing glasses 39' similar to those previously described then one eye of the observer perceives only the umbra area 37U" and the left penumbra area 37L" of his shadow pattern on screen 49 while the other eye perceives only the central umbra area together with the right penumbra area 37R". The observer's biovisual system responds to these slightly disparate views of his shadow by perceiving a three-dimensional shadow replica of himself. Owing to the slight convergence of the optical axes of his two eyes in focusing on these slightly separate areas of screen 49, the shadow 52 is perceived as being situated between himself and the screen at the point where the lines of sight of his two eyes cross and appears to be facing away from himself, provided that the analyzing lens 39R' at his right eye matches the coding filter 36R' at the right light source 54R and the left eye analyzing lens 39L' matches the left light source coding filter 54L'. If the analyzing lenses 39R' and 39L' are interchanged or if the coding filters 54L' are interchanged, his shadow image 52 is perceived as facing himself and as apparently being located behind the screen and in the previously described reverse perspective, the effect then being somewhat similar to that of looking in a mirror except that the image reduces in size if he advances towards its apparent location.

In the several examples of the invention described above, perception of the 3D shadow image depended upon the wearing of a pair of specialized eyeglasses or an equivalent disposition of right eye and left eye analyzing filters between the observer and the screen. Under some circumstances the use of such glasses may be inconvenient or undesirable. It is possible to dispense with the need for eyeglasses or the like, provided that the observer is positioned at a known point with reference to the screen. An example of such a system is depicted in FIG. 5.

The object from which a shadow is to be derived, represented by a cube 56 in FIG. 5, may again be situated between a screen assembly 62 and spaced-apart light sources 58R and 58L in the manner previously described, the light from source 58R being coded by polarization or color filtering and the light from the other source 58L being differently coded by being polarized in a different plane or by passage through a differently colored filter in accordance with the techniques previously described. The object 56 will again cast a shadow pattern on screen 62 consisting of a central dark umbra 59, a left penumbra 59L illuminated only by coded light from source 58L and a right penumbra illuminated only by differently coded light from source 58R.

Both eyes 61R and 61L of an observer stationed on the opposite side of the screen 62 would of course perceive the same two-dimensional shadow pattern on the screen in the absence of some means for blocking perception of the one penumbra from the right eye 61R and for blocking perception of the other penumbra from the left eye 61L. This blocking of perception of one penumbra from each eye, without requiring analyzing eyeglasses, is accomplished by utilizing a screen assembly 62 which may be characterized as being a light-analyzing lenticular screen and which may have a construction as illustrated in FIG. 6 which is an enlarged broken-out elevation view of one corner of the screen assembly.

As best seen in FIG. 6A, screen assembly 62 consists of a lenticular plate 64 having a flat planar light-analyzing element assembly 66 disposed against a light-diffusing surface 65 of the lenticular plate which is remote from the viewer of the screen assembly. Lenticular plate 64 may be essentially of the form heretofore used in the manufacture of 3D postcards and the like and thus consists of a transparent material having a series of parallel, vertical, partial cylindrical lens elements 68 formed in the surface which faces the viewer. The cross-sectional curvature of each such partial cylindrical lens surface provides a focal point 67' located directly behind that particular lens surface and closer to the light-diffusing back surface 65 of the plate than to the lens surface.

Light-analyzing element assembly 66 has parallel vertical light-analyzing bands 67 of which alternate bands 67R are transparent to light coded in a first way while being opaque to light coded in a second way. The intervening bands 67L are transparent to light coded in the second way and opaque to light coded in the first way. For example, in an anaglyphic system, bands 67R may be composed of red color filter material while bands 67L are composed of green or cyan color filter material. Where polarization is used for light coding, band 67R may have a first polarization plane while bands 67L have an opposite polarization plane. One of the bands 67R and an adjacent one of the bands 67L extend along surface 65 behind each partial cylindrical lens 68 at opposite sides of the focal point 67' of the associated lens except that there may be a slight displacement of the boundary between adjacent bands, relative to the focal point as will hereinafter be discussed in more detail. Each such band 67 preferably has a width substantially one-half that of the associated partial cylindrical lens although narrower bands may be employed in some cases as will also be hereinafter discussed. The width of each partial cylindrical lens 68 and the width of the light-analyzing bands 67 are exaggerated in the drawings for clarity of illustration and in practice such widths may typically be a few thousandths of an inch.

Considering now the operation of the light-analyzing lenticular screen assembly 62, reference should again be made to FIG. 5. Solid arrows 65R and 65L respectively represent the optical path from the right eye 61R and left eye 61L of an observer to a specific single one 68' of the partial cylindrical lenses of the screen assembly. Owing to the extremely small width of the specific partial cylindrical lens 68, relative to the spacing between the two eyes of the observer, these optical paths 65 are necessarily convergent. The optical paths 65 from each eye to a specific individual lens should be distinguished from the lines of sight or optical axes of the two eyes, repesented by dashed arrows in FIG. 5, which are also usually convergent as previously discussed but which do not usually converge on a single one of the partial cylindrical lenses. Bearing in mind the convergence of the optical paths 65 from the observer's two eyes to any single one of the partial cylindrical lenses, reference should now be made to FIG. 6B wherein it may be seen that the lens 68' acts to limit visibility along path 65R to a band 67R while limiting visibility along path 65L to a band 67L. Thus only light-analyzing bands 67R are visible to the observer's right eye while only light-analyzing bands 67L are visible to the observer's left eye. While the optical paths 65 to every lens 68 have not been depicted in FIG. 6B in the interests of clarity of illustration, similar considerations apply to each of the other lenses 68 and the associated pairs of bands 67. As a consequence only light transmitted through bands 67R reaches the right eye of the observer while only light transmitted through bands 67L reaches the observer's left eye.

Consequently, referring again to FIG. 5, the viewer's right eye may perceive only the left penumbra 59L and umbra 59 of the shadow pattern on screen 62 while the viewer's left eye 61L may perceive only the right penumbra 59R together with the umbra 59. In accordance with the principles hereinbefore described, the observer then perceives a seemingly solid shadow image 56' of object 56 apparently situated at the point of convergence of the lines of sight of the two eyes as represented by dashed arrows in FIG. 5. Using the light coding employed in FIG. 5 for purposes of example, this point of convergence is behind the screen. However, as previously described, if the coded light sources 58L and 58R are then interchanged, right eye 61R will perceive right penumbra 59R together with penumbra 59 while left eye 61L perceives left penumbra 59L together with the umbra and, under that condition, the shadow image 56' will be perceived as being between the observer and the screen inasmuch as the lines of sight of the two eyes then cross in front of the screen.

Turning now again to FIG. 6B, the above description of the optical paths 65 between the two eyes of an observer and the light-analyzing bands 67 was initially described with respect to one of the partial cylindrical lenses 68' which is centrally situated on the screen assembly. At the centermost one of the partial cylindrical lenses 68' the two optical paths 65 enter the lens surface at equal but oppositely inclined angles. However, upon considering the optical paths 65L' and 65R' between the observer's two eyes and a representative lens 68" situated towards one side of the screen assembly 62 it may be seen that this symmetrical relationship does not exist. If lens 68" is situated near the left side of the screen from the observer's standpoint, then the optical paths 65R' and 65L' enter the screen at changed angles. As viewed in FIG. 6B, optical paths 65L' and 65R' appear shifted counterclockwise relative to paths 65L and 65R respectively since both paths 65L' and 65L originate at a single point, the left eye of the observer, while paths 65R' and 65R both originate at the right eye. Accordingly, it is preferable that the paired light-analyzing bands 67L and 67R be displaced progressively more leftwardly relative to the focal point of associated lens 68 as the left edge of the screen assembly 62 is approached. In other words, the paired bands 67L' and 67R' associated with the centermost cylindrical lens 68' are directly behind that centermost lens as is evident from arrow A in FIG. 6B while the bands 67R" and 67L" which coact with a lens 68" at the left portion of the screen assembly are shifted to the left relative to the associated lens 68" as may be seen by reference to arrow B. For similar reasons it is preferable that the bands 67 be displaced progressively more to the right as the rightward edge of the screen assembly is approached.

Considering the small width of the partial cylindrical lenses 68 and associated light-analyzing bands 67, it might appear at first consideration that manufacture of the screen assembly 62 would be a very tedious and exacting task. However, one convenient method for preparing such a screen assembly simply makes use of a color-sensitive photographic film transparency to form the light-analyzing band assembly 66. If the unexposed color film is disposed in position on the back surface 65 of the lenticular plate 64, in darkness, the desired light-analyzing bands may be established in the proper position by simple photographic techniques. In particular, with reference to FIG. 5, the screen assembly 62 including the unexposed film may be situated in a dark room with a red light source at the position defined by the observer's right eye 61R in FIG. 5. Upon momentarily activating the red light source, red light is inherently directed to the desired positions of bands 67R on the film by the partial cylindrical lenses of the lenticular plate. Upon development of the film, red light transmissive bands will be situated on the film in the positions described above. Similarly, during the exposing process, a green light source may be positioned at the point defined by the observer's left eye 61L in FIG. 5 and following development, green light transmissive bands, alternating with the red bands, will be present on the film transparency in the desired positions as described above.

If the screen assembly 62 and the red and green light sources remain stationary during this exposing process, the resulting alternating red and green bands on the light-analyzing element assembly 66 will be extremely narrow and will be separated by sizable unexposed spaces owing to the anamorphic focusing effect of the partial cylindrical lenses 68. While this is a workable arrangement, it requires that an observer by very precisely positioned, in the transverse direction, relative to the screen assembly in use in order to properly perceive the desired image. In many instances, it is preferable that there be some tolerance to lateral movement of the observer's head. This may be provided for during the above-described exposing process by shifting the light sources laterally relative to the screen to spread out the bands of red and green exposure on the film transparency. The extent of such lateral shifting should not exceed the spacing between the two eyes of the observer who will later utilize the screen assembly, 64 millimeters being a typical value for human interocular spacing. If, for example, during exposure to red light, the red light source is initially positioned at the exact location planned for the right eye 61R of the future observer, then the light source may typically be moved as far as 32 millimeters to the right from that position and then 32 millimeters to the left from that position to spread out the red light transmissive bands which will be present on the film transparency after exposure. A similar operation may be performed during the green light exposure. This will typically provide for a lateral positional tolerance of up to about 6.4 centimeters for the observer's head during use of the screen.

The photographic process described above is one technique for producing a light-analyzing element assembly 66 suitable for use where the light from the two sources is coded by being passed through differently colored filters. An essentially similar process may be used where coding is done with polarizing filters since techniques for converting actinically exposed areas of a film transparency into polarized light filtering areas, by injection of polarizing dyes, are known to the art. Alternately, the light-analyzing element assembly 66 may be formed of two superimposed sheets of polarized filter film which have polarization planes at right angles to each other. Techniques for destroying the polarization capabilities of predetermined areas of such films by laser beam irradiation are also known to the art. Thus the areas of bands 67R may be depolarized on one of the two films by this technique while the areas of bands 67L may be similarly depolarized on the other film. Superimposing the two films at the back of the lenticular plate 64 then provides a screen assembly suitable for use in a system where light coding by polarization is utilized.

As previously pointed out, the method and apparatus of the invention may be utilized to create unique entertainment effects in theatrical or night club performances or the like and in conjunction with three-dimensional still or motion picture displays. Utility of the invention is by no means confined to the entertainment and amusement of audiences. An extremely valuable adaptation of the invention may be used to facilitate the guidance or navigation of aerial, land or sea vehicles under conditions where visibility of the real scene surrounding the vehicle is impaired or absent due to clouds, fog, darkness or other causes.

A system embodying elements of the above-described method and apparatus may be used, for example, to facilitate the instrument landing approach of an aircraft to a landing site. Basically, this is accomplished by causing the pilot to perceive, three-dimensionally, an artificial scene which may include an apparent airport, landing strip or the like and which preferably includes realistic representations of other earth surface features including a horizon line if desired. A representation of an aircraft or of some portion of an aircraft such as a cockpit windshield may also be presented in the scene which is presented to the pilot. The apparent location and orientation of the depicted airport or the like relative to the observer-pilot may be repeatedly adjusted, in response to conventional radio locator signals, on board gyro signals, and the like, to cause the artifical scene to maintain correspondence with the real scene which the pilot would perceive from his aircraft or from a point behind his aircraft while approaching a real airport under visual flight. In order to enhance realism, the airport depicted in the scene may be caused to appear to enlarge and apparently become closer as the distance of the real aircraft from the real airport decreases. The orientation of the earth's surface, horizon line or the like as depicted in the scene may be repeatedly adjusted relative to the pilot or relative to an aircraft representation in the scene, in response to conventional aircraft attitude-measuring instrument signals, to enable the pilot to visually perceive such factors as pitch, roll and yaw of the real aircraft. Visual, stereoscopically perceived representations of the location of a selected course line and also compass headings, established glide slope patterns and the like may be injected into the artificial scene and may be adjusted as necessary to conform with the real situation of the real aircraft so that the pilot may perceive any deviation of the real aircraft from desired courses and headings, and the like.

Under these conditions, the pilot is not completely dependent on interpretation of conventional instrument landing system aids. The pilot need only visually fly to the airport which appears in the artifical scene using the controls of the real aircraft. In the process the real aircraft flies to the real airport. At the final stages of an instrument landing system approach, the pilot may look out through the windshield of the real aircraft and see the real airport in the same spatial relationship to the real aircraft that exists at that moment in the artificial scene.

The artificial scene also facilitates cross-country flight with reference to ground-based radio location signals such as omni stations as a three-dimensionally perceived selected course line indication in the artifical scene may be shifted as necessary in response to such signals so that the pilot visually perceives the position of the real aircraft relative to the selected course.

Understanding of suitable structure for implementing the process outlined above will be facilitated by briefly reviewing the instruments and procedures used in conventional aircraft navigation including instrument landing system approaches. As will hereinafter be discussed in more detail, the present invention, in a preferred form, may be controlled by means of the electrical signals produced by the conventional aircraft instruments which detect and indicate course deviation, heading, attitude and other data needed by the pilot.

Referring to FIG. 7, instruments upon which a pilot relies for various purposes, including making a typical conventional precision instrument approach landing, may include an attitude gyro 69, a rate gyro 70, a directional gyro 71, a localizer-omni receiver 72, a glide slope receiver 73 and a marker beacon receiver 74, suitable detailed construction for these devices being known to the art. The data developed by these instruments is conventionally presented to the pilot through indicators mounted on the instrument panel 75 of the aircraft cabin. These may include an attitude gyro indicator 76, a turn-and-bank indicator 77, a directional gyro indicator 78, a course deviation indicator 79 and an outer marker beacon indicator lamp 81.

The attitude gyro indicator 76 receives roll and pitch angle signals from the attitude gyro 69 and typically presents this information through a movable artificial horizon line 82 which tilts relative to a fixed horizontal aircraft symbol 83 to indicate roll and which rises or drops relative to the aircraft symbol to indicate pitch. Turn-and-bank indicator 77, controlled by rate gyro 70, may include a needle 84 which deflects to the right or left to indicate the direction and rate at which the aircraft is turning. The directional gyro indicator 78, which operates from the yaw angle signals developed by directional gyro 71, may typically have an indicator card 86 which carries compass heading indicia 87 and which rotates relative to a fixed lubber's point symbol 87' and a fixed aircraft symbol 88 to indicate the actual heading of the aircraft.

Instruments 76, 77 and 78 as described above typically operate in response to gyros carried on the aircraft. The course deviation indicator 79 and marker beacon indicator lamp 81 are responsive to radio signals originating from ground stations some of which may be situated at or near an airport which may be being approached. Most current aerial navigation is based on determining aircraft position in relation to such radio broadcasting stations. En route facilities are usually visual omni ranges (VOR's) which originate directional radio signals. Receiving equipment on the aircraft compares the directional signal with a reference phase signal and from this the aircraft's azimuthal position with regard to the broadcasting station may be determined and displayed on the course deviation indicator 79.

During an instrument landing system approach, the course deviation indicator 79 is responsive to localizer radio signals which define a prescribed course to the airport. To facilitate precision approaches, broadcasting stations associated with the airport transmit four basic elements, an outer marker signal which may be associated with a non-directional locator beacon, a middle marker signal which may include the locator instead of the outer marker, a localizer signal and a glide slope signal. The locator beacon is used, ordinarily, in conjunction with an airborne automatic direction finder (ADF) and is the approach facility by which the aircraft is usually navigated to the localizer unless radar vectoring is accomplished from the ground. At the time an inbound localizer intercept is made a turn toward the airport is effected, the localizer is captured and the aircraft is flown to the outer marker following the localizer course. Approach plates available to the pilot specify various procedures, altitudes and headings for specific airports, including the altitude at which the glide slope crosses the outer marker.

To facilitate this conventional instrument landing system approach, the omni-localizer course deviation indicator 79 may include fixed marks or indicia 91 providing a reference point indicative of the lateral position of the aircraft with respect to the localizer course to the airport. A localizer needle 92, controlled by the localizer-omni radio receiving device 72, deflects to the right or left relative to the mark 91 to indicate the position of the localizer course relative to the aircraft. Course deviation indicator 79 may also include a glide slope indicator needle 93, responsive to the glide slope radio signal receiver 73, which shifts above and below mark 91 as necessary to indicate the position of the desired glide slope relative to the actual vertical position of the aircraft. Thus the instrument approach is made by maintaining the course deviation indicator needles 92 and 93 centered on mark 91. The conditions represented by the attitude gyro indicator 76 and turn-and-bank indicator 77 in FIG. 7 indicate that a descending coordinated right turn is being made as would be necessary to correct the course deviation indicated at instrument 79.

The aircraft may also be equipped with distance-measuring equipment 74 which produces a signal indicative of distance from the airport and which may be of any of various known forms. The preferred distance-measuring equipment is responsive to radio signals originated on board the aircraft and returned from a ground station but in less sophisticated systems, a signal indicative of distance from an airport may be produced on board the aircraft as a function of time or of air speed starting from a known position such as the outer marker as detected by receiver 74.

As pointed out above, suitable detailed constructions for the several attitude, heading and location fixing devices 69, 71, 72, 73 and 74 are known to the art. It is of interest relative to the present invention that such devices of known construction include electrical terminals 69' and 69", 71', 73', and 74' respectively from which DC electrical signals may be obtained which have magnitudes and polarities indicative of the data detected by the associated device and which are conventionally used in the control of an autopilot system. Such signals may also be used to control components of the present invention as will hereinafter be described.

Using the information presented by various instruments including those described above, a pilot on an instrument approach must make rapid mental solutions of geometrical problems concerning the three axes of the aircraft's attitude, roll, pitch and yaw, while relating the aircraft's attitude to its distance and lateral and vertical position relative to the earth. At this time the pilot may be flying blind toward the ground to as low as 200 feet at speeds typically varying between 70 and 185 miles per hour depending upon the aircraft type. The present invention greatly facilitates this task by providing the pilot with a realistic although artificial perception of a distant airport which may also contain current attitude information, heading information and the like.

In effect this presents some or all of the data developed by the above-described conventional instruments in a more realistic visual manner, the artifical scene being continually changed to conform with the attitude and course of the real aircraft and with the spatial position of the real aircraft relative to a real airport which is being approached. The scene may include visual indications of the localizer course, the airport and of the glide slope. The pilot may then visually fly to the depicted airport and as a result the real aircraft is brought to the real airport. This translation of the raw data from a number of sources into a three-dimensional visual image greatly reduces the possibility of misinterpretation by the pilot.

Understanding of the construction and operation of the present navigation instrument will be facilitated by first considering the end result, that is the nature of the artificial scene which is presented to a pilot by the instrument. Referring now to FIG. 8, the navigation instrument 94 may be mounted at the instrument panel 70 of the cockpit or cabin of an aircraft preferably directly in front of the pilot's position, below the windshield 96 and above the yoke or control wheel 97.

In approaching a real airport where visibility is present, the pilot may of course see the airport and the surrounding terrain by looking out through the windshield 96 and side windows 98 of the aircraft cabin. The navigation instrument 94 allows the pilot to glance slightly downward to perceive an artifical scene 99 in which an airport image 101 appears to be in the same spatial relationship to the aircraft as is a real airport which is being approached. To aid the pilot in visually sensing the attitude of his aircraft and the spatial relationship of the aircraft relative to the earth, a representation of the earth's surface 102 appears in the artificial scene and may include typical surface features such as a distant mountain range defining a horizon line 103. The earth's surface 102 image may be perceived as realistically colored, such as in green, while an apparent sky 104 appears blue and the mountain range 103 and airport 101 appear black. To indicate the heading of the aircraft, cardinal points of the compass such as the letter E for East appearing in FIG. 8 may be present in the artifical scene together with additional compass heading markings 106 in increments of 5° for example, and numerals, if desired, at the standard 30° intervals. Such heading symbols are perceived in the artificial scene as apparent signposts on horizon 103. A fixed lubber's line 107 may be present in the scene to aid in making course readings. The compass cardinal letters and lubber's line may appear in colors, such as red for example, which contrast with the background. The localizer course 108 to a real airport may be represented in the artifical scene as a line extension of the runway of the airport image 101 while the glide slope may be indicated in the scene by an additional pair of apparent lines 109 which converge and slant down towards the apparently distant airport image.

Under the conditions depicted in FIG. 8, the pilot would perceive that he is on the selected localizer course, on glide slope and the attitude and heading of the aircraft is also evident in the artifical scene. If the aircraft should be deviating from the localizer course to the airport, that condition is readily apparent visually as the airport image 101 in the artifical scene then appears to be to one side or the other of the center of scene 99 instead of being straight ahead. The apparent localizer line 108 will then appear to extend to one side or the other of the pilot. If the aircraft is above or below the glide slope, that is also readily apparent in that the pilot perceives himself as approaching the apparent airport 101 at too high or too low an elevation by reference to the three-dimensional apparent glide slope plane indicator lines 109 which will appear to extend below or above the pilot instead of being centered at his position. The attitude of the aircraft is also readily perceived in the artificial scene 99. If the aircraft is undergoing roll, the airport image 101 and the earth surface image 102 including mountain range 103 will appear inclined relative to the face of the instrument 94. Similarly the pilot may judge pitch and yaw of the aircraft by reference to the artifical scene in essentially the same manner as is done under visual flight conditions.

While the window 111 at the front of the navigation instrument 94 may be used by the pilot as a frame of reference against which to judge the orientation and distance of components of the artificial scene, the effect of flying an aircraft under visual conditions may be still further enhanced by injecting a three-dimensional apparent image 122 of an aircraft nose, cabin, windshield and side windows into the artificial scene so that the components of the scene as previously described are perceived as if viewed from an aircraft cabin, techniques for generating the three-dimensional aircraft cabin image in the scene being hereinafter described.

Thus information is presented visually in a realistic three-dimensional fashion which enables the pilot to fly towards the apparent airport 101 using the controls 97 and the like of the real aircraft. Since the apparent airport 101 is perceived as having the same spatial relationship to the aircraft as does a real airport, the aircraft is readily flown to the real airport by this technique. If the navigation instrument 94 is appropriately placed, the pilot may continue to observe through the real windshield 96 and side windows 98 of the real aircraft through his peripheral vision. At the final moments of the landing approach the pilot may simply glance up and out through the real windshield 96 to finish the landing on an ordinary visual basis or else declare a missed approach and commence climbing away from the airport.

With respect to FIG. 8, it should be understood that true three-dimensionality cannot be accurately presented in a two-dimensional drawing nor can colors be realistically indicated in FIG. 8. The depiction of the artificial scene 99 in FIG. 8 is of necessity only an approximation of what is actually perceived by a pilot using the instrument 94.

Considering now certain of the basic components of instrument 94 by which the artificial scene 99 is generated, reference should be made initially to FIG. 9A. To free the pilot from any need to wear analyzing eyeglasses, the screen 113 employed in instrument 94 is preferably of the analyzing lenticular form, with provisions for directing oppositely polarized light to separate eyes of the viewer, as previously described. To cast shadows of objects, which are to appear in the artificial scene, on the screen 113, a pair of spaced-apart light sources 114R and 114L are situated on the opposite side of the screen 113 from the pilot in spaced-apart relationship to the screen. An opaque partition 116 is situated between the two light sources 114 to prevent light from one source from reaching the other. As definition in the shadow images is increased to the extent that the actual origin areas of light at the sources can be minimized, the light sources 114 are preferably each of the form having a small helical light-emitting filament 117 and are aligned with the helical axes of the filaments directed towards the screen 113.

In order to code light from the two sources 114 in opposite manners, a right polarizing filter 118R is disposed between source 114R and screen 113 in proximity to the source while another polarizing filter 118L is similarly disposed between source 114L and the screen. The polarizing planes of the two filters 118 are oriented at right angles to each other. To impart coloration to components of the scene, color filters 115 are disposed between the light sources 114 and the polarizing filters 118. Color filters 115 in this example are of the form which preferentially transmit wavelengths in the blue regions of the spectrum.

To provide a frame of reference for the pilot when viewing the artificial scene, which is similar to that which is present when one looks out through the windshield of a real aircraft, a flat opaque mask 112A is disposed against the surface of screen 113 which faces the light sources. Mask 112A has a central opening 119 with a configuration resembling that of the windshield of an aircraft except for an upwardly bowed lower edge and has additional openings 121R and 121L on opposite sides of opening 119 which are shaped to conform with the side windows of the cabin of an aircraft. The upwardly bowed curvature of the lower edge of central opening 119 provides for the impression of looking over the nose of an aircraft so that the artificial scene will conform more closely with the real view from the pilot's position in an aircraft.

If the mask 112A is simply a flat opaque element with cutout areas to define the openings 119 and 121, then the mask is perceived two-dimensionally in the artificial scene in contrast to other components of the scene. This does not interfere with the pilot's ability to form accurate judgements about the spatial relationship of other components of the scene and is an entirely workable arrangement. However, if the added realism of a three-dimensionally perceived aircraft windshield, nose and the like is desired as a foreground for the other components of the depicted scene, as shown in FIG. 8, this may be accomplished by using techniques similar to those heretofore used for enabling three-dimensional perception, without analyzing eyeglasses, of photographed scenes.

In particular and with reference initially to FIG. 10A, an unexposed sheet of photographic film 120 may be disposed against the flat side of the hereinbefore-described lenticular plate 64 of the screen assembly. The plate 64 including the unexposed film 120 may then be positioned transversely, in darkness, behind the pilot's position in the cabin 125 of an aircraft, or a model of such a cabin, which includes a windshield opening 119 and side window openings 121. An objective lens 130 may be disposed in front of lenticular plate 64 to focus an image of the forward portion of the aircraft cabin on the plate upon illumination of the cabin.

With the plate 64, film 120 and lens 130 positioned as described above, a photographic exposure may be made by momentarily illuminating the interior of the aircraft cabin 125 while protecting the film 120 from light received from any source other than through lens 130 and plate 64.

During such exposure, image data received from lens 130 is anamorphically compressed and recorded at spaced parallel zones of the film 120 by the lenticular plate 64 as hereinbefore described. If the exposure is made with the lenticular plate and the lens 130 at the centered position P3 shown in solid lines in FIG. 10A, image data for that exposure is recorded at a narrow band behind each partial cylindrical lens 68 of plate 64 but the lateral position of the band behind each partial cylindrical lens is slightly different since light from objective lens 130 reached each partial cylindrical lens from a slightly different angle. Thus, if the partial cylindrical lens surface 68 of FIG. 10A is considered to be the centermost one on the plate 64, that is the lens surface which was transected by the optical axis of lens 130 during the above-described exposure, then a portion of the image data for that exposure is recorded at a narrow band B3 centered behind lens surface 68. However, if lens surface 68 of FIG. 10D is considered to be one which was at one side of the optical axis of lens 130 during the exposure, then image data for that exposure is not recorded at the band B3 which is centered behind the lens surface 68. Instead, the image data is recorded at some other band, such as B1, B2, B4 or B5 for example, the exact location of which depends on the amount and direction of the displacement of the particular lens surface 68 from the optical axis of lens 130 during that exposure.

A series of additional exposures are made with the objective lens 130 and plate 64 including film 120 being repositioned between each such exposure. In particular, objective lens 130 may be shifted sidewardly slightly to the position P4 in FIG. 10A, the lens 130 preferably being turned as necessary during this movement so that the optical axis remains directed at the same central point of cabin 125 as was previously the case. Plate 64 with film 120 is also shifted sidewardly in the same direction to position P4 while preferably being turned slightly to remain parallel to objective lens 130. The sideward movement of plate 64 to position P4 is sufficiently greater than that of objective lens 130 to cause the plate to be shifted relative to the optical axis of the objective lens. Consequently, when the second exposure is made from position P4, image data is recorded on film 120 behind each partial cylindrical lens surface 68 at a different area from that at which the image data for the first exposure was recorded. Thus, referring again to FIG. 10D, if image data for the first exposure was recorded at band B3 behind a particular lens surface 68 then the image data for the second exposure is recorded at a different band, B4 for example, during the second exposure.

Referring again to FIG. 10A, more exposures are made with the objective lens 130 and plate 64 being shifted to additional positions, such as P5, P2 and P1 for example, situated at both sides of the center position P3. Referring again to FIG. 10D, this enables image data for each exposure to be recorded at a different narrow band B1 to B5 behind each partial cylindrical lens surface 68 of the plate 64.

While a series of only five exposures has been depicted for purposes of example, in practice the ability of a lenticular plate to separate and laterally compress image data received from slightly different directions is such that as many as twenty exposures may typically be made without overlap of image data on the film.

The film 120 is then developed and a print is prepared and put back against the lenticular plate 64 in the exact position which was occupied by the film during the exposures. When an observer views the plate 64, one of his eyes perceives an image of the interior of the aircraft cabin taken from a first angle while the other eye perceives an image of the cabin taken from a slightly different angle owing to the optical action of the lenticular plate as hereinbefore described. Since the two different views of the cabin constitute a stereo pair as depicted in FIGS. 10B and 10C, a three-dimensional perception of the forward portion of an aircraft cabin occurs.

In order to permit perception of the 3D shadow images of the other components of the artificial scene as if viewed through the windshield and side windows of the aircraft cabin image, the portions of the developed photographic print which correspond to the windshield and side window areas of FIGS. 10B and 10C may be cut away prior to emplacement of the print against the lenticular plate 64.

Referring again to FIG. 9A, the objects which are disposed between the light sources 114 and screen 113 to cast shadows that are perceived three-dimensionally as components of the artificial scene include a flat circular earth disc 102A. Disc 102A has a circular outer edge 122 and a circular center opening 123 and is normally inclined slightly relative to a reference plane defined by the horizontal center line of screen 113 and the filaments 117 of the light sources so that the portion 124 of the disc which is closest to the light sources is normally disposed in the light path between the sources and the lower portion of the screen 113. This position of the disc is described as normal since it is the disposition which is present when the aircraft is on a linear course to an airport at the proper attitude for the approach, but the orientation of the disc relative to the screen and light sources may be changed under other conditions as will hereinafter be described.

The earth disc 102A is formed of a non-depolarizing color filter material which, in this example, is of the type that transmits wavelengths in the yellow region of the spectrum more strongly than other visible light wavelengths so that light from sources 114 when viewed through both the disc and blue filters 115 appears green as it is predominantly a mixture of the blue and yellow wavelengths. To provide a well defined horizon line in the artificial scene and to provide added realism, the outer edge 103A of earth disc 102A is irregularly scalloped and may be turned upwardly as well to create the previously described appearance of a distant mountain range in the scene. Secured to edge 103A of the earth disc at 90° spacings around the edge are symbols 126, such as elements shaped like the letters N, E, S and W, representing the cardinal points of the compass. Other letter replicas, such as NW, SE and the like or elements shaped like numerals representing compass points may be appropriately situated between the cardinal points. Degree heading markers 106A, which may be opaque pins extending a short distance outwardly from the outer edge 103A of the disc, are equiangularly spaced between the cardinal point symbols 126, typically at intervals of five degrees. To lend emphasis to the position of the cardinal point symbols 126 in the artificial scene, the symbols may be formed of a non-depolarizing translucent color-filtering material which preferentially transmits a predetermined wavelength band, such as the red band, corresponding to a color in which the cardinal points are to be perceived. If desired, the mountain range, cardinal points, heading marks and the like may all be formed on a single integral annular band which is secured to the periphery of the earth disc.

To aid in determining heading of the aircraft by inspection of the artificial scene, a fixed lubber's line symbol 107A is disposed above portion 124 of the earth disc and may have the form of an arrow pointing downwardly towards the point on the disc which is closest to the light sources. To enable the lubber's line to be readily distinguished in the artificial scene, the symbol 107A may be formed of the same non-depolarizing color filter material, such as red filter material, as are the cardinal point symbols 126.

Referring now to FIG. 11A in conjunction with FIG. 9A, the above-described earth disc 102A and associated elements create a multi-colored two-dimensional shadow pattern on screen 113 containing components which are typically seen in looking out through the windshield of an aircraft and also containing certain additional components such as the indications of compass headings, the lubber's line and the like. There are, of course, two slightly spaced-apart disparate shadow patterns of individual elements of the scene, each including right and left penumbras and in some cases umbras depending on the width and location of the element, if the screen is observed from the side at which the light sources are situated. If the lenticular screen assembly is viewed from the pilot's side, opposite from the light sources, the dual image components of the shadow pattern are integrated by the observer's biovisual system and are perceived as a three-dimensional scene in accordance with the principles hereinbefore described.

In the shadow pattern on screen 113, the irregularly scalloped edge 103A of the earth disc creates an apparent horizon line 103 appearing like a distant mountain range with the simulated distant mountain range being perceived as black since the upturned edge 103A is opaque. If edge 103A is simply scalloped without being upturned and opaque, a similar effect is created by the diffusion of light by the irregular edge. The portion of the predominantly blue light from the sources 114 and blue filters 115 which passes above the earth disc 102A creates a blue area on the screen above the apparent mountain range realistically corresponding to the appearance of sky. The portion of the originally white light which reaches the areas of screen 113 below the mountain range representation must pass through both the flue filter 115 and the yellow filtering material of the earth disc 102A and therefore appears green. Consequently those portions of the screen below the mountain range horizon line appear green corresponding to a typical appearance of the earth's surface. Shadow patterns of the compass heading markers 106A appear as darkened blue penumbra areas or in black where two penumbras overlap because of the opaque character of the markers. The shadow patterns of the compass cardinal point symbols 126 and of the lubber's line symbol 107A appear red because of the previously described filtering action.

Referring to FIG. 9A in particular, the appearance of a distant airport in the artificial scene is created by a flat replica of an airport runway 127 disposed immediately above portion 124 of the earth disc. Airport replica 127 may be formed of a transparent non-depolarizing plastic material covered with an opaque paint layer except for a series of aligned unpainted strips 127' extending along the center line of the replica to create the appearance of runway center line dash markings. As shown in FIG. 11A, the two-dimensional shadow pattern of the airport replica 127 appears within the green earth's surface area of the shadow pattern on screen 113 as right and left penumbras of darkened green with any overlapping areas of the two penumbras appearing as black umbra owing to the total blockage of light within the overlapping areas.

Referring again to FIG. 9A, the representation of a localizer or omni course line is injected into the artificial scene by a thin opaque rod 108A which extends from the end of airport replica 127 in parallel relationship to the earth disc 102A and in alignment with the runway dashes 128 of the airport replica. As the airport replica 127 together with the attached localizer-omni course line indicator 108A must be movable independently of the earth disc within a plane parallel to the disc, for reasons to be hereinafter discussed in more detail, these two elements are supported independently of the disc. This may be conveniently accomplished by securing the localizer-omni course line indicator 108A to a rotatable and translatable member 128 which extends up through the central opening 123 of the earth disc.

Referring again to FIG. 11A in conjunction with FIG. 9A, the localizer-omni course rod 108A appears in the two-dimensional shadow pattern as right and left penumbra or partially illuminated linear areas 108R and 108L extending from the right and left airport images 127R and 127L respectively in alignment therewith.

Referring again to FIG. 9A, an indication of the glide slope to the airport is created in the artificial scene by a pair of linear opaque glide slope whiskers 129 which extend from airport replica 127 towards screen 113 in a diverging relationship to each other and at an angle relative to the earth disc 102A in order to represent the glide slope along which aircraft should approach an airport. Referring again to FIG. 11A, the glide slope representations appear in the two-dimensional shadow pattern on the screen, when viewed without the analyzing lenticular screen 113, as lines converging toward the airport 127 shadow areas from each side of the artificial aircraft windshield defined by mask 112A. Each such glide slope whisker creates two spaced-apart shadow areas each of which is a partially illuminated penumbra area except in the regions where penumbra areas overlap in which case the overlapping regions appear as black umbra. When the two shadow patterns cast by each glide slope whisker are viewed through the lenticular screen and therefore integrated by the pilot's biovisual system into a single three-dimensional-appearing line extending toward the apparent distant airport, the three-dimensional lines jointly define a sloping plane in the artificial scene representing the glide slope which the real aircraft is intended to follow. If these glide slope lines in the artificial scene appear to extend above the windshield in the scene, the pilot immediately recognizes that the real aircraft is below glide slope and that corrective action must be taken. Similarly if the glide slope lines in the scene appear to extend below the windshield of the scene it is immediately recognizable that the real aircraft is above the prescribed glide slope. As herein arranged, departures from the apparent glide slope appear exaggerated in the artificial scene and that is advantageous as it encourages prompt corrective action by the pilot.

The two-dimensional shadow pattern on the screen and the structures which create the shadow pattern have been described above and depicted in FIGS. 9A and 11A as being in the positions and orientations which exist when the aircraft in which the instrument is used is approaching a real airport in straight flight on a prescribed approach course and under conditions where roll, pitch and yaw of the aircraft are normal for the approach but the aircraft is below glide slope. In other words, when viewing the shadow pattern depicted in FIG. 11A through the lenticular screen 113 so that the two-dimensional shadow pattern is integrated by the pilot's eyes and brain into a three-dimensional image of a distant airport, horizon line and the like, the pilot would perceive that the only corrective action needed at the moment is to decrease the rate of descent.

Referring again to FIG. 9A in particular, mechanisms which will be hereinafter described continually adjust the orientation and positions of the earth disc 102A, airport replica 127, localizer-omni course line indicator 108A and, under certain conditions, glide slope whiskers 129 in response to signals obtained from the previously described on-board instruments so that the artificial scene perceived by the pilot always conforms with the real situation of the real aircraft relative to a real airport or other navigational facility. Thus if the aircraft instruments detect a roll, all of the above-described elements on or associated with the earth disc 102A are correspondingly tilted, relative to the light sources 114 and the screen 113, about an axis substantially normal to the screen to the extent necessary to maintain a correct representation in the artificial scene. Under that condition the various components of the two-dimensional shadow pattern on screen 113, such as the mountain range horizon line 103 and the airport shadow patterns 127, appear tilted relative to the aircraft windshield opening 119 representation at the screen just as the corresponding real elements would appear to the pilot during a roll if such components of the real scene were visible through the real windshield of his aircraft. Similarly, if a change of pitch of the real aircraft occurs, the light sources 114 are raised or lowered. Alternately, the earth disc 102A and abovedescribed shadow-creating elements could be tilted about an axis parallel to the screen as necessary to maintain correspondence with the real situation of the aircraft. Either action causes components of the shadow pattern on screen 113, such as the horizon line mountain range 103, the airport shadow patterns 127 and the like, to rise or fall relative to the windshield 119 depicted in the scene similar to what occurs when looking through the real windshield of an aircraft under similar conditions.

If the aircraft directional gyro detects a change of heading, the earth disc 102A and airport replica 127 including localizer-omni course line rod 108A are appropriately rotated to bring the new compass heading indication symbols 106A and 126A into coincidence with the lubber's line indicator 107A and thus a corresponding change appears in the artificial scene.

FIG. 11B, basically similar to FIG. 11A, illustrates the changed appearance of the two-dimensional shadow pattern on the screen 113 which occurs if the real aircraft should be above glide slope and to the left of the localizer course during an instrument landing with corrective actions underway in that the aircraft has been banked in order to execute a descending right turn.

The appearance of the shadow image has been described above and depicted in FIGS. 9A, 11A and 11B as it would appear if the analyzing lenticular screen were absent, in view of the impossibility of realistically depicting a three-dimensional perception in a two-dimensional drawing. It should be kept in mind that the components of the scene as perceived by the pilot through the analyzing lenticular screen appear to be at varying distances, as better indicated in FIG. 9B, and that the dual shadow patterns of various elements which are evident in FIGS. 9A, 11A and 11B are not perceived as such but are combined into a single perception of each element as hereinbefore described.

Prior to considering the mechanisms which are used to manipulate the earth disc 102A and associated elements to achieve the results described above, the effects of reverse perspective and techniques for correcting a form of optical distortion which can otherwise be present should be understood. FIG. 12A is a diagrammatic view of the slightly tilted earth disc 102A as it would appear from the point of view of the pilot in the absence of the other elements of the present invention, wherein rectangular grid lines have been drawn on the surface of the disc for purposes of comparison with FIG. 12B which illustrates the effects of reverse perspective. It should be understood that the grid lines which appear in FIGS. 12A and 12B are not actually present on the earth disc in use and are shown in these Figures only as an aid to understanding perspective effects in the system.

FIG. 12A thus represents the disc 102A as viewed under conditions where perspective effects are normal. The portion of the disc closest to the viewer appears enlarged relative to the more distant portions of the disc, as may be seen by comparison of arrows 131A and 131B. Both arrows actually extend across equal distances on the disc, but in normal perspective the more distant arrow 131B appears shorter than arrow 131A which extends across a closer portion of the disc. Similarly, although the rectangular grid lines shown in FIG. 12A define squares of equal area, the squares appear increasingly foreshortened as distance from the viewer increases and those squares closer to the viewer appear to be of greater breadth. Central opening 123 appears to be situated more closely to the rear edge of the disc than to the closer edge although it is actually centered on the disc.

For reasons hereinbefore described, reverse perspective in a shadow-casting arrangement, such as the present navigation instrument, causes these normal perspective effects to be inverted, as illustrated in FIG. 12B, as far as perception of the shadow image 102 of the disc in the present invention is concerned. Portions of the disc image 102 which are perceived as being closest to the viewer because of eye convergence, such as the portion crossed by arrow 131A', appear smaller than portions of the disc image, such as that crossed by arrow 131B', which are perceived as being more distant from the viewer. The central opening 123' of the disc image 102 appears to be closer to the near-appearing edge of the image than to the more distant-appearing edge. The squares defined by the grid lines, which actually occupy equal areas of the disc, appear to increase in size as they apparently become more distant. Grid lines which appeared to converge under the normal perspective shown in FIG. 12A appear to diverge under reverse perspective, as shown in FIG. 12B. Owing to these several effects, one may tend to get the impression at first that FIG. 12B is a view of the underside of the disc. It should be understood that FIG. 12B is a reverse perspective image of the same upper surface of the tilted disc that is shown in FIG. 12A.

This perception of the image of the disc 102A in reverse perspective does not detract from realism in the artificial scene of the present invention and, in fact, has certain structural and functional advantages. For example, since it is only the more distant portion of the disc, beyond central opening 123, which creates the shadow image of the earth surface that is seen by the pilot, and since this portion of the disc appears relatively enlarged by the reverse perspective effect, a relatively smaller earth disc may be utilized than would be the case if it were to be perceived under normal perspective effects. Also, the apparent relative enlargement of the more distant portions of the disc image under reverse perspective tends to reduce the apparent curvature of the upper edge 132 of the disc as perceived in the image. This flattening effect, combined with the fact that only a limited middle portion of the edge of the disc is imaged, causes the artificial horizon line in the depicted scene to appear almost flat in conformity with reality.

In contrast to the earth disc 102A, certain other elements of the depicted scene might appear to be distorted because of reverse perspective effects in the absence of corrective measures. If airport replica 127 were rectangular in correspondence with a typical real airport runway, the far end of the apparent runway would seem to be of greater width in the image than would the near end in contradiction to realism. This effect may be eliminated by forming the airport replica 127, which creates the shadow image of an airport, to have a far end which is of less breadth than the near end, i.e., the replica 127 is not made rectangular but tapers to the extent necessary to counteract the effects of reverse perspective in the imaging process.

Considering now another optical distortion which can be present and which it is usually desirable to correct, reference should be made initially to FIG. 13A. If the airport replica 127 and localizer course line 108A are aligned along the diameter of earth disc 102A which lies in a vertical plane normal to screen 113, then the shadow images 101 and 108 of these elements as cast upon the screen 113 appear undistorted. (Only a single light source 112 and single umbra shadow 101-108 are shown in FIGS. 13A, 13B and 13C, to avoid unnecessary complication, as it is not necessary to consider the dual shadows to understand the optical distortion under discussion.) If the airport replica 127 and attached localizer course line rod 108A are then shifted sidewardly on earth disc 102A to the position 127A-1, 108A-1 shown in FIG. 13A, at which such elements remain parallel to their original positions, then the two-dimensional shadow image on the screen shifts to the position 101-1, 108-1 which is distorted by being inclined relative to the former, vertical shadow position. FIG. 13B illustrates how the optical distortion described above may be compensated for, when objects are moved relative to disc 102A, to maintain realism in the image. In particular, as the airport replica 127 and attached localizer course line rod 108A are shifted to the observer's right in the manner described above, such elements may also be turned counterclockwise to the extent necessary to maintain the two-dimensional shadow image 101-2, 108-2 in parallel relationship with the original shadow image position 101, 108 on screen 113. For similar reasons, if the replica 127 and localizer course rod 108A should be shifted to the left, as viewed in FIG. 13A, then an accompanying clockwise rotation of such elements may be employed to eliminate distortion in the shadow image.

If the airport replica 127 and attached localizer-omni course line rod 108A are at the sidewardly shifted positions 127A-2, 108A-2 depicted in FIG. 13B and the earth disc 102A together with the replica and course line rod is then rotated 180° so that the airport replica and localizer-omni course line rod arrive at positions 127A-3, 108A-3 as depicted in FIG. 13C, a still greater angular distortion is introduced into the shadow image on screen 113, as shown at 101-3, 108-3. The reason for this is that the compensatory turning of the replica 127 and localizer course line rod 108A must be in an opposite rotational direction when such elements are displaced to one side of the central plane of the system as opposed to the compensatory turning when such objects are displaced to the other side.

If the airport replica and localizer course line are aligned parallel to screen 113, such elements may be moved toward the screen or away from the screen without apparent distortion.

Thus, in general, the compensatory turning of the airport replica 127 and attached localizer-omni course line rod 108A should be counterclockwise while such elements are being displaced to the right of the central vertical plane as viewed in FIGS. 13A, 13B and 13C, and should be clockwise when such elements are being displaced to the left of the center plane. The rate of such compensatory turning should increase as the distance of the replica and course line rod from the center position increases. Further, the amount of such compensatory turning which is required is dependent, in addition to the factors discussed above, on the angular relationship of the airport replica and localizer course line rod relative to the screen, the required compensatory turning being greater when such elements are aligned normal to the screen and being zero when such elements are parallel to the screen. Mechanisms which control the amount of compensatory turning, if any, as the airport replica 127 and localizer course line rod 108A are shifted about will be hereinafter described.

Figure 14A:
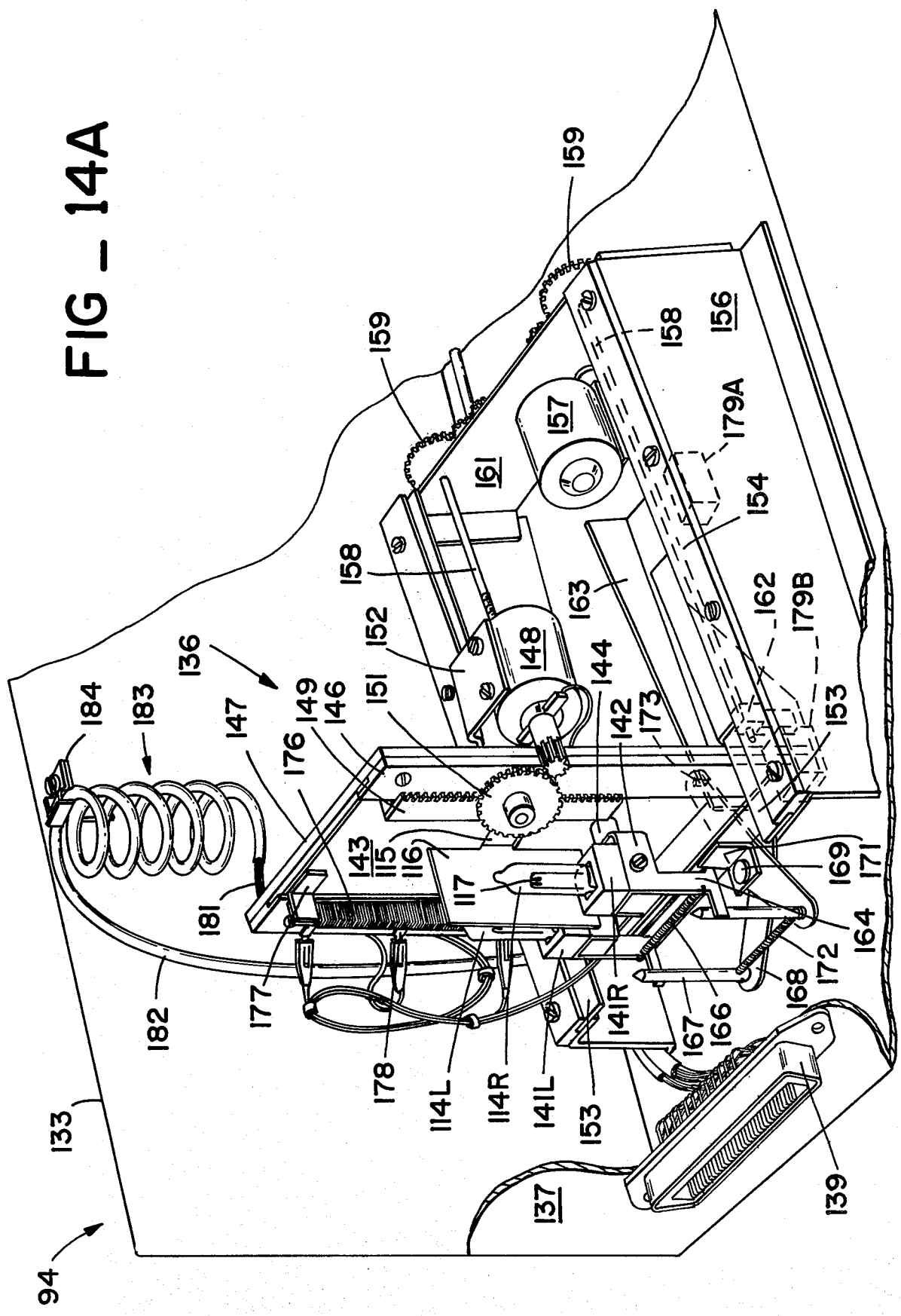
Figure 14B:
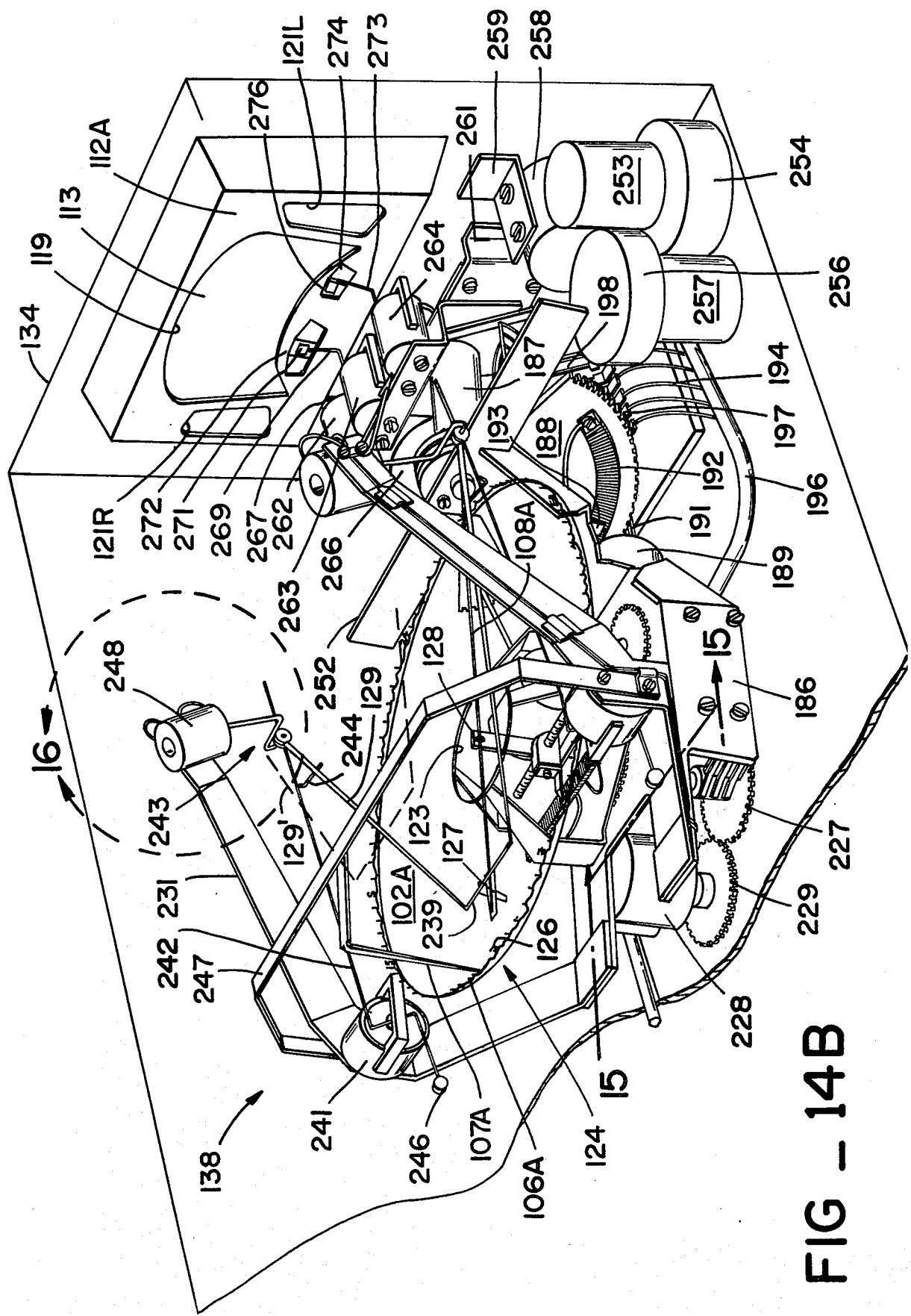

Considering now suitable detailed mechanisms for supporting and manipulating the earth disc 102A, airport replica 127 and other components which contribute data to the depicted scene in the navigation instrument 94, reference should be made to FIGS. 14A and 14B, which may be joined end to end to form a single continuous broken-out perspective view of a first embodiment of the navigation instrument 94.

Components of the navigation instrument 94 may be contained within a rectangular housing 133 which may be installed in the cockpit or cabin of the aircraft so that a face end wall 134 is nearest the pilot as previously depicted in FIG. 8. Returning again to FIGS. 14A and 14B, the previously described analyzing lenticular screen assembly 113 including mask 112A is secured at an opening in end wall 134.

A light source assembly 136 is situated within housing 133 near the opposite end wall 137 and an image component assembly 138 is disposed at an intermediate portion of the housing between the light source assembly and the screen 113. A multi-pin electrical connector 139 may be mounted on end wall 137 in order to transmit operating power and electrical control signals to the internal components of the instrument as will hereinafter be described in more detail.

In this example of the navigation instrument 94, the right and left light source lamps 114R and 114L are movable in three essentially orthogonal directions to provide for changing the apparent location and orientation of objects depicted in the shadow image in order to maintain correspondence of the artificial scene with the real situation of the aircraft. As the rear aircraft approaches a real airport, the symbolic airport depicted in the image appears to enlarge inasmuch as the light sources 114 are moved towards screen 113 while at the same time the separation of the two light sources is decreased. This causes the two-dimensional penumbra shadow areas of objects such as airport replica 127 on screen 113 to enlarge and move closer together. Owing to the increasing size and the increasing convergence of the pilot's eyes in focusing on the airport shadow image, the pilot perceives himself as approaching the depicted airport.

Light source assembly 136 also provides for joint movement of the light sources 114 in a vertical direction so that the apparent pitch of the symbolic aircraft represented in the depicted scene may be adjusted to correspond with reality. If the light sources 114 are raised, the level of the horizon line image formed by the edge 124 of earth disc 102A is lowered on screen 113 while if the light sources are lowered the level of the apparent horizon line in the depicted scene rises on screen 113.

Considering now a suitable detailed construction for the light source assembly 136 to provide for such movements, with reference to FIG. 14A in particular, each source 114 is mounted in a socket 141 which is in turn supported by an associated one of a pair of pivotable brackets 142. Each bracket 142 is attached to a plate 143 through a pivot coupling 144, the rotational axes of the pivot couplings being normal to screen 113. As the effective origin points of light in the sources 114 are the ends of the helical lamp filaments 117, pivoting of the support brackets 142 in one direction will move the two origin points of light apart while pivoting of the support brackets in the opposite direction draws the two light origin points closer together.

Plate 143 is disposed transversely within housing 133 in front of light sources 114 and carries the opaque partition 116 which optically isolates one light source from the other. Coding and coloring filters 115 are secured in openings in plate 143 in front of the filaments 117 of the light sources to oppositely polarize light from each source and to initially impart a blue coloration to the light which is transmitted towards the image component assembly and the screen.

To enable the above-described vertical movement of the light sources, plate 143 is vertically movable, the opposite side edges of the plate being received in vertically extending guide tracks 146 secured to a rectangular frame member 147. Plate 143, carrying the light sources 114, may be controllably raised and lowered relative to frame 146 by an electrical pitch servomotor 148. A vertically extending toothed rack 149 is secured to plate 143 and coupled to servomotor 148 through a compound pinion gear 151 which is itself journaled on frame 147. Servomotor 148 may be secured to frame 147 by suitable bracket 152. Thus the light sources may be raised by operation of the pitch servomotor in one direction and may be lowered by operating the servomotor in an opposite rotational sense.

Frame 147, together with the light sources 114, servomotor 148 and the other above-described structure attached to the frame, is slidable in a forward and backward direction within housing 133. For this purpose, frame 147 is secured to slider members 153 which are received in guide tracks 154 that are attached to the floor of housing 133 through brackets 156. Guide tracks 154 and slider members 153 slant upwardly towards the face or screen end of housing 133 so that as the light sources are moved forward or backward relative to the image component assembly 138, the level of the horizon line shadow image formed by the adjacent edge of earth disc 102A on screen 113 remains constant insofar as the effects of the forward and backward movements of the light sources are concerned. To accomplish the forward and backward movement of the light sources, a distance motor 157 is mounted on the floor of the housing 133 and drives a pair of lead screws 158 through coupling gears 159 supported on a cross member 161 extending between brackets 156. Each lead screw 158 engages one of a pair of threaded follower blocks 162 secured to an associated one of the slider members 153. Thus operation of distance motor 157 in one rotational sense acts through lead screws 158 to draw the light sources 114 closer to screen 113 while opposite operation of the motor retracts the light sources away from the screen and objects depicted in the image scene are thereby caused to appear closer or more distant according to the direction of such movement.

Considering now the provisions for decreasing the separation of light sources 114 as the light sources are moved toward screen 113 and for increasing such separation when the sources are moved away from the screen, a tapered element 163 is secured to the floor of the housing between brackets 156, the tapered element being of progressively increasing width towards the back or screen end of the instrument. Each light source mounting bracket 142 has a downwardly directed extension 164 and a tension spring 166 is coupled between the two extensions. Spring 166 urges the extensions towards each other and thereby tends to pivot the light sources about couplings 144 in a direction tending to increase the separation of the two light sources. This action of spring 166 is resisted by a pair of vertically extending rods 167 which are contacted by the extensions 164. Each rod 167 is secured to the end of an associated individual one of a pair of crossed scissor elements 168 which are in turn pivoted together at a pivot coupling 169 that is secured to frame 147 by a bracket 171. Another tension spring 172 is connected between the two rods 167 to urge the two rods and scissor elements 168 together. One of a pair of short pins 173 extends downwardly from the opposite end of each scissor element 168 and rides against one side of tapered element 163.

Accordingly, as frame 147 including the light sources 114 and other structure carried on the frame, is moved towards the face or screen end of housing 133, tapered element 163 forces pins 173 further apart. This increasing separation of pins 173 is transferred to rods 167 through the scissors elements 168. The increasing separation of rods 167 acts to pivot light source mounting brackets 164 about couplings 144 to cause the filaments 117 of sources 114 to move closer together. Upon movement of frame 147 in the opposite direction, away from screen 113, a reverse action occurs which progressively increases the separation of the light sources.

To provide a feedback signal for the pitch servomotor 148 for purposes to be hereinafter discussed in more detail, a linear resistive element 176 of a potentiometer is secured to the vertically movable plate 143 by suitable brackets 177 to undergo vertical movement with the light sources. The variable voltage tap 178 of the potentiometer is mounted on frame 147. Thus the point of contact of tap 178 with resistive element 176 changes as the vertical position of plate 143 and the light sources is changed relative to frame 147. In order to stop motion of the light sources towards the screen and away therefrom at the limits of such travel, limit switches 179A and 179B are secured to bracket 156 in position to be contacted and operated by follower block 162 at the limits of travel. Electrical connections to the limit switches 179 will be hereinafter described.

In order to accommodate to the above-described motions which occur within the light source assembly 136, the electrical connections between multi-pin connector 139 and the light sources, potentiometer 176-178, and servomotor 148 are made through conductors 181 of a flexible multi-conductor cable 182 which may have a loosely coiled portion 183 disposed between a bracket 184 at the top of housing and frame 147.

Referring now to FIG. 14B in particular, a suitable detailed construction for the image component assembly 138 may include a base bracket 186 supported through a pivot coupling 187 which is attached to the face or screen end of housing 133. The rotational axis of pivot coupling 187 slants upwardly towards the opposite or light source end of the housing in alignment with the tilted earth disc 102A and in parallel relationship to the sidewalls of the housing. This enables the base bracket 186 and all components carried thereon including the earth disc to be pivoted about an axis extending towards screen 113 so that the apparent horizon line and other features in the depicted image may be tilted from side to side, relative to the apparent aircraft windshield symbolized by mask opening 119, in order to depict roll of the real aircraft in which the instrument is used. To control the angular movement of base bracket 186 for this purpose, in response to signals from the aircraft's attitude gyro, a gear sector 188 is attached to the base bracket 186 and is engaged by the output gear 191 of a roll servomotor 189 which is attached to the floor of housing 133.

To provide a feedback signal for roll servomotor 189 for purposes to be herinafter discussed in more detail, an arcuate resistive element 192 of a potentiometer is disposed on gear sector 188 while the variable voltage tap 193 of the potentiometer is secured to the base of housing 133 to ride along the resistive element as the gear sector is turned by the servomotor.

To provide for electrical connections to servomotor 189, potentiometer 192-193 and the other electrically operated components to be described which are carried on the movable portion of the image component assembly 138, individual conductors 194 of a multi-conductor cable 196 from the multi-pin connector 139 each connect with one of a series of contacts 197 which ride against arcuate movable contacts 198. Contacts 197 are attached to the housing through insulative means while arcuate contacts 198 are attached to the gear sector 188, also through insulative means, to pivot with the gear sector.

Figure 15:
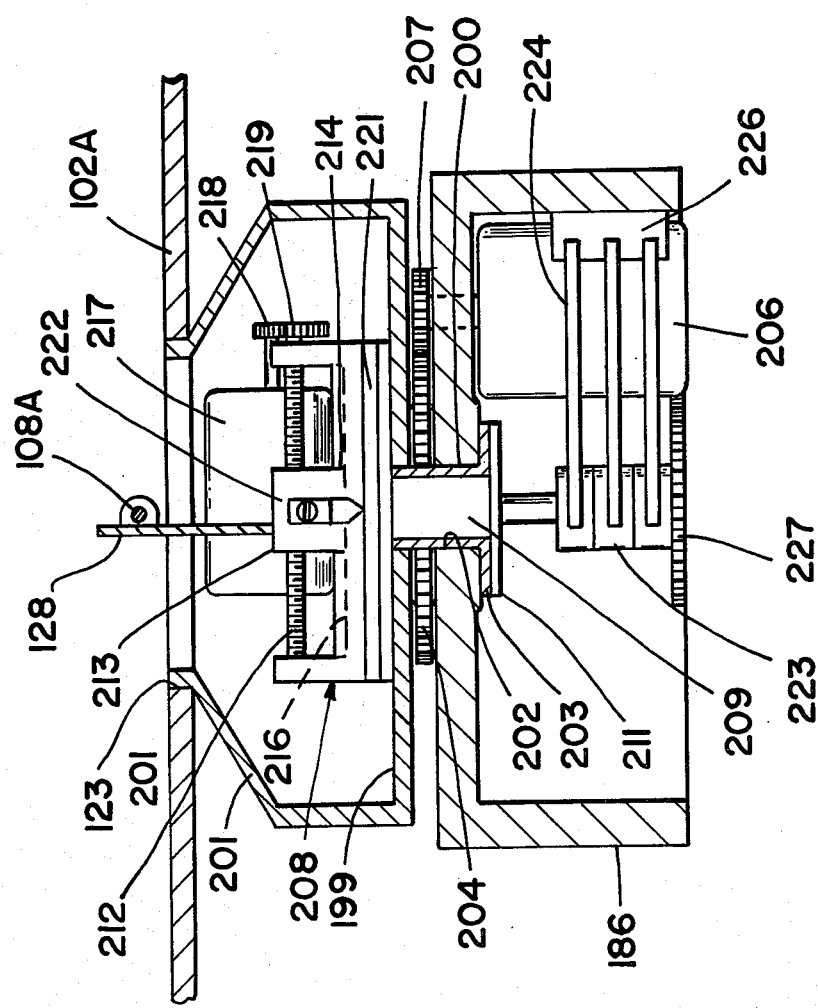
FIG. 15 is a cross section view taken along line 15—15 of FIG. 14B and further clarifying the structure of certain components shown therein.

Earth disc 102A is supported on base bracket 186 to undergo the above-described sideward tilting movement with the base bracket while being controllably rotatable relative to the base bracket so that the particular one of the course heading symbols 106A or cardinal point symbols 126 which is indicative of the course of the aircraft at any given time may be brought into coincidence with the lubber's point line symbol 107A in response to signals from the directional gyro of the aircraft. Referring now to FIG. 15 in conjunction with FIG. 14B, earth disc 102A is attached to base bracket 186 through a rotatable plate 199 having angled fingers 201 which extend upwardly to connect to the earth disc at angularly spaced-apart points around the central opening 123 of the disc. Plate 199 is in turn supported by a tubular rotatable shaft 200 which extends downward through a bore 202 in the base bracket 186 and which has a flange 203 at the underside of the base bracket in order to secure the plate and earth disc in place while allowing angular movement of such elements relative to the base bracket.

To controllably rotate the earth disc 102A in response to aircraft directional signals, a gear 204 is secured coaxially on the tubular shaft 200 between plate 199 and the base bracket 186 and is driven by a directional receiver synchro 206. Synchro 206 may be secured to the base bracket 186 and has an output gear 207 engaged with gear 204.

As previously described, the airport replica 127 and the attached localizer-omni course line rod indicator 108A are situated immediately above the earth disc 102A in parallel relationship with the disc so that the images of such elements in the depicted scene appear to lie upon the surface of the earth. The translatable member 128 which supports replica 127 and course line indicator rod 108A extends upward through the central opening 123 of the earth disc. To maintain realism in the depicted scene, both the airport replica 127 and course line rod must turn when the earth disc 102A is turned as the aircraft undergoes a turn. However, as previously described with reference to correction of a potential optical distortion in the system, the amount of turning of the airport replica and course line rod needed to reflect a change of aircraft course may differ from the turning of the earth disc itself depending on the angular and lateral position of the replica and course line rod at the particular time. Thus, the rotational movement of translatable member 128 must be arranged for by means which are mechanically independent of the means which rotate the earth disc itself. In addition, the airport replica 127 and course line rod 108A must be movable in a direction parallel to the screen assembly 113, independently of earth disc 102A, so that the depicted scene may be caused to accurately correspond to a situation where the real aircraft is situated to one side or the other of a localizer or omni course line. Suitable means for supporting the airport replica and course line rod to provide for these movements may best be understood by referring again to FIG. 15 in conjunction with FIG. 14B.

A support member 208 is disposed immediately above earth disc support plate 199 and is held in place by a tubular axle shaft 209 which extends downward through the shaft 200 which supports plate 199. An annular snap ring 211 disposed coaxially on axle shaft 209, immediately below flange 203 of shaft 200, holds the support member 208 in place while allowing rotation of the support member and elements carried thereon independently of rotation of the earth disc support plate 199.

Support member 208 journals a transverse lead screw 212 upon which a slider block 213 is threadably engaged so that rotation of the lead screw shifts the slider block transversely within the instrument. A guide projection 214 extends downwardly from slider block 213 into a transverse slot 216 on the upper surface of support member 208 to prevent rotation of the slider block with the lead screw. Translatable member 128, which carries the course line rod 108A and the airport replica 127, extends upwardly from slider block 213 through the central opening 123 of the earth disc enabling such elements to be moved transversely by rotating the lead screw 212.

To drive lead screw 212 a Loc/Omni servomotor 217 is secured to support member 208 and has an output gear 218 engaged with a lead screw drive gear 219 at the adjacent end of lead screw 212. To provide a feedback signal for servomotor 217, a linear resistive element 221 of a potentiometer is disposed transversely on support member 208 while the variable voltage tap 222 of the potentiometer is insulatively mounted on slider block 213 to ride along the resistive element as the slider block is translated by turning of the lead screw. The electrical connections to servomotor 217 and potentiometer 221-222 are made through slip rings 223 disposed coaxially on the lower portion of shaft 209 and sliding contacts 224 which ride against the slip rings and connect with a terminal block 226 mounted on base bracket 186.

To rotate support member 208 in order to control the angular orientation of the localizer-omni course line rod 108A and attached airport replica 127, a gear 227 is coaxially secured to the lower end of shaft 209. Referring now to FIG. 14B in particular, a course receiver synchro 228 is mounted on base bracket 186 and has an output gear 229 engaged with gear 227. Operation of synchro 228 in reponse to signals from the aircraft directional gyro, as corrected to avoid optical distortion through means to be hereinafter described, thus changes the apparent orientation of the airport and course line in the depicted scene as necessary to conform with reality.

Referring again to FIG. 14B in particular, glide slope whiskers 129 are supported through a pair of angled arms 231 which extend upward from base bracket 186 at opposite sides of the earth disc 102A and which have upper portions inclined in the direction of the screen end of the instrument. The glide slope whiskers 129, when in the active position, slant upward from each side of airport replica 127 in the direction of screen 113 and also diverge in the same direction. A cross member 239 connects the ends of the whiskers which are at each side of the airport replica so that the two whiskers are formed by a single integral angled rod-like element. To counteract the effects of reverse perspective as previously discussed, the glide slope whiskers 129 may be formed to be of progressively diminishing diameter towards the airport replica.

The inclination of glide slope whiskers 129 relative to earth disc 102A must be adjustable to convey to the pilot a visual indication of the vertical position of his aircraft relative to the actual glide slope to an airport which is being approached. It is also desirable to be able to eliminate the glide slope depiction from the image scene under certain conditions, such as when the receipt of faulty glide slope signals is detected, or if the pilot selects a mode of operation which does not involve glide slope data. Considering now the means which support and manipulate the glide slope whiskers 129 for these purposes, one of a pair of ratiometers 241 is secured to each angled arm 231 with the rotational axes of the two ratiometers being aligned with each other along an axis defined by the cross member 239 of the glide slope whiskers when the glide slope is in the above-described active position. The output shaft of each ratiometer 241 carries an associated one of a pair of long needles 242. Each needle 242 extends to a pivot coupling 243 at which the upper end of the adjacent one of the glide slope whiskers 129 is pivotably coupled to the needle. A support bar 244 attached to each needle 242 near the adjacent pivot coupling 243 extends under the adjacent portion of the glide slope whisker 129 to limit downward pivoting of the glide slope whisker about the axis of the pivot couplings 243 at the point where cross member 239 is immediately above airport replica 127 without being in actual contact with the replica.

As the glide slope whiskers 129 are supported by the ratiometer needles 242, the inclination of the whiskers relative to earth disc 102A may be selectively adjusted by transmitting appropriate electrical signals to ratiometers 241 through means which will be hereinafter described.

To counterbalance the torque exerted on ratiometers 241 by the weight of the glide slope whiskers 129 and the long ratiometer needles 242, a counterweight 246 may be carried on the end of each needle which is remote from pivot coupling 243. Lubber's line symbol 107A may be supported above the center of the uppermost edge 124 of the earth disc by a bracket 247 which extends between support arms 231 at a sufficient distance above the earth disc that the bracket is not shadow-imaged on screen 113.

Figure 16:
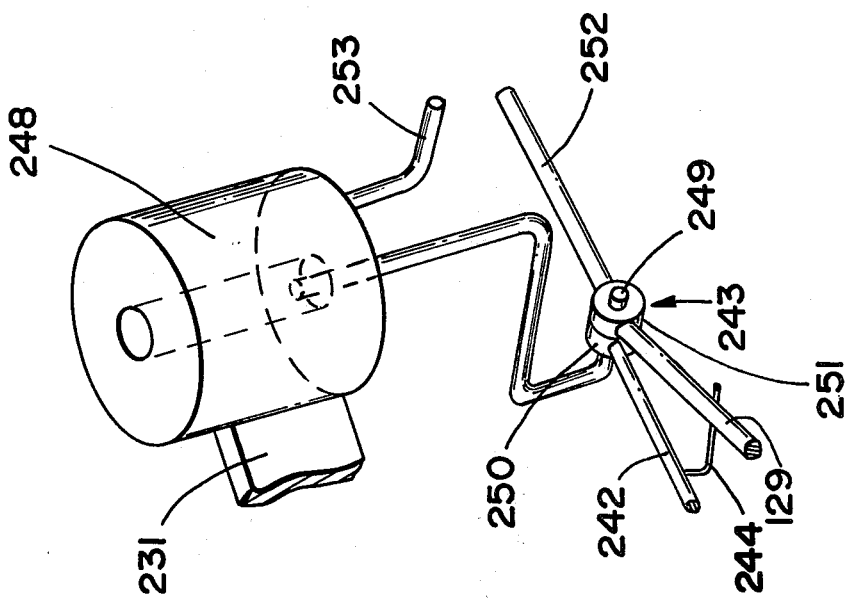
FIG. 16 is an enlarged view of the area of FIG. 14B enclosed by dashed line 16 thereon.

To provide for raising the glide slope whiskers 129 sufficiently to remove the glide slope depiction from the imaged scene, one of a pair of cylindrical solenoid coils 248 is secured to the upper end of each support arm 231. Referring now to FIG. 16 in conjunction with FIG. 14B, the pivot coupling 243 which couples each glide slope whisker 129 to the associated ratiometer needle 242 is formed by the lower end of a solenoid core rod 249 which extends through a first eyelet 250 at the upper end of needle 242 in a press-fitted non-pivoting relationship therewith and through an adjacent eyelet 251 near the upper end of the glide slope whisker 129 with a loose fit which enables pivoting. Thus the lower end of each rod 249 constitutes the pivot axis of the pivot coupling 243 which attaches the adjacent glide slope whisker 129 to the adjacent ratiometer needle 242.

The upper portion of each core rod 249, which is formed of a ferromagnetic material such as iron, is angled in order to extend upwardly into the lower end of the adjacent solenoid coil 248 when the glide slope whisker assembly is at the above-described lowered or active position. By electrically energizing coils 248, core rods 249 may be drawn upwardly into the coils to raise the pivot couplings 243. This action of coils 248 is sufficiently strong to override the force of the ratiometers 241 which tends to hold the pivot couplings 243 at a lower position.

Glide slope whiskers 129 have extensions 252 which project a short distance beyond the pivot couplings 243 and an angled stop element 253 is secured to the end of each support arm 231 in position to be contacted by the adjacent glide slope whisker extension 252 when the core arms 249 have been partially drawn up into solenoid coils 248. This causes the final portion of the upward movement of the core arms 249 to pivot the glide slope whiskers 129 upwardly, about pivot couplings 243, to the elevated position depicted by dash line 129' in FIG. 14B. At that elevated position the glide slope whiskers are above the region which is shadow-imaged on screen 113. Accordingly, the glide slope depiction may be removed from the imaged scene by energizing coils 248.

Referring now again to FIG. 14B in particular, mechanism has been hereinbefore described for tilting the entire image component assembly 138 about the axis of the supporting pivot coupling 187 so that any roll of the real aircraft may be accurately represented in the depicted scene. This sideward tilting of the earth disc 102A results in raising of one side of the earth disc relative to the light sources and screen 113. As the roll of the real aircraft increases, a point may be reached at which a side region of the earth disc and even one side of the central opening 123 of the disc might be elevated sufficiently that these portions of the disc could be shadow-imaged on screen 113, in the absence of corrective measures, and thereby detract from realism of the depicted scene as perceived by the pilot. To avoid this effect, a transverse linear opaque element 252 may be secured to base bracket 186 to extend across the optical path along which shadow images of the adjacent portions of the earth disc, including the area of central opening 123, might otherwise be imaged on screen 113 in the presence of extreme sideward tilt of the disc. Thus, at most, a slanting black area may appear at one lower corner of screen 113 in the presence of extreme roll of the real aircraft. A dark area of this kind in a lower corner of the image does not significantly interfere with the pilot's perception of the scene. Opaque member 252 is not needed for this purpose in instruments where the earth disc 102A can be made larger in relation to the screen 113 than is the case in the present example but this adds substantially to the bulk of the instrument 94 and may often be undesirable where the instrument must be installed in the crowded cockpit region of an aircraft.

Additional components utilized to control the several servomotors described above or to present additional information to the pilot within the context of the artificial scene are disposed within housing 133 near screen assembly 113. These include a comparator repeater synchro 253 of the differential type and a polarity-reversing potentiometer 254 secured at a corner of the housing, near the screen end in this example, an imbalance adjuster 256 and another differential synchro 257 which may be disposed in the same region of the housing. The detailed constructions, interconnections and functions of these devices will be hereinafter described with reference to the electrical circuit of the instrument.

A course selector synchro 258 of the differential type is secured to the face end wall of the instrument below screen 113 by a suitable bracket 259 while another bracket 261 secures a course deviation indicator meter coil 262, a TO/FROM meter coil 263, and a LOC/OMNI meter 264 to the same wall of the instrument below the screen. An omni bearing selector 266 is also mounted on the housing wall below screen 113, the rotational axes of the synchros, meters and bearing selector 258, 262, 263, 264 and 266 all being normal to the adjacent wall of the instrument.

The course deviation indicator meter coil 262 may be of the conventional known construction which responds to signals from the localizer/omni radio signal receiver of the aircraft by deflecting a needle 267 in either direction from a centered position to indicate when the aircraft is left or right of a selected localizer or omni course. Referring now to FIG. 17 which shows the face of the instrument 94 as seen by the pilot, the needle 267 is visible to the pilot through a transparent window 268 situated below screen 113. The information presented by course deviation indicator needle 267 is also presented visually in the depicted image by the course line indication in the image and thus the safety of redundancy is added by making the indicator needle of the meter visible on the face of the instrument below the depicted scene.

Referring again to FIG. 14B, to TO/FROM meter coil 263 may also be of the known construction which responds to visual omni range signals from ground radio stations by signaling passage over the selected omni station. The TO/FROM meter coil has an arm 269 carrying a transparent or translucent flag 271 which has one end marked "TO", another end marked "FROM" and a center marked "OFF" or "INVALID". Upon passage over the radio transmitting station, coil 263 reverses the position of arm 269. In the present example of the navigation instrument, this TO/FROM indication is injected into the context of the depicted scene. This is accomplished by cutting away a portion of mask 112A below the opening 119 which defines an apparent aircraft windshield in the depicted scene to form a small window 272 in the mask at the position which is occupied by the "TO" portion of flag 271 when the aircraft is in the reciprocal area of a selected radial of the omni signal source. Upon passing the omni signal source, meter coil 263 turns arm 269 to bring the "FROM" portion of flag 271 into coincidence with window 272A. Referring again to FIG. 8, this causes a small TO/FROM indicator window 272 to be perceived by the pilot in the depicted image 112 of an aircraft cabin.

Referring now again to FIG. 14B, if the aircraft overpasses a directional signal source such as an airport at which VOR signals are originated, due to a missed landing or for other reasons, maintenance of reality in the depicted scene requires that the apparent airport in the scene be eliminated, although it is usually desirable that the selected course line of the aircraft continue to be depicted in the scene. For this purpose the signals which operate the TO/FROM meter coil 263 are utilized to trigger a reversal of the signals being applied to the course synchro 228 so that the member 128 which supports airport replica 127 and course line indicator rod 108A is rotated 180° except insofar as the precise amount of rotation may be modified to correct for the optical distortion effect hereinbefore described. This removes the airport replica 127 from the region in which objects are shadow-imaged on screen 113 while bringing the opposite end of course line indicator rod 108A into that area to continue to provide an indication of the selected course line in the depicted scene. This signal reversal to take the airport replica 127 out of the imaged region is used where the instrument 94 is employed to follow a visual omni range course instead of an airport localizer course. Control components which interact with the course synchro 228 and TO/FROM meter coil 263 for these purposes will be hereinafter described.

Localizer/omni meter 264 may also be of the known form which responds to detection of selected localizer or omni signals of sufficient strength by deflecting an arm 273 carrying an invalid signal warning flag 274. An additional small window 276 is cut out of mask 112A below windshield opening 119 along the arc of movement of warning flag 276 in a position where the window is blocked by the opaque flag 274 when the localizer/omni signal is of suitable strength but is uncovered by the movement of the flag if the signal is weak and unreliable. Thus, referring again to FIG. 8, an invalid signal is indicated by a lighted area at 276 in the apparent three-dimensional image of an aircraft cabin in the presence of weak signals. This indicates to the pilot that the course line in the depicted scene should not be relied upon. In the presence of directional signals of adequate strength, area 276 appears dark.

Referring again to FIG. 14B, an invalid signal from the conventional glide slope signal receiving means of the aircraft energizes solenoid coils 248. This causes the glide slope whiskers 129 to be lifted from the lowered, active position to the elevated, inactive position 129' at which the glide slope indication no longer appears in the depicted scene, the control circuits which energize the solenoids being hereinafter described. This disappearance of the glide slope indication from the depicted scene signals to the pilot that reliable glide slope data is no longer being received.

Course selector synchro 258 is a differential synchro which may be manually adjusted by the pilot through a course selector assembly 277 on the face of the instrument as shown in FIG. 17. Omni bearing selector 266 may also by manually adjusted through an omni bearing selector assembly 278 at the face of the instrument as shown in FIG. 17. The internal construction of both the course selector assembly 277 and omni bearing selector assembly 278 and the coupling of these assemblies to the associated mechanisms may be similar and may be as shown in FIG. 18 which depicts the course selector assembly 277 in particular. To better illustrate internal detail, the manually rotatable annular knob 279 of the course selector assembly is shown removed from its normal position and turned 90° in FIG. 18.

The rotor shaft 281 of course selector synchro 258 extends through an opening in the face of the instrument 94 in coaxial relationship to an annular heading indicator 282 which is secured to the face of the instrument and which has standard compass markings 283. In use, the rotatable course selector knob 279 is fitted on the end of shaft 281 to enable manual turning of the shaft to select a desired course. Knob 279 fits over indicator 282 and is formed of transparent material so that the compass marking 283 of element 282 may be read through the knob. A pointer marking 284 on knob 279 turns along the compass markings 283 as the knob is rotated to indicate the selected course heading. A leaf spring 286 secured within knob 279 has ends which bear against an annular surface 287 of element 282 to create limited frictional resistance to turning of knob 279. Forcible turning of knob 279 by the pilot causes synchro 258 to add or subtract an angular correction factor to the directional signal from the aircraft's directional gyro so that the resultant signal is indicative of a desired course. As will hereinafter be described, this resultant signal may be used to control the course synchro 228 that establishes the angular orientation of the airport replica 127 and course indicator rod 108A of FIG. 14B.

Referring again to FIG. 17, the omni bearing selector assembly 278 may have a construction similar to that of the course selector knob assembly as described above except that it is coupled to the omni bearing selector mechanism 266 of FIG. 14B. Omni bearing selector 278 is set by the pilot in the conventional manner when it is desired to follow a particular radial to or from a source of omni signals. While the pilot can ascertain when the selected radial is intercepted in the conventional manner, by observing when course deviation indicator needle 267 is centered in window 268, this information is also evident in the depicted scene of the present invention as the course line in the scene then appears to extend directly under the aircraft windshield depicted in the scene. If a turn is then made along the heading of the selected omni radial, the desired course may be flown by simply flying along the course line indication in the depicted scene in a manner similar to conventional flying by following a highway, railroad, shoreline or the like.

The omni bearing selector 266 which is controlled through assembly 278 applies left or right signals to the course deviation indicator meter coil 262 and servomotor 217 controls as necessary to cause display of left or right displacement of the aircraft from a selected omni course. Interconnections between the omni bearing selector assembly 278, course deviation indicator meter coil 262 and TO/FROM meter coil 263 may be conventional and accordingly will not be further described. However, it is of interest that the present instrument simplifies the process of flying to and intercepting a selected omni radial. In particular, if the course selector assembly 277 is adjusted to a heading similar to that of the omni bearing selector assembly 278, instead of to an airport localizer course heading, then the course line indication in the depicted scene will shift to lie along the selected omni radial. If the real aircraft is left of the selected omni radial, the course line in the artificial scene will appear to be to the right. If the aircraft is to the right of the radial, the course line in the scene appears to be to the left. Thus the pilot may readily perceive visually where the aircraft must be flown to intercept the chosen track.

Referring still to FIG. 17, an additional manually adjustable control on the face of the instrument 94 is a mode selector switch assembly 289 having a manually rotatable mode selector knob 291. Knob 291 may be set at any of five positions and controls a five-position rotary switch 292 mounted on the inner side of the adjacent end wall of the instrument. Switch assembly 289 enables the pilot to select any one of five distinct operational modes of the instrument. These include an Instrument Landing System mode, a Localizer mode, a Back Course mode, a Gyro mode and an Omni mode. If switch assembly 289 is set to the Instrument Landing System mode, then the data presented in the depicted scene includes pitch, roll and heading of the aircraft. Localizer course position and glide slope position are also displayed and the image size and convergence point will change, after the aircraft has passed over the outer marker of an airport localizer course, in such a manner as to simulate the real appearance of an approach to the airport under visual flight conditions.

If the mode switch assembly 289 is set to the Localizer mode, the glide slope indication is removed from the depicted scene but all other data are present as in the Instrument Landing System mode. The Back Course mode of operation is used if a landing is to be made from a direction opposite to that of the localizer course line at an airport. If switch assembly 289 is set to the Back Course mode, then the localizer course indicator rod 108A of FIG. 14B, carrying the airport replica 127, is turned 180° since on a back course approach, the airport is in an opposite direction. Left-right signals to servomotor 217 are also reversed in the Back Course mode. In all other respects, the data displayed in the depicted scene remains similar to that which is present in the Localizer mode of operation except that the mechanism which increases image size and which changes convergence point as a landing site is approached will be triggered only if the back course of an airport which is being approached contains an outer marker.

If the switch assembly 289 is set for the Omni mode of operation the data displayed in the depicted scene is similar to what is present in the Localizer mode except that the apparent distant airport which is perceived represents the radio station at which the omni signals originate, rather than a landing site and the apparent course line in the depicted scene represents the selected omni radial which is to be followed rather than a prescribed line of approach to an airport. As the real aircraft passes over the radio station which broadcasts the omni signals, the apparent airport in the depicted scene vanishes inasmuch as the course line indicator rod 108A carrying the airport replica 127 of FIG. 14B is rotated at that time through 180° plus or minus any angular correction which may be needed to avoid optical distortion.

Referring again to FIG. 17, the mode selector switch 289 is set to the Gyro position when the aircraft is to be flown on the basis of compass headings only. In that mode the course line indicator in the depicted scene appears to be centered and to be aligned along a compass heading determined by the setting of the course selector assembly 277.

Considering now a suitable electrical circuit for interconnecting the several servomotors, synchros, control switches and other electrical components hereinbefore described with a source of attitude, directional and distance signals in order to realize the several modes of operation discussed above, reference should be made to FIG. 19.

As will become evident, certain components of the circuit of FIG. 19 are DC devices while others require AC excitation, both of which are available on many aircraft. In instances where these are not available, suitable battery-operated AC and DC power supplies may readily be installed for use with the present navigation instrument. To avoid excessive complication in the drawing, conventional power supply connections to certain circuit elements are not shown while DC power supply connections to certain other circuit elements are depicted simply by + or − signs indicative of the polarity of the power supply voltage applied to the element as compared with circuit ground potential. Ground symbols shown in FIG. 19 should be understood to constitute a circuit ground conductive path such as a connection to the chassis of the instrument and the frame of the aircraft, the designation of signal polarities in the following description being with reference to this circuit ground.

It has been previously pointed out that signals providing a basis for controlling the several servomotors, synchros and the like of the present navigation instrument may be obtained from conventional attitude and location sensing devices which are present in many aircraft as autopilot inputs. If not already present, conventional signal pick-offs may readily be installed on an aircraft for use with the present invention.

As redepicted in block form in FIG. 19, these conventional instruments, which are sometimes integrated as internal components of an autopilot mechanism, may include the marker receiver 74 which has an output terminal 74a at which a brief electrical pulse appears as the outer marker of an airport localizer course is reached, the pulse being conventionally used to briefly energize the marker indicator lamp 81 of the aircraft at that time. The outer marker terminal 74a may be used to control the distance or image size motor 157 of the present navigation instrument.

In particular, the image size motor 157 may be a reversible DC motor having one terminal grounded and the other connected to a set of relay contacts 300a which are operated by a driver coil 300. When coil 300 is unenergized, contacts 300a connect the motor 157 to one side of an adjustable or variable voltage dropping resistor 301. When coil 300 is energized, contacts 300a are operated to supply negative DC operating voltage to the motor 157. The other side of the variable resistor 301 connects to the positive terminal of the DC power supply through another set of relay contacts 302a which are normally open but which close upon energization of a driver coil 302.

Accordingly, if driver coil 302 is energized while coil 300 remains unenergized, positive voltage is supplied to motor 157. As has been previously described in connection with the mechanical structure of the invention, motor 157 drives a lead screw 158 which operates the mechanism which causes the apparent size of components of the artificial scene to increase while apparent distance of such components decreases. In order to initiate this operation, driver coil 302 is connected between circuit ground and outer marker signal terminal 74a. When the outer marker of an airport localizer course is reached, the marker signal briefly energizes coil 302 thereby closing contacts 302a and applying positive voltage to motor 157. The rate of operation of motor 157 and thus the rate at which the pilot perceives himself to be approaching the symbolic airport depicted in the artificial scene is determined by the value of the voltage dropping resistor 301 which may be adjusted to make this rate correspond to the speed at which the particular aircraft approaches an airport during an instrument landing system approach.

In order to continue this operation of motor 157 after termination of the brief outer marker signal at terminal 74a, the previously described limit switch 179b is connected between contacts 302a and coil 302. Limit switch 179b is of the normally closed form but is held open prior to receipt of the outer marker signal by the previously described follower block 162 which rides along the lead screw 158. Upon closing of contacts 302a in response to the outer marker signal, the motor turns lead screw 158 thereby backing follower block 162 away from limit switch 179b which then closes to continue energization of coil 302 after the marker signal terminates. An apparent increase in the size of the artificial scene components and a decrease in the apparent distance of such components then continues until follower block 162 reaches the other end of lead screw 158 and operates the other limit switch 179a.

Limit switch 179a is of the normally open form and is connected between contacts 302a and ground through driver coil 300. Thus coil 300 is energized when the image reaches maximum size, the interval of time required for this purpose being set, by adjustment of resistor 301, to be at least equal to the period required for an instrument landing system approach.

The energization of coil 300 reverses the direction of operation of motor 157 to restore components of the artificial scene to minimum apparent size and maximum apparent distance. This result is brought about in that coil 300 operates contacts 300a to reverse the polarity of the voltage which is being applied to motor 157. The energized coil 300 also closes normally open latching switch contacts 303 which are connected between contacts 302a and coil 300. This maintains coil 300 energized after the reversal of motor 157 operation backs follower block 162 away from limit switch 179a.

Reversed motor operation continues until follower block 162 again opens limit switch 179b. Coil 302 is thereby de-energized causing contacts 302a to open. Opening of contacts 302a in turn de-energizes coil 300. Operation of motor 157 stops and the circuit reverts to the original condition as depicted in FIG. 19 in readiness for a subsequent cycle of operation.

The reversed motion of motor 157 to restore the image to minimum size occurs relatively rapidly as there is no voltage dropping resistor in the negative power supply connection to the motor through switch 300a as is the case in the positive power supply connection made through the same switch during the image size increasing period of the operation.

In order to stop the latching voltage, which is applied to coil 302 through limit switch 179b, from maintaining outer marker indicator lamp 81 on after termination of the outer marker signal, coil 302 is connected to terminal 74a through a blocking diode 304 while lamp 81 connects to terminal 74a independently of the diode.

While the above-described system causes the image size to increase at a predetermined rate rather than at a rate determined by a measurement of actual distance from the real airport, there is a close correspondence with reality since the time interval between passage over the outer marker of an airport and the actual landing is brief, typically less than three or four minutes, and since air speed remains fairly constant during that phase of the approach. In instances where the aircraft is equipped with distance-measuring equipment of the kind which produces a signal precisely indicating distance from a ground radio station, the motor 157 may if desired be replaced with a servomotor responsive to such signal. In general, the provisions for image size increase during the final phase of an instrument landing system approach are not essential in a navigation instrument of the present kind but do offer a psychological comfort to the pilot by causing the artificial scene to still more closely conform with a real scene as viewed through the windshield of an aircraft during a landing approach.

The aircraft's attitude gyro 69 in this example is of the form having a roll signal terminal 69a at which a DC voltage is present, when the aircraft is banked, which is positive relative to circuit ground when the aircraft is banked to the right and negative when the aircraft is banked to the left with the magnitude of the voltage in either instance being indicative of the degree of roll. Accordingly, the previously described roll servomotor 189 may be made responsive to the polarity and magnitude of the voltage at terminal 69a. For this purpose, one input of servomotor 189 is connected to circuit ground while the other input connects to the output of a driver amplifier 309. Roll signal terminal 69a is connected to one input of amplifier 309 through a summing junction 311 while the reference input of the amplifier is connected to circuit ground. Thus if a positive voltage is present at summing junction 311, servomotor 189 operates in one direction while a negative voltage at junction 311 causes servomotor operation in the opposite direction.

As previously described, roll servomotor 189 drives the variable tap 193 of a feedback potentiometer 192-193. Positive and negative DC power supply voltages are applied to opposite ends of the resistive element 192 of the potentiometer and the variable tap 193 is connected to summing junction 311. Consequently, the roll servomotor 189 operates only in response to changes of signal voltage at the roll signal terminal 69a of attitude gyro 69 and does not operate when the roll signal voltage at terminal 69a stays constant. Any change of roll signal voltage causes the potentiometer 192-193 to apply a feedback or cancellation voltage to summing junction 311 which is of equal magnitude but opposite polarity to the changed roll signal thereby stopping servomotor operation when the roll signal itself stops changing. Thus, through the previously described mechanical structure, roll servomotor 189 causes elements of the artificial scene to be perceived as inclined from side to side in conformance with what would be perceived under visual flight conditions through the windshield of the aircraft in the presence of roll.

Pitch servomotor 148 is controlled in an essentially similar manner from the pitch signal terminal 69b of the attitude gyro which terminal exhibits a DC voltage having a polarity indicative of the direction of pitch and a magnitude indicative of the extent of pitch. Servomotor 148 has one input connected to the output of a driver amplifier 312 which in turn has an input coupled to terminal 69b through another summing junction 313. The other terminal of the servomotor 148 and the reference input of driver amplifier 312 are again grounded. Servomotor 148 moves the variable voltage tap 178 of feedback potentiometer 176-178 as previously described. Positive and negative DC voltages are applied to opposite ends of the resistive element 176 of the feedback potentiometer while the variable voltage tap 178 is connected to summing junction 313.

Accordingly any change of the pitch signal voltage at attitude gyro terminal 69b in either the positive or negative direction unbalances the voltage cancellation at summing junction 313 causing driver amplifier 312 to operate servomotor 148 until the new pitch signal voltage level at the summing junction is canceled out by the feedback voltage from potentiometer 176-178. This servomotor 148 operation causes the apparent level of the horizon line and other components in the artificial scene to rise and fall in conformity with changes of pitch as previously described.

The LOC-OMNI servomotor 217 which controls the apparent lateral position of the selected localizer or omni course line in the depicted scene may also have one terminal connected to the output of a driver amplifier 314 which has an input coupled to a summing junction 316, the other terminal of the servomotor and the reference input of the amplifier being grounded. Servomotor 217 translates the variable tap 222 of feedback potentiometer 221-222 as previously described. Positive and negative DC power supply voltage is applied to opposite ends of the resistive element 221 of the potentiometer and the variable tap 222 is connected to summing junction 316.

LOC/OMNI receiver 72 of the aircraft in this example is of the form having a course deviation signal terminal 72a at which a DC voltage is produced that has a magnitude indicative of the lateral displacement of the aircraft from a selected localizer or omni course and which has a polarity indicative of the direction of such displacement. Summing junction 316 is selectively connectable to terminal 72a and disconnectable therefrom through one set of contacts 289a of the previously described mode selector switch 289. Contacts 289a connect summing junction 316 to terminal 72a when the ILS, the Omni, the Back Course or the Localizer modes of operation have been selected by the pilot. The switch contacts 289a disconnect summing junction 316 from course deviation signal terminal 72a in the Gyro mode of operation. At those modes of operation at which the summing junction 316 is connected to terminal 72a, servomotor 217 operates the previously described mechanism which shifts the apparent lateral position of the course line indication in the depicted scene as necessary to conform with reality. If an operational mode is selected at which no signal is transmitted to summing junction 316 from LOC/OMNI device 72, the servomotor 217 operates solely in response to the feedback voltage from potentiometer 221-222 until the null or ground potential point midway along the resistive element 221 is reached by variable tap 222, at which point servomotor operation ceases and the course line indication in the depicted scene appears centered in the artificial scene insofar as apparent lateral position is concerned.

LOC/OMNI devices 72 have another terminal 72b at which a DC voltage signal is produced to signify that a selected course signal is of sufficient strength to be reliable or valid. The previously described localizer-/omni meter 264, which deflects the invalid flag of the depicted scene when reliable localizer signals are being received, may be connected between terminal 72b and circuit ground. The previously described course deviation indicator meter 262 may be connected between switch contacts 289a and ground to respond to the lateral position signals at terminal 72a during those modes of operation at which switch contacts 289a are closed. The previously described TO/FROM meter coil 269 may be connected between the TO/FROM signal terminal 72c of LOC/OMNI receiver 72 and circuit ground.

The aircraft glide slope signal receiver 73 has a vertical position signal terminal 73a at which a DC voltage is produced which has a positive polarity when the aircraft is above the airport glide slope and a negative polarity when the aircraft is below the glide slope with the magnitude of the voltage being indicative of the extent of vertical displacement from the glide slope. The previously described ratiometers 241, which control the apparent position of the glide slope indication in the depicted scene, may be connected in parallel between terminal 73a and ground through another set of contacts 289b of the mode selector switch. Switch contacts 289b are open at the Localizer, Omni, Back Course and Gyro settings of the mode selector switch as a glide slope indication is not desired or would not be valid in the depicted scene under those modes of operation. To lift the glide slope whiskers out of the region which produces an image during those modes of operation or if signal voltage disappears from the glide slope valid terminal 73b of the glide slope receiver 73, indicating that glide slope signals are too weak to be reliable, the previously described solenoid coils 248 are connected between a circuit junction 317 and ground. A set of normally closed relay contacts 318 and another set of contacts 289c of the mode selector switch are connected in parallel between the DC power supply positive terminal and circuit junction 317 so that the solenoids are energized to remove the glide slope indication from the depicted scene if either or both of the contacts 318 and 289c are closed. The mode selector switch closes the contacts 289c at all mode settings except the ILS setting which is the operational mode in which a glide slope depiction is desired in the scene. Normally closed relay contacts 318 are controlled by a driver coil 319 which is connected between glide slope valid signal terminal 73b and ground so that the solenoid coils 248 are energized to remove the glide slope indication from the depicted scene if glide slope signals are too weak to be reliable.

The several output terminals of the marker receiver 74, attitude gyro 69, LOC/OMNI device 72 and glide slope receiver 73 as described above produce DC voltage signals which in some cases may vary in magnitude and in polarity to continuously indicate a characteristic of the situation of the aircraft. The aircraft's directional gyro 71 usually differs in that signals indicative of the yaw of the aircraft are generated by a transmitter synchro 322 in multiphase AC form. The directional signals are obtainable at a pair of synchro rotor output terminals R1 and R2 and three synchro stator terminals S1, S2 and S3, suitable internal constructions for the transmitter synchro as well as the receiver synchros and differential synchros to be hereinafter identified being known to the art.

The previously described directional receiver synchro 206 that turns the earth disc to maintain a correct heading indication in the depicted scene has rotor terminals coupled to terminals R1 and R2 and stator terminals coupled to terminals S1, S2 and S3 of the directional gyro 71.

The course synchro receiver 228 which controls the apparent angular position of the localizer course line-airport replica in the depicted scene is not coupled directly to the directional gyro synchro transmitter in this manner for several reasons. First, the yaw signal from the directional gyro must be given an additive or subtractive correction so that it conforms with the alignment of a selected localizer or omni course line rather than to the yaw of the aircraft. An additive correction is defined as an increase in the angular position represented by the signal as expressed in degrees or compass heading taken clockwise from zero degrees (north) while a subtractive correction is the opposite. Second, an additive or subtractive correction may be needed to avoid optical distortion if the aircraft is to the right or to the left respectively of the selected localizer or omni radial course, the magnitude of this correction, if any, being a function of the amount of displacement of the aircraft from the selected course and also being a function of the angular orientation of the course line rod-airport replica of the instrument relative to the screen thereof as previously discussed with reference to FIGS. 13A, 13B and 13C. As has been pointed out, this correction is maximal, insofar as it is dependent on angular position, when the course line indicator rod lies in a plane normal to the screen of the instrument and diminishes to zero when the course line indicator rod is parallel to the screen. Insofar as it is dependent on lateral displacement, the correction is zero when the aircraft is on course and increases as a function of lateral displacement from the selected course. Finally, when the instrument is set for the Omni mode of operation and the aircraft passes over the source of course signals, the angular position signal to course synchro 228 should be shifted 180°, except for such optical distortion correction as may be required. This removes the symbolic airport image from the depicted scene when the aircraft is outbound on a FROM radial Omni Bearing selector heading.

Considering now the components which are connected between the directional gyro signal terminals and course synchro 228 to accomplish the results described above, with reference again to FIG. 19, the rotor terminals of the course synchro 228 may be connected directly to rotor excitation current terminals R1 and R2 of the directional gyro 71 while the stator terminals of the course synchro connect with the rotor terminals of distortion compensating differential synchro 257. The stator terminals of the course selector differential synchro 258 connect to the stator signal terminals S1, S2 and S3 of the directional gyro 71, the angular position of the rotor of the course selector synchro being determined by the manual setting of the course selector switch 277 as previously described. Thus the output at the rotor terminals of the course selector synchro 258 is a signal determined by the heading of the aircraft as corrected by a selected angular factor to represent a selected localizer or omni course. This adjusted angular signal is delivered to differential synchro 257 through a two-position three-way set of relay contacts 323 which are connected between the rotor terminals of course selector synchro 258 and the corresponding stator terminals of differential synchro 257. As the rotor terminals of synchro 257 connect to the stator terminals of course synchro 228, the course synchro positions the course indicator rod in accordance with this adjusted angular signal except insofar as the adjusted signal may be further modified, to correct for optical distortion, as a result of the position of the rotor of differential synchro 257. Mechanism which positions the rotor of synchro 257 for this purpose will be hereinafter described.

At the normal position of relay contacts 323 the connection between course selector synchro 258 and differential synchro 257 is direct. At the operated position of relay contacts 323 the adjusted signal is routed through a signal inverter 324 of the form which shifts the phase of the signal from course selector synchro 258 to synchro 257 by 180°. The driver coil 270 which operates contacts 323 is connected between circuit ground and the TO/FROM terminal 72c of LOC/OMNI device 72 through a diode 325. Thus when the aircraft passes a selected source of course signals, the apparent course line indication in the depicted scene appears to turn 180° and the airport image vanishes. The airport representation is similarly removed from the scene during the Gyro mode of operation by closure of another set of Mode Selector Switch contacts 289d connected between the power supply and driver coil 270.

Considering now components which correct for optical distortion by positioning the rotor of differential synchro 257, the imbalance adjuster 256, polarity reversing potentiometer 254 and repeater synchro 253 control the rotor for this purpose. The imbalance adjuster 256 has an angularly movable shaft 326 mechanically coupled to the rotor of differential synchro 257. An arm 327 extending from shaft 326 is spring-biased to a position at which the rotor of differential synchro 257 is at the 0° position wherein no angular signal correction occurs within the synchro. Thus by pivoting arm 327 in one direction, differential synchro 257 can be caused to apply an additive correction to the directional signals to course synchro receiver 228 while pivoting the arm in the opposite direction causes a subtractive correction to be applied to the signals. A permanent magnet 328 is carried on arm 327 within the field of a pair of solenoid coils 329 and 331 which are connected in series aiding relationship with one end of the two coils being grounded and the other end of the coils being connected to the output of an amplifier 332.

A negative output from amplifier 332 acts through coils 331 and 329, magnet 328, arm 327 and shaft 326 to turn the rotor of differential synchro 257 in a direction which applies an additive angular correction factor to the angular position signals transmitted to course synchro receiver 228 with the magnitude of the correction factor being determined by the voltage level of the amplifier output. Similarly, a positive output from amplifier 332 causes a subtractive correction factor to be applied to the angular position signals to the course synchro receiver 228. Thus optical distortion of the course line depiction in the artificial scene is avoided by causing the output voltage of amplifier 332 to be a function of both the angular position of the course line indicator rod and of the lateral displacement of the aircraft from a selected course in accordance with the principles hereinbefore described. The output of the amplifier 332 is regulated for this purpose by the polarity-reversing potentiometer 254.

Polarity-reversing potentiometer 254 may consist essentially of a continuous circular resistive element 333 having a first fixed tap 334 connected to circuit ground and another fixed tap 336 situated 180° away from tap 334 and which is connected to the mode selector switch contacts 289a that receive the variable magnitude, positive or negative DC signal which is indicative of displacement of the aircraft to one side or the other of a selected localizer or omni course. Thus a positive voltage gradient exists along both halves of the circular resistor 333 when the aircraft is to the right of a selected course which voltage gradient changes to negative if the aircraft is at the left side of the selected course with the magnitude of the voltage drop along the two halves of the circular resistor being a function of the amount of displacement of the aircraft from the selected course. A rotatable shaft 337 is coaxial with the circular resistor 333 and carries a pair of wiper contacts 338a and 338b which contact the circular resistor at points spaced 180° apart in the angular direction. Wiper contacts 338a and 338b are respectively connected to the two inputs of the amplifier 332.

Provided that the wipers 338a and 338b are not each equidistant between the fixed terminals 334 and 336 of the polarity-reversing potentiometer, in which case there is no output from amplifier 332, it may be seen that the polarity of the output of amplifier 332 will reverse in response to any reversal of the polarity of the lateral position signal from localizer omni device 72. The magnitude and polarity of the output of amplifier 332 is determined not only by the magnitude and polarity of the localizer-omni lateral position signal applied to fixed tap 336 but also by the angular position of shaft 337 and wipers 338. By continually controlling the angular position of shaft 337 to correspond with the adjusted angular position signal applied to the stator of differential synchro 257, the output of amplifier 332 is caused to be a correction signal which, through imbalance adjuster 256, acts to position the rotor of differential synchro 257 as necessary to correct for optical distortion. Shaft 337 is controlled in this manner by being mechanically coupled to the rotor of repeater synchro 253. Rotor terminals of the repeater synchro are connected to the rotor excitation terminals R1 and R2 of directional gyro 71 while the stator terminals of the repeater synchro connect with the corresponding stator terminals of synchro 257. Repeater synchro 253 therefor positions the wipers 338 of the polarity-reversing potentiometers to correspond with the adjusted angular position signal from course selector synchro 258, in either direct or inverted form depending on the position of relay contacts 323.

When the wipers 338a and 338b of the polarity-reversing potentiometer are equidistant from fixed terminals 334 and 336 there is no output from amplifier 332 irrespective of the lateral position signal from LOC-/OMNI device 72. At that time, the localizer course line rod is parallel to the screen and therefore is not subject to optical distortion. A rising voltage difference begins to be applied between the inputs of amplifier 332 as the wipers 338a and 338b are then turned towards alignment with fixed taps 334 and 336, the polarity of the amplifier output being dependent on the direction of the wiper movement. The course line indicator rod and attached airport replica are at that time also turning towards alignment with a plane normal to the screen at which orientation maximum compensation for optical distortion is needed except insofar as the amount of compensation is also a function of the lateral displacement of the indicator rod from a central vertical plane through the instrument.

Thus by an appropriate selection of circuit constants and by adjustment of the gain of amplifier 332, the synchros 253 and 257 acting in conjunction with the polarity-reversing potentiometer 254 and imbalance adjuster 256 act to eliminate the potential optical distortions hereinbefore discussed.

As the polarity-reversing potentiometer 254 and imbalance adjuster 256 are not standard circuit components, suitable detailed mechanical constructions for these devices are depicted in FIGS. 20 and 21 respectively. Referring initially to FIG. 20 in particular, the annular resistive element 333 of the polarity-reversing potentiometer 254 may be disposed coaxially with respect to the output shaft 337 of the previously described repeater synchro 253. Fixed taps 334 and 336 are secured to annular resistive element 333 at positions spaced 180° apart thereon and have attached conductors 339 and 341 which respectively connect to circuit ground and to the lateral position signal terminals as previously described. Movable wipers 338a and 338b extend radially from shaft 337 in opposite directions to ride along the surface of resistive element 333 as the shaft is turned by the repeater synchro 253. Conductors 342 and 343 leading to the previously described amplifier 332 are electrically coupled to the movable wipers 338a and 338b respectively through slip rings 344 and 346 respectively carried on shaft 337.

Referring now to FIG. 21, the imbalance adjuster 256 may be supported on the previously described differential synchro 257 with which the imbalance adjuster coacts to control the angular position of the rotor shaft 326 of the synchro. The arm assembly 327 through which the imbalance adjuster controls the angular position of synchro shaft 326 may consist of four arm segments 327a, 327b, 327c and 327d extending radially from shaft 326. A first permanent magnet 328a is supported between the ends of arms 327a and 327b, the magnet being arcuate to lie along an arc of a circle centered on the rotational axis of shaft 326. A second similar permanent magnet 328b is similarly supported between the ends of arms 327c and 327d and is similarly shaped and positioned to lie along an opposite arc of the same circle. A coil spring 347 is coupled between synchro shaft 326 and the housing of the synchro to resist turning of the shaft in either angular direction from a predetermined position, which is the 0° position at which the differential synchro 257 makes no angular correction to position signals transmitted through the synchro. The coil assembly 331 which exerts a torque on synchro shaft 326 in opposition to the spring force thereon in response to signals from the previously described amplifier 332 and polarity-reversing potentiometer may consist of a first pair of coils 331-1 and 331-2 disposed coaxially with respect to magnet 328a and supported by a bracket 348a which attaches to the housing of synchro 257. Coil sections 331-1 and 331-2 are connected in series but oppositely wound so that when energized through conductors 349a and 349b the adjacent ends of the two coil sections exhibit like magnetic polarities and thus the opposite ends of the two coils considered as a unit also exhibit similar magnetic polarity. As the two ends of the associated permanent magnet 328a have fixed but opposite polarities, application of positive electrical voltage to coil conductor 349a tends to turn the synchro shaft 326 in one rotational sense while a negative voltage received through conductor 349a tends to turn the synchro shaft in an opposite rotational sense. This angular motion is resisted by spring 347. Thus the extent to which an applied electrical voltage is able to turn the synchro shaft 326 is dependent on the magnitude of the voltage while the direction in which the synchro shaft is turned is determined by the electrical polarity of the voltage relative to circuit ground.

While the imbalance adjuster 256 might be constructed with a single magnet 328a and a single set of coils 331-1, 331-2 the signal strength required to operate the mechanism, and thus the power output of amplifier 332, may be minimized if a second magnet 328b is provided in conjunction with a second set of coils 331-3 and 331-4, the coils being secured to the housing of synchro 257 by another bracket 348b opposite from bracket 348a. If, as in this example, the two magnets 328a and 328b are disposed with the ends of like polarity at the same side of the shaft 326 then the second set of coils 331-3 and 331-4 are oppositely wound relative to the first set of coils 331-1 and 331-2. In other words, with the two sets of coils connected to input signal conductors 349a and 349b in series aiding relationship, the ends of coil assembly 331-3, 331-4 exhibit an opposite polarity from that of the corresponding ends of coil pair 331-1, 331-2. The magnetic interactions between the two sets of coils and the associated permanent magnets then aid each other to exert increased torque on synchro shaft 326 in response to input signals.

Understanding of the operation of the navigation instrument 94 may be facilitated by reference to FIGS. 22A to 22G in sequence which show the image perceived by the pilot at successive stages in making an instrument landing approach to a specific existing airport using an actual prescribed approach route, the landing site selected for purposes of example being Runway #9 of the Savannah Municipal Airport in the state of Georgia, U.S.A. While FIGS. 22A to 22G are described as illustrating what is perceived by the pilot in the course of an approach to this particular airport, the three-dimensionality of the depicted scene cannot of course be realistically portrayed in the two-dimensional drawings nor can the coloration of the components be illustrated in a truly realistic manner.

FIG. 22H shows approach plate data for the above-identified airport on which a series of airplane symbols 293A through 293G have been placed to indicate the location and course of the aircraft in relation to the Savannah airport at the times depicted in FIGS. 22A to 22G respectively. At the initial aircraft position 293A of FIG. 22H, the aircraft is inbound on omni radial 283°, identified as Victor-154, the reciprocal of which is 103°, towards a fix point known as Marlow intersection. The aircraft 293A is crabbed 5° left due to wind conditions. At that time, the depicted scene presented to the pilot by the navigation instrument appears as shown in FIG. 22A. The course line indication 108 in the depicted scene appears to extend from directly underneath the nose of the depicted air craft slightly to the right of forward because of the crabbing of the real aircraft. Horizon line 103 appears level and centered in the windshield 119 of the aircraft cabin of the image indicating that there is no roll or pitch of the real aircraft at that time. Lubber's line 107, compass cardinal point symbols 126 and heading markers 106 indicate the heading of the aircraft at that time. At this time the pilot will have received clearance for an ILS approach to Savannah Municipal Runway #9.

Referring again to FIG. 22H, the approach plate shows the course from Marlow intersection is 138° which requires a 46° intercept of the 092° localizer course 108R to the Savannah airport 127R. As Marlow is about to be reached the aircraft is at position 293B of FIG. 22H and the pilot will have adjusted the mode selector switch of the navigation instrument from the Omni mode position to the ILS mode position and will have adjusted the course selector knob to the localizer course heading, 092° in this example, shown on the approach plate. As shown in FIG. 22B, this mode switching brings the glide slope indications 109 into the depicted scene and also reverses the mechanism which creates the depicted airport 127 and course line 108 so that the image of a distant airport is now present in the depicted scene. The depicted airport 127 and localizer course line 108 appear to be to the right of the aircraft of the depicted scene in conformity with the real situation at that time.

FIG. 22C shows the depicted scene when the aircraft has arrived at Marlow intersection, to the position 293C of FIG. 22H and is banked to the right and undergoing a turn towards the prescribed heading for intercepting the localizer course 108R to the airport. The roll of the aircraft is evident from the tilt of horizon line 103 in the depicted scene and the changing heading is apparent from movement of heading markers 129 relative to lubber's line 107.

FIG. 22D illustrates the depicted scene when the turn has been completed and the aircraft is at the position shown at 293D in FIG. 22H at which it is heading 138° along the prescribed course to make a 46° localizer intercept. The aircraft is at initial approach altitude at this point. FIG. 22E illustrates the scene depicted by the instrument as the aircraft 112 is intercepting the localizer course 108 and is being turned left to capture the localizer. At this point, the aircraft is approaching the outer marker 296 shown in FIG. 22H.

FIG. 22F illustrates the scene depicted by the instrument as the aircraft 112 is inbound from the outer marker and under conditions where the aircraft is on the localizer course 108 but slightly below glide slope as made apparent by the slightly upward inclination of the glide slope indications 109 in the depicted scene.

Referring now to FIG. 22G, the aircraft 112 is at the middle marker on the localizer course and is at the prescribed glide slope. The airport depiction 127 in the scene began to enlarge as the outer marker was passed, simulating the reality of a visual approach to the airport. At approximately this point the pilot will transfer his attention from the depicted scene of the present instrument to the real view out the real windshield of the aircraft and either complete the landing on a visual basis or declare a missed approach and commence to climb and to initiate the missed approach procedure if conditions are not favorable to completion of the landing.

Referring again to FIGS. 14A and 14B in combination, the changes of orientation of the several objects which are shadow-imaged on screen 113 to create the depicted scene and the changes of apparent distance of such objects as perceived by the viewer-pilot may also be accomplished by movements of the objects, the light sources, the screen and the like in a different manner from the particular movements employed in this embodiment. For example, a realistic presentation of roll in the depicted scene is accomplished in this example of the invention by a sideward tilting of the entire image component assembly 138 about the axis of the supporting pivot coupling 187. However, roll information may also be realistically portrayed by maintaining the image component assembly 138 fixed about that particular axis while arranging for controlled angular movement of the screen assembly 112 about a longitudinal axis through the instrument. Similarly, in the described example, changes of pitch are introduced into the depicted scene by raising or lowering of the light sources 114 but this may also be accomplished by arranging for controlled tilting of the earth disc 102A and associated elements of the image component assembly about an axis parallel to screen 113. Still further, the described example of the invention might be chracterized as an "inside out" instrument in that the depicted scene which the instrument presents to the pilot is one in which the pilot perceives himself as being situated within the cabin of a miniature aircraft and as looking out through the windshield of the miniature aircraft. The same information may be realistically and visually presented to the pilot in what is termed an "outside in" instrument an example of which is shown in FIGS. 23 to 28.

Referring initially to FIG. 23, in such an "outside in" variation of the invention the pilot is caused to perceive three-dimensionally a small entire airplane 401 seemingly situated in space in front of his eyes. Seemingly in the distance, beyond the little airplane 401, the pilot perceives in three dimensions the outlines of an airport runway 402. A course indicator line 403 appears to extend from the far end of the apparent runway 402 to a distant apparent horizon line 404 which appears essentially horizontal although it may undulate slightly to conform with the outline of distant hills in a real scene. Glide slope indicator lines 406 appear to extend upward and forward from the near end of runway 402 and appear to diverge in the direction of the little airplane 401. Below the depicted scene, an omni bearing selector assembly 278', a five-position mode selector switch assembly 289' and a course selector assembly 277' are visible on the face of the instrument 42' and may be essentially similar in construction and provide essentially similar functions as the corresponding components of the previously described first embodiment of the invention.

Mechanisms to be hereinafter described cause the 3D shadow image of the little airplane 401 to appear to undergo attitude changes relative to runway 402, course line 403, horizon line 404 and glide slope indications 406 as the real aircraft in which the instrument 42' is disposed undergoes corresponding attitude changes relative to the earth's surface or to a real airport. Thus the little airplane image 401 appears to roll when the real aircraft undergoes a roll and appears to yaw when the real aircraft undergoes a change in heading and appears to incline downward or upward when the real aircraft undergoes a change of pitch. If the real aircraft moves above or below glide slope, glide slope indications 406 shift to appear to extend below or above the little airplane 401 while the apparent inclination of runway 402 relative to the little airplane increases or decreases to present a scene conforming with the vertical position of the real aircraft. If the real aircraft is to the left of a selected omni or localizer course or an airport runway to which a landing approach is being made, the distant components of the depicted scene such as the course line 403, the apparent runway 402 and glide slope indications 406 shift and appear to be displaced to the right of the little airplane 401 and if the real aircraft is to the right of a selected course, such elements shift and appear to be to the left of the little airplane. As the real aircraft closely approaches a real airport at which a landing is being undertaken, the apparent runway 402 in the scene enlarges and appears closer to the little airplane.

When the instrument 42' is to be used to navigate along a selected omni radial, in level cross-country flight for example, the apparent horizon line 404 is lowered to appear to coincide with the level of the apparent little airplane 401 and, together with course line indication 403, provides a realistic three-dimensional frame of reference enabling the pilot to fly the real aircraft along the desired course by using the controls of the real aircraft to fly the apparent little airplane 401 within the context of the artificial scene.

Thus all of the attitude and horizontal and vertical positional information needed to navigate along a selected course or to make an instrument landing approach to a real airport are continuously and realistically depicted in three dimensions in the display of the instrument 42'. This modification of the instrument is characterized as an "outside in" device since, in contrast to the first-described embodiment, the pilot perceives himself as following along behind an airplane 401 rather than as being situated within the cabin of an aircraft. In the previously described navigation instrument embodiment, the apparent aircraft windshield of the depicted scene appeared to remain fixed relative to the pilot while distant components of the scene such as the horizon line appeared to tilt from side to side relative to the apparent windshield to indicate roll and to rise and fall to indicate pitch. In the outside in embodiment of the instrument 42' shown in FIG. 23, the horizon line 404 and other distant components of the depicted scene appear to remain level relative to the pilot while the little airplane 401 itself appears to roll and pitch in conformity with roll and pitch of the real aircraft.

Considering now suitable internal components for creating the three-dimensional, outside-in, symbolic scene of instrument 42' as described above including means for maintaining the significant characteristics of the scene in constant conformity with the real situation of an aircraft in which the instrument 42' is used, reference should be made initially to FIG. 24 which shows only certain basic elements of the instrument, the associated structures and mechanism for supporting and controlling the basic elements being hereinafter described in more detail.

This example of an outside-in navigation instrument 42' is of the form which uses color or anaglyphic coding for the purpose of directing slightly disparate stereo pair images of a scene to each eye of an observer-pilot although polarization can be employed for such coding purposes, as in the previously described example of the invention, if desired. Since color coding is utilized in this particular example, the analyzing lenticular screen 407 at the face of the instrument is of the previously described form which has parallel, vertical light-analyzing strips 408 of two different colors, red filtering strips being alternated with green filtering strips in this example. The inner side of screen 407 is illuminated with red light by a first light source 409R and with green light from a second light source 409G. The two light sources 409, which are spaced apart along a transverse line parallel to the plane of the screen 407, are shown schematically in FIG. 24 and are shown closer to the screen than is usually desirable in order that other components of the drawing may be shown on a suitably large scale, the light sources including the preferred position thereof being hereinafter further described and depicted with reference to the detailed mechanism of the instrument.

An opaque miniature model of a little airplane 401A is situated between light sources 409 and screen 407 to cause an observer-pilot situated on the other side of the screen to perceive a seemingly solid shadow image 401 of the little airplane, seemingly suspended in space at a location in front of the screen. In accordance with the principles previously described, this perception of a seemingly solid airplane 401 results from the fact that each individual eye of the pilot receives a slightly different two-dimensional shadow image of an aircraft outline and this binocular information is integrated by the pilot's inherent reactions into the three-dimensional perception of an aircraft outline seemingly located at the position where the lines of sight of his two eyes intersect in front of the screen 407 while focusing on the slightly spaced-apart shadow images on the screen.

The two-dimensional shadow pattern at the inner side of the screen 407 consists of green-appearing areas 411 where light from red source 409R only is blocked from the screen by the airplane model 401A or other objects and red-appearing areas 412 where light from green source 409G only is blocked from the screen by the model or other objects. Umbra regions 413, where light from both sources 409 is blocked from the screen appear black. Owing to the previously described action of the light-analyzing lenticular screen 407, the right eye of a pilot situated on the opposite side of the screen perceives both the black umbra areas 413 and the red areas 412 as black shadow while his left eye perceives the umbra areas 413 and the green areas 411 as black shadow. The red illuminated shadow image areas 412 are seen as black shadow by the pilot's right eye since the red light in those areas like red light elsewhere on the screen cannot pass through the green color filter strips 408 of the screen 407 and it is only areas occupied by the green strips which are visible to the pilot's right eye owing to the previously described lenticular action of the screen. Similarly, the areas 411 illuminated by green light only are seen as black shadow by the pilot's left eye since the green light does not pass through the red filter strips which occupy the areas visible to the left eye.

Accordingly each eye of the pilot perceives a single one of two slightly disparate, slightly separated shadows of the airplane model 401A and the pilot's biovisual system reacts by integrating these stereo views into the seemingly solid single 3D shadow image 401 of the little airplane. Mechanisms to be hereinafter described manipulate the miniature airplane model 401A to cause the three-dimensional airplane image 401 to roll, pitch and yaw in accordance with the attitude of the real aircraft in which the instrument is situated.

To cause the pilot to perceive three-dimensionally an apparent horizon line 404, course line 403, landing runway 402 and glide slope indications 406 seemingly located in front of the screen but beyond the apparent little airplane 401 and in a position and orientation corresponding to the situation of the real aircraft in which the instrument is located, a framework 414 formed of opaque metal wire or the like is situated between the screen 407 and airplane model 401A. Framework 411 may include a horizon line wire 404A extending parallel to the top and bottom of the screen 407 and may be formed to be slightly wavy to simulate the irregular outline of distant hills on a real horizon. As the horizon line 404 is to be perceived by the pilot as the most distant component of the scene, the horizon line wire 404A is situated adjacent the inner side of the screen while other components of the framework 411 extend away from the wire and the screen towards the light sources. Course line indicator rod 403A extends outwardly and downwardly from the central portion of horizon line wire 404A to connect with a transverse runway far end wire 416. One of a pair of runway side line wires 417 extends from each end of wire 416 and the two wires 417 are interconnected at the end closest to airplane model 401A by a cross wire 418 which defines the apparently near end of the runway in the depicted image. Glide slope wires 406A extend from the ends of runway side wires 417 towards the model airplane 401A, the glide slope wires being divergent towards the model airplane and being angled upwardly relative to the plane defined by the runway 402A, course line wire 403A and horizon line wire 404A. In order to create the illusion of a long runway 402 in the symbolic scene while actually utilizing a desirably compact framework 414, the runway side line wires 402A may diverge slightly in the direction of the model airplane 401A, thereby exaggerating the apparent perspective in the depicted scene. Since in this second embodiment of the navigation instrument all components of the artificial scene are perceived as being situated between the pilot and the screen, the reverse perspective effect which was previously discussed is not present.

The several elements of the framework 414 are shadow-imaged on screen 407 and perceived three-dimensionally by the pilot as horizon line 404, course line 403, runway 402 and glide slope indications 406 for reasons similar to those hereinbefore described with reference to the 3D shadow image 401 of the little airplane.

Mechanisms to be hereinafter described shift the entire framework 414 transversely relative to the screen 407 and airplane model 401A in response to localizer or omni signals so that the pilot perceives the little airplane image 401 as being to the right of the runway and course line or to the left of the runway and course line when the real aircraft in which the instrument is used is in a similar situation. Other mechanisms to be described pivot the framework 414 about the axis defined by horizon line wire 404A in response to glide slope signals so that the little airplane image 401 appears to be above or below the sloping plane defined by the glide slope indications 406 when the real aircraft is in a similar situation. Thus in an instrument landing system approach, the attitude of the real aircraft is visually presented to the pilot by the apparent attitude of the little airplane image 401 while the vertical and horizontal relationship of the real aircraft to a real landing field is evident from the relationship of the little airplane image to the runway course line and glide slope indications which appear in the artificial scene. As the final stages of landing begin, other mechanisms move the wire framework 414 towards airplane model 401 causing the apparent runway 402 in the depicted scene to appear to enlarge and become closer. Compass heading information may also be injected into the depicted scene by means to be described. Thus the pilot may fly the real aircraft to a selected airport by using the controls of the real aircraft to fly the apparent little airplane 401 to the apparent runway 402 of the depicted scene.

Considering now the structure of the instrument 42' in greater detail including suitable mechanisms for manipulating the airplane model 401A and framework 414 to accomplish the results described above, reference should be made to FIGS. 25A and 25B in conjunction, which Figures may be juxtaposed as shown in FIG. 25C to form a single drawing. The light-analyzing lenticular screen 407 may again be mounted at a conforming opening 418 in the face end of a rectangular housing 420 and the light source assembly 419 may be situated within the housing near the opposite end. Light source assembly 419 may consist of two spaced-apart lamps 409R and 409G mounted in a suitable base 421 at points equidistant from the screen 407 but which are on opposite sides of a central vertical plane through the housing 419. To isolate the red and green light sources from each other, an opaque partition 422 extends from base 421 between the two lamps 409. A transverse opaque member 423 extends upwardly from the base 421 and has an opening 424R, in which red filter 426R is situated, between lamp 409R and the screen. An additional opening 424G in member 423 is situated between lamp 409G and the screen and contains a green color filter 426G. Thus the inner surface of screen 407 is illuminated by both red and green light originating from laterally spaced-apart points, except insofar as objects situated between the light source assembly 419 and the screen block light from one or both sources to create the shadow pattern on the screen.

The wire framework 414 which creates shadow images providing a representation of a horizon line, course line, runway and glide slope in the depicted scene is supported within a rectangular frame 427 which is parallel to the screen and which is movable both transversely and longitudinally within housing 420. To provide for this movement in two orthogonal directions, frame 427 is supported on a plate 428 having upturned edges 429 along each side which define a track along which the frame may slide towards the screen 407 and away therefrom. Pins 431 extend downward from each lower corner of frame 427 through slots 432 which are parallel to the adjacent upturned edge 429 of plate 428 in order to attach the frame to the plate while allowing for the above-described longitudinal movement of the frame. To accomplish this motion a distance or image-size control motor 430, secured to plate 428, drives a longitudinally directed lead screw 431 which is engaged with a threaded opening 432 in a downwardly angled bracket 433 of the frame 427.

Thus, operation of the motor 430 in one direction causes wire framework 414 to move away from screen 407 and closer to the light source assembly 419 thereby causing the three-dimensional shadow image of the frame to appear to enlarge and to become closer insofar as the perceptions of the pilot are concerned. Rotation of the motor 430 in the opposite sense draws the wire framework 414 closer to the screen causing the image of the airport runway and other objects represented by the framework to appear to diminish in size and to recede from the viewer. Distance motor 430 may be actuated by receipt of an outer marker signal and may be controlled in a manner similar to the control of the distance motor of the first-described embodiment of the invention.

To provide for the sideward movement of wire framework 414, plate 428 is in turn supported on a channel member 434 disposed transversely within housing 420. Flanged pins 426 extend upwardly from channel member 434 through transverse slots 437 of plate 428 to attach the members together while allowing for lateral movement of plate 428, frame 427 and framework 414 relative to channel member 434. To effect such motion, a localizer/omni servomotor 438 is secured to channel member 434 and drives a transverse lead screw 439 which extends within the channel member and which is journaled in brackets 441 attached to the channel member. A threaded tab 442 extends downward from plate 428 to engage the lead screw 439 so that operation of servo motor 438 in one direction moves the plate 428 and frame 427 rightwardly within housing 420 while opposite rotation of the servomotor moves these components leftwardly. Servomotor 438 may be controlled for this purpose from a source of localizer or omni course signals in a manner essentially similar to the control of the LOC/OMNI servomotor of the previously described embodiment.

In addition to the longitudinal and sideward motions provided for by the above-described mechanism, the wire framework 414 is also pivotable upwardly and downwardly about a transverse axis defined by the horizon line wire 404A so that the vertical position of the real aircraft in relation to glide slope may be accurately conveyed to the pilot by the depicted scene. The wire framework 414 may also be manually raised or lowered relative to frame 427 for purposes to be hereinafter described. Considering now mechanisms for pivoting and for raising and lowering the framework 414, reference should be made to FIG. 26 in conjunction with FIG. 25.

The wire framework 414 is attached to frame 427 solely through the horizon line wire 404A and a pair of glide slope ratiometers 457 which are mounted in coaxial relationship at opposite sides of frame 427. Each ratiometer is secured to an associated one of a pair of vertically slidable members 444 carried on the vertically extending portions of frame 427. To provide for the vertical motion of slider members 444, each such member is attached to the frame 427 by pins 446 which extend through vertical slots 447 in the frame. The horizon line wire 404A extends along the rotational axis of the ratiometers 457 and is attached at each end to the rotary output element of the adjacent ratiometer. Ratiometers 457 are controlled by the glide slope receiver equipment on the aircraft in a manner similar to that previously described in connection with the first embodiment of the invention. Accordingly, the entire wire framework 414 pivots upwardly and downwardly about the axis defined by the horizon line wire 404A in response to vertical position signals indicative of the displacement, if any, of the aircraft from the glide slope to an airport.

To prevent the weight of wire framework 414 from exerting an unbalanced torque on the ratiometers 457 which might affect the accuracy of the ratiometers, counterweights 462 are carried on arms which extend in the opposite direction from the rotary output elements of the ratiometers.

To enable manual adjustment of the level of horizon line wire 404A, a rotatable knob 448 is mounted at the face of the instrument for selectively turning a shaft 449 which extends longitudinally within housing 420 through the center of the lower portion of frame 427. Members 451 extend radially from shaft 449 in opposite directions and each is coupled to an arm of one of a pair of bell cranks 452 through one of a pair of links 453. The angle of each bell crank 452 is journaled to a lower corner of frame 427 so that turning of knob 448 acts through shaft 449, members 451 and links 453 to pivot the bell cranks. The other arm of each bell crank 452 is coupled to the lower end of the adjacent one of the slider members 444 by a pin 450 which projects from the slider member into a transverse slot on the bell crank arm. Thus manual turning of knob 448 acts to raise or lower the slider members 444 and this raises or lowers the entire wire framework 414 according to the direction of the turning of the knob. The frictional resistance within this linkage system is sufficient to prevent vertical movement of the wire framework 414 except when it is deliberately initiated by manual turning of the knob 448.

As the shaft 449 including knob 448 travels sidewardly with frame 427, a transverse slot 455 is provided in the face of the instrument to accommodate to this movement. Since the shaft 449 remains fixed in the longitudinal direction while the frame 427 which supports the shaft may move away from the screen or towards the screen, the shaft has a square cross-section and members 451 extend from an annular slider collar 456 which has a square opening through which the shaft extends. Thus the members 451 are slidable along shaft 449 with frame 427 while being constrained to undergo turning motion with the shaft.

Referring now to FIG. 25A in particular, the previously described miniature airplane model 401A is situated between light source assembly 419 and frame 427 in order to be shadow-imaged on the screen as previously described. Airplane model 401A is supported by three vertical rods 463, 464 and 466 which extend upwardly from a pitch-roll controller mechanism 467 that will be hereinafter described in more detail. Support rod 463 is coupled to the underside of the fuselage of airplane model 401A, at the pitch axis, through a ball joint 465 which allows the airplane model to be rocked in any direction relative to rod 463. The second support rod 464 is coupled to the underside of one wing tip of airplane model 401A through another ball joint 468 while the third support rod 466 is coupled to the underside of the airplane model through still another ball joint 469 located closer to the tail of the model than ball joint 465. Accordingly, the airplane model 401A may be pitched upwardly or downwardly by lowering or raising support rod 466 and may be rolled right or left by lowering or raising support rod 464, these movements being realized in response to signals from the aircrafts's attitude gyro by the pitch-roll mechanism 467 as will hereinafter be discussed in more detail.

To provide for controlled yawing motion of airplane model 401A in response to signals from the aircraft's directional gyro, the pitch-roll mechanism 467 which supports the airplane model 401A through rods 463, 464 and 466 is itself supported for controlled rotation about a vertical axis defined by support rod 463. Referring now to FIG. 27 in conjunction with FIG. 25, the pitch-roll mechanism 467 is carried on a rotatable vertical hollow shaft 501 journaled in a stationary bracket 502 for rotation about the axis defined by support rod 463. To effect such rotation and to thereby control the yaw of the airplane model 401A, a gear 503 is secured coaxially to shaft 501 and is drivingly engaged with an output gear 504 of a receiver synchro 506. Receiver synchro 506 is mounted above bracket 502 through a support bearing 507 which enables angular turning of the entire synchro for a purpose to be hereinafter described. Receiver synchro 506 is electrically coupled to the transmitter synchro of the directional gyro of the aircraft. Thus the receiver synchro 506, acting through gears 504 and 503, turns shaft 501 and thus airplane model 401A whenever the aircraft undergoes a change of yaw. Accordingly, the three-dimensional shadow image of the artificial scene is perceived by the pilot as undergoing changes of yaw which correspond to changes of yaw of his real aircraft.

Receiver synchro 506 is made rotatable as a unit within support bearing 507 so that an additive or subtractive angular correction to the signals received from the directional gyro, if needed, can be set into the system mechanically by turning the whole synchro instead of utilizing a differential synchro for this purpose as in the first-described embodiment of the invention. In the absence of such a correction, the airplane model 401A will remain aligned with a compass heading of 0° or magnetic north. To cause the airplane model 401A to be maintained in alignment with any other selected course, the entire synchro including the body thereof is rotatable within the support bearing 507 by any selected angular amount as determined by the manual setting of the course selector knob 277' at the face of the instrument. For this purpose a rotatable shaft 509 extends from the course selector knob to the region adjacent synchro 506 and carries a helical gear 510 which engages another like helical gear 511 secured coaxially to the body of the synchro.

Thus a selected course is set into the instrument by manually turning the course selector knob 277'. This rotates the entire synchro 506 and through gears 504 and 503, shaft 501 and pitch-control mechanism 467 also rotates the airplane model 401A into alignment with the selected course. Thereafter, frictional resistance in the above-described mechanism holds the body of synchro 506 fixed but the output gear 504 of the synchro turns as necessary, in response to the received directional signals, to maintain the airplane model 401A in that predetermined alignment regardless of the direction of flight of the aircraft in which the instrument is disposed.

Slip rings 512 secured to synchro 506 provide for delivery of the directional gyro electrical signals to the angularly adjustable synchro, the stationary contacts 513 which ride against the slip rings being coupled to a multi-pin connector 514 through a multi-conductor cable 516. Additional slip rings 515 on shaft 501 provide for transmission of control signals to the pitch-roll mechanism 467 through conductors which extend upwardly through the hollow shaft 501.

To provide a representation of the aircraft's compass heading in the depicted scene, a cylindrical heading ring 517 formed of transparent material is supported by a sleeve 519 disposed coaxially around shaft 501 while being independently rotatable relative to shaft 501. Heading ring 517 carries opaque compass heading markings 518 preferably including cardinal point letters and degree markings around the upper portion of the ring. The upper edge of heading ring 517 is at a level, below airplane model 401A, at which the portion of the upper edge of the ring which is closest to screen 407 is within the region which is shadow-imaged on the screen while the other portions of the upper edge of the ring, which are closer to the light sources, are outside the region which is shadow-imaged. Thus the compass heading numerals and cardinal points which are closest to the screen appear in the depicted scene below and in front of the little airplane image.

To rotate heading ring 517 as necessary to maintain correct heading information in the artificial scene, another receiver 521 is secured to bracket 502 and has an output gear 522 engaged with a similar gear 523 which is secured coaxially to sleeve 519. Receiver synchro 521 is also electrically coupled to the directional gyro transmitter of the aircraft and thus rotates the heading ring 517 in response to the received signals to maintain an accurate heading indication in the center of the shadow image, below the apparent little airplane.

Since synchros 506 and 521 which control the angular orientation of the airplane model and the heading ring respectively are both responsive to the aircraft's directional gyro the airplane model 401A and the heading ring 517 always turn synchronously except during the periods when course selector knob 277' is being manually operated to turn the airplane model independently in order to cause the nose of the airplane model to be directed at a compass marking 518 indicative of a newly selected course.

The end result of the above-described structure is that whenever the real aircraft undergoes a change of yaw, the airplane model 401A and heading ring 517 undergo a corresponding rotation about the axis defined by support rod 463 and the scene perceived by the pilot continues to accurately represent the orientation of the real aircraft relative to a selected course line and continues to accurately represent the compass heading of the real aircraft.

It is preferable although not essential that the 3D shadow image of the airplane model 401A appear in the depicted scene as seemingly being unattached to any other object. For this purpose, the support rods 463, 464 and 466 which attach the airplane model to the pitch-roll mechanism 467 may be formed of a transparent material. In the absence of further provisions, the transparent rods would still cast some degree of shadow image which might be apparent in the depicted scene. To render the support rods invisible in the depicted scene, the airplane model 401A, the rods, the pitch-roll mechanism 467, synchros 506 and 521 as well as supporting bracket 502, gears 503, 504, 510, 511, 522 and 523 and all other adjacent mechanisms as described above are situated within a rectangular fluid-tight tank 528 which is also formed of transparent material and which is of sufficient size to transect the entire region between light source assembly 419 and screen 407 that is shadow-imaged on the screen. Tank 528 is filled with a transparent liquid having an index of refraction and a light transmissiveness similar to that of the transparent material from which the support rods 463, 464 and 466 are formed and which is also an electrically insulative liquid. Liquids having suitable properties such as fluorocarbon oils for example, are known to the art. As the liquid is selected to have the same index of refraction as the transparent material of the rods which support airplane model 401A, there is no refraction of light while passing from the liquid into the rods and back again into the liquid nor is there any difference in the rate of attenuation of light in the two mediums. Thus the rods cast no noticeable shadow upon screen 407. As the liquid is an electrical insulator, there is no adverse effect upon the operation of synchros 506 and 521 or other electrical components within the tank and the liquid may serve still further to lubricate moving parts of the components within the tank.

As the index of refraction of liquids such as that employed in the tank 528 may change with changes of temperature, maximum effectiveness in suppressing imaging of the support rods may be realized by maintaining the liquid at a uniform temperature. An electrical resistance heating element in the form of a wire 529 is supported within the tank by insulators 531 and preferably extends around the inner wall of the tank in spaced-apart relation from the wall and at a level below that which is shadow-imaged on screen 407. Heating element 529 is energized from multi-conductor pin 514 through a thermostat 532 set to maintain the temperature of the liquid at the value at which the refractive index of the liquid matches that of the model airplane support rods 463, 464 and 466.

Sealing bushings 533 and 534 are provided at the points where course selector rod 509 passes through the walls of the tank 528.

Figure 28:
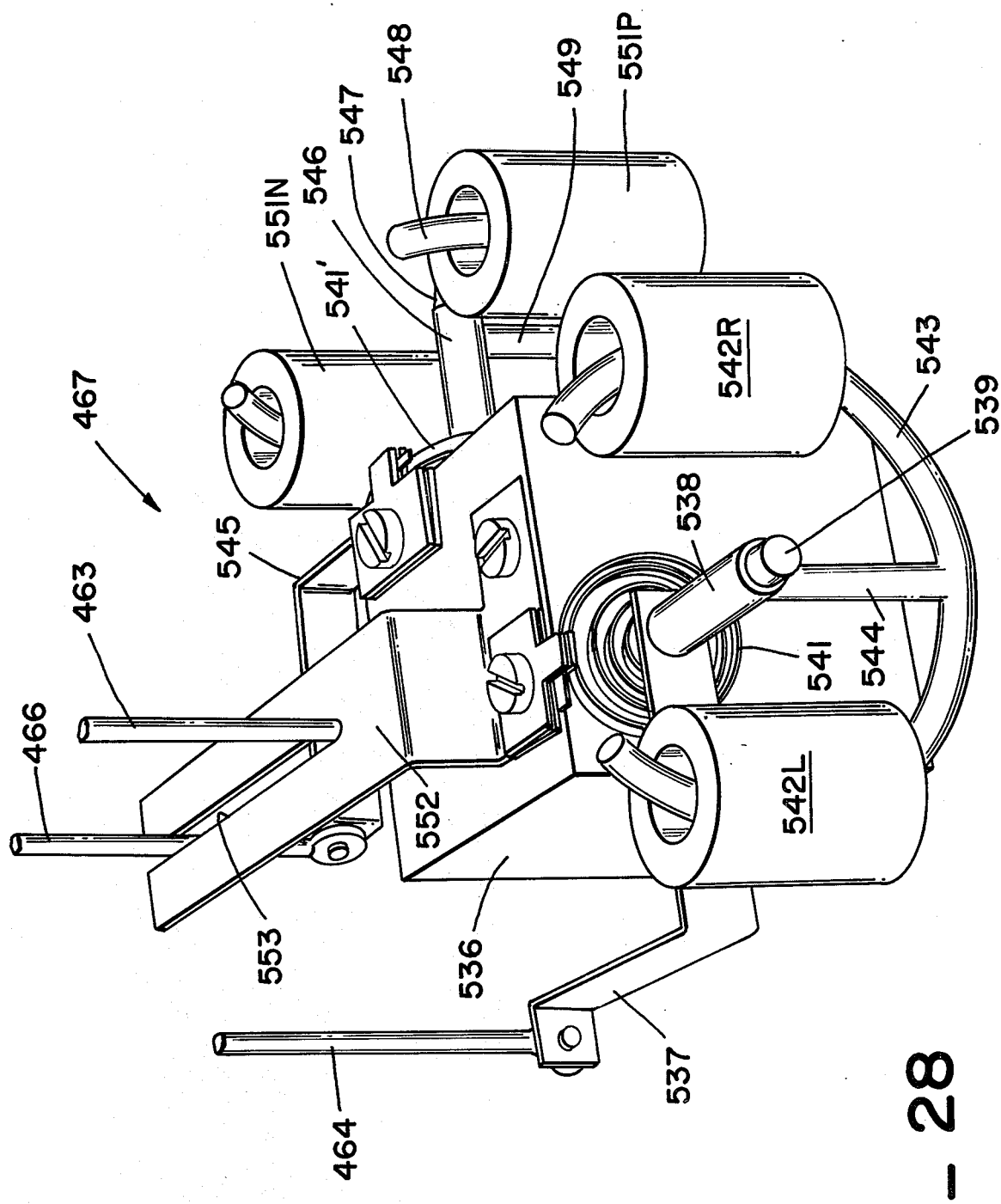
FIG. 28 is a perspective view of mechanism employed in the second embodiment of the navigation instrument for maintaining an accurate representation of aircraft pitch and roll in the three-dimensional artificial scene produced by the instrument.

Considering now suitable detailed structure for the pitch-roll mechanism 467 that controls the attitude of airplane model 401A through support rods 463, 464 and 466, the center rod 463 in particular does not undergo vertical movement and may be secured directly to a base block 536 of the pitch-roll mechanism. Referring now to FIG. 28, the roll motion transmitting support rod 464 is pivotably coupled at the lower end to an angled arm 537 which extends outwardly from a sleeve 538 disposed coaxially on an axle pin 539 that extends from block 536. A coil spring 541 is connected between the block 536 and sleeve 538 to resist rotation of sleeve 538 on axle 539 away from the angular position at which arm 537 holds support rod 464 at a level at which the airplane model exhibits no roll. A pair of solenoid coils 542R and 542L are secured to block 536 on opposite sides of axle 539. A curved solenoid plunger 543, formed of iron or other ferromagnetic material, has opposite ends extending into coils 542R and 542L. The plunger 543 is shaped to define a portion of a circle centered on axle 539 and is attached to sleeve 538 by an arm 544 which extends radially from the sleeve to the midpoint of the plunger. Solenoid coil 542L is coupled to the attitude gyro of the aircraft to receive signals indicative of left roll of the aircraft while coil 542R receives signals indicative of right roll of the aircraft.

In the absence of any roll of the real aircraft, spring 541 acting through arm 537 and support rod 464 maintains the airplane model 401A in a level or no-roll orientation. A left signal from the attitude gyro of the aircraft energizes solenoid coil 542L. Coil 542L then interacts magnetically with plunger 543 to rotate sleeve 538 in a direction which lifts support rod 464 causing the airplane model to exhibit a roll to the left, with the extent of the left roll of the airplane model being determined by the magnitude of the signal applied to coil 542L. Similarly, if the aircraft's attitude gyro detects a roll to the right, the resulting energization of solenoid coil 542R interacts with plunger 543 to turn sleeve 538 in an opposite rotational sense. This motion, transmitted through support rod 464, causes the airplane model to exhibit roll to the right.

The pitch motion transmitting support rod 466 is controlled in an essentially similar manner by the pitch signals from the attitude gyro of the aircraft. The lower end of rod 466 is pivotally coupled to the end of an angled arm 545 which extends radially from a sleeve 546 disposed coaxially on an axle 547 which in turn extends from base block 536 at right angles to the corresponding axle 539 of the roll mechanism. Another coil spring 541' is connected between block 536 and sleeve 546 to urge arm 545 and support rod 466 to the position at which the airplane model exhibits no pitch. An arcuate, ferromagnetic solenoid plunger 548 is disposed concentrically with respect to sleeve 546 and is attached thereto by an arm 549 which extends radially from the sleeve to the midpoint of the plunger. The opposite ends of plunger 548 extend into individual ones of a pair of solenoid coils 551P and 551N which are secured to block 536 at opposite sides of axle 547. Coil 551P is energized by the signals from the attitude gyro of the aircraft which indicate positive pitch and thus acts to draw the plunger 548 in a direction which turns sleeve 546 and arm 549 to lower the pitch motion-transmitting rod 466. This causes the tail region of the airplane model 401A to be lowered relative to the nose to establish positive pitch of the little airplane in the depicted scene. Similarly, coil 551N responds to attitude gyro signals indicative of negative pitch of the real aircraft by raising pitch motion transmitting rod 466 to raise the tail and lower the nose of the model airplane.

In order to prevent any rotational or yawing motion of the model airplane relative to pitch-roll mechanism 467, a stiffener bracket 552 extends from block 536 in the direction of airplane model support rods 463 and 466 and has a slot 553 in which the two support rods 463 and 466 are received.

Referring again to FIGS. 25A and 25B in conjunction, the horizon line wire 404A is manually adjusted to the uppermost position as depicted in the drawing when the instrument 42' is to be used in connection with an instrument landing systems approach to an airport. As previously described, the pilot then perceives a 3D shadow image of a little airplane seemingly situated above a more distant airport runway. The apparent pitch, roll and yaw of the little airplane image change as necessary to always correspond with the attitude of the real aircraft while the apparent runway appears to shift to the right or left if the real aircraft is to the left or right respectively of the localizer course line to the real airport. If the real aircraft moves above or below glide slope to the real airport, the apparent inclination of the runway and glide slope depictions in the image change accordingly. As the real airport is closely approached the apparent runway enlarges and appears to become closer to the little airplane image. By using the controls of the real aircraft to fly the apparent little airplane to the apparent runway, the real aircraft is brought to the real airport.

When the instrument 42' is to be used to follow a selected omni course during cross-country flight, horizon line wire 404A may be manually lowered by turning knob 448 until the apparent horizon line in the image as perceived is coincident with the apparent little airplane. This removes the apparent runway and the glide slope indications from the depicted scene as the elements which produce these images are now below the region which is shadow-imaged on the screen. The pilot may then fly the real aircraft along the selected course by using the controls of the real aircraft to fly the apparent little airplane along the course line indication, which remains in the scene, towards the apparent distant horizon.

While the navigation instruments have been described above with reference primarily to usage in an airplane, the invention is equally useful for navigating other aerial vehicles such as helicopters, gliders, blimps or the like. Similarly, aspects of the invention may be adapted to the guidance of sea or land vehicles under conditions where visibility is poor and suitable sources of directional radio signals are present. Further, the instruments may readily be adapted to the training and evaluation of aircraft operators and may be utilized in combination with flight simulators.

Thus, while the invention has been disclosed with respect to certain exemplary embodiments, it will be apparent that many other variations and modifications are possible and it is not intended to limit the invention except as defined by the following claims.

What is claimed is:

1. A method for causing at least one viewer to perceive an apparently three-dimensional shadow image of at least one object comprising the steps:

positioning a screen for observation by said viewer,
  directing light having a first characteristic towards said screen from a first point,
  directing light having a second characteristic toward said screen from a second point which is spaced apart from said first point,
  disposing said object in the region between said first and second points and said screen in the path of light traveling from said first and second points toward said screen,
  preventing light having said first characteristic from reaching one eye of said viewer and preventing light having said second characteristic from reaching the other eye of said viewer,
  polarizing the light directed toward said screen from said first point to have a first polarization plane whereby said first characteristic is polarization in said first plane,
  polarizing light directed toward said screen from said second point in a different plane whereby said second characteristic is polarization in said different plane,
  preventing light polarized in said first plane from reaching said one eye of said viewer while preventing light polarized in said different plane from reaching said other eye of said viewer, and
  forming at least a portion of said object at least in part of a non-depolarizing first color filter material whereby at least a portion of said three-dimensional shadow image is perceived as having a selected coloration.

2. The method of claim 1 further comprising the further step of introducing a non-depolarizing second color filter material into the path of light from said first and second points to said screen which second color filter material is of a different color from the first color filter material of said object whereby said three-dimensional shadow image of said object is perceived as being in surroundings having the coloration of said second color filter and at least a portion of said three-dimensional shadow image itself is perceived in the different coloration that results from filtering of light by both said first and second color filter materials.

3. A method for causing at least one viewer to perceive an apparently three-dimensional shadow image of at least one object comprising the steps:
   positioning a light depolarizing screen for observation by said viewer,
   directing light having a first characteristic towards said screen from a first point,
   directing light having a second characteristic toward said screen from a second point which is spaced apart from said first point,
   disposing said object in the region between said first and second points and said screen in the path of light traveling from said first and second points toward said screen,
   preventing light having said first characteristic from reaching one eye of said viewer and preventing light having said second characteristic from reaching the other eye of said viewer,
   disposing a first color filter material between said first point and said screen whereby said first characteristic is a first light coloration,
   disposing a second different color filter material between said second point and said screen whereby said second characteristic is a second light coloration, and
   admitting said light having said first coloration to said one eye only of said viewer and admitting said light having said second coloration to said other eye only of said viewer.

4. A method for causing at least one viewer to perceive an apparently three-dimensional shadow image of at least one object comprising the steps:
   positioning a screen for observation by said viewer,
   directing light having a first characteristic towards said screen from a first point,
   directing light having a second characteristic toward said screen from a second point which is spaced apart from said first point,
   disposing said object in the region between said first and second points and said screen in the path of light traveling from said first and second points toward said screen,
   preventing light having said first characteristic from reaching one eye of said viewer and preventing light having said second characteristic from reaching the other eye of said viewer, and
   projecting stereo pair images of a photographed scene onto said screen utilizing light having said first characteristic to project one of said stereo pair images while utilizing light having said second characteristic to project the other of said stereo pair images, whereby said three-dimensional shadow image of said object is perceived by said viewer as being situated within the three-dimensional context of a stereoscopically filmed scene.

5. The method of claim 4 further comprising the step of utilizing the spaced-apart dual projection channels of a three-dimensional film projector to define said first and second points from which light having said first and second characteristics respectively is directed towards said object and said screen.

6. Apparatus for causing at least one observer to perceive a seemingly solid shadow of at least one three-dimensional object comprising:
   a light depolarizing screen,
   light source means for directing light coded in a first manner towards one side of said screen from a first point and for directing light coded in a second manner toward said one side of said screen from a second point which is spaced apart from said first point in a direction parallel to said screen, wherein said light source means includes a first light coding filter transecting the path of light from said first point to said screen and which transmits light having a first characteristic, said light source means including a second light coding filter transecting the path of light from said second point to said screen and which transmits light having a second characteristic which differs from said first characteristic,
   light-analyzing means for transmitting light coded in said first manner to one eye only of said observer and for transmitting light coded in said second manner to the other eye only of said observer,
   wherein said light-analyzing means comprises at least one analyzing element situated in the path of light to said one eye of said observer and which transmits only light having said first characteristic, said light-analyzing means having at least one second analyzing element situated in the path of light to said other eye of said observer and which transmits only light having said second characteristic,
   support means for supporting said three-dimensional object in the region between said light source means and said screen to intercept light traveling from said first and second points toward said screen, and
   wherein said first light coding filter and said first analyzing element are similar color filters of a first color and said second light coding filter and said second light-analyzing element are similar color filters of a different color.

7. Apparatus for causing at least one observer to perceive a seemingly solid shadow of at least one three-dimensional object comprising:
   a screen,
   light source means for directing light coded in a first manner towards one side of said screen from a first point and for directing light coded in a second manner toward said one side of said screen from a second point which is spaced apart from said first point in a direction parallel to said screen, wherein said light source means includes a first light coding filter transecting the path of light from said first point to said screen and which transmits light having a first characteristic, said light source means including a second light coding filter transecting the path of light from said second point to said screen and which transmits light having a second characteristic which differs from said first characteristic,
   light-analyzing means for transmitting light coded in said first manner to one eye only of said observer and for transmitting light coded in said second manner to the other eye only of said observer,
   wherein said first light coding filter and said first analyzing element transmit only light having a first polarization plane and wherein said second light coding filter and said second analyzing element transmit only light having a second different polarization plane,
   support means for supporting said three-dimensional object in the region between said light source means and said screen to intercept light traveling from said first and second points toward said screen, and wherein said object is formed at least in part of a color filtering material whereby said observer perceives at least a portion of said solid shadow as having a predetermined coloration.

8. The combination defined in claim 7 further comprising color filtering means disposed in the path of light traveling from said first and second points to said screen whereby said observer perceives said three-dimensional shadow within a colored context and perceives at least a portion of said shadow as having a different coloration determined by the combined filtering effects of said color filtering means and said color filtering material of said object.

9. Apparatus for causing at least one observer to perceive a seemingly solid shadow of at least one three-dimensional object comprising:

a screen, light source means for directing light coded in a first manner towards one side of said screen from a first point and for directing light coded in a second manner toward said one side of said screen from a second point which is spaced apart from said first point in a directional parallel to said screen, wherein said light source means includes a first light coding filter transecting the path of light from said first point to said screen and which transmits light having a first characteristic, said light source means including a second light coding filter transecting the path of light from said second point to said screen and which transmits light having a second characteristic which differs from said first characteristic, light-analyzing means having a first light analyzing element material for transmitting light coded in said first manner to one eye only of said observer and having a second light analyzing element material for transmitting light coded in said second manner to the other eye only of said observer, wherein said light-analyzing means comprises a light-analyzing lenticular screen having first linear bands of said first light-analyzing element material disposed in parallel spaced-apart relationship and second linear bands of said second light-analyzing element material alternated with said first bands in parallel relationship therewith, and lenticular lens means disposed between said bands and said observer for making said first bands visible only to said one eye of said observer and for making said second bands visible only to said other eye of said observer, and support means for supporting said three-dimensional object in the region between said light source means and said screen to intercept light traveling from said first and second points toward said screen.

10. Apparatus for causing at least one observer to perceive a seemingly solid shadow of at least one three-dimensional object comprising:

a screen, light source means for directing light coded in a first manner towards one side of said screen from a first point and for directing light coded in a second manner toward said one side of said screen from a second point which is spaced apart from said first point in a direction parallel to said screen, wherein said light source means includes a first light coding filter transecting the path of light from said first point to said screen and which transmits light having a first characteristic, said light source means including a second light coding filter transecting the path of light from said second point to said screen and which transmits light having a second characteristic which differs from said first characteristic, light-analyzing means having a first light analyzing element material for transmitting light coded in said first manner to one eye only of said observer and having a second light analyzing element material for transmitting light coded in said second manner to the other eye only of said observer, wherein said light-analyzing means comprises a light-analyzing lenticular screen having first linear bands of said first light-analyzing element material disposed in parallel spaced-apart relationship and second linear bands of said second light-analyzing element material alternated with said first bands in parallel relationship therewith, and lenticular lens means disposed between said bands and said observer for making said first bands visible only to said one eye of said observer and for making said second bands visible only to said other eye of said observer, support means for supporting said three-dimensional object in the region between said light source means and said screen to intercept light traveling from said first and second points toward said screen, means for causing said observer to perceive said three-dimensional shadow in conjunction with a photographed three-dimensional scene, said means comprising a photograph disposed at the opposite side of said lenticular lens means from said observer and having parallel zones of anamorphically condensed stereo image data of said scene positioned to be perceived by said observer through said lenticular lens means, said bands being positioned to cause one eye of said observer to perceive a photographed image of said scene taken from a first location and to cause the other eye of said observer to perceive a photographed image of said scene taken from a laterally displaced location.

11. Apparatus for causing at least one observer to perceive a seemingly solid shadow of at least one three-dimensional object comprising:

a screen formed of at least partially light transmissive material whereby light directed towards one side of said screen may be perceived by an observer situated at the other side thereof, light source means for directing light coded in a first manner towards one side of said screen from a first point and for directing light coded in a second manner toward said one side of said screen from a second point which is spaced apart from said first point in a direction parallel to said screen, light-analyzing means for transmitting light coded in said first manner to one eye only of said observer and for transmitting light coded in said second manner to the other eye only of said observer, wherein said first and second points are right and left points from the standpoint of an observer facing said other side of said screen and wherein said light-analyzing means includes means for transmitting light originated from said first point to the left eye only of said observer and for transmitting light originated from said second point to the right eye only of said observer whereby said observer perceives said seemingly solid shadow as apparently being situated beyond said screen, support means for supporting said three-dimensional object in the region between said light source means and said screen to intercept light traveling from said first and second points toward said screen, and means for moving said object laterally relative to said observer in response to a lateral position signal to cause said seemingly solid shadow to appear to move laterally relative to said observer, and distortion-compensating means for turning said object during said lateral movement, about an axis which is normal to the direction of said lateral movement and which is parallel to said screen, through an amount of angular movement and in a rotational direction determined by the extent and direction of said lateral movement and by the angular orientation of said object relative to said screen.

12. Apparatus for causing at least one observer to perceive a seemingly solid shadow of at least one three-dimensional object comprising:

a screen formed of at least partially light transmissive material whereby light directed towards one side of said screen may be perceived by an observer situated at the other side thereof, light source means for directing light coded in a first manner towards one side of said screen from a first point and for directing light coded in a second manner toward said one side of said screen from a second point which is spaced apart from said first point in a direction parallel to said screen, light-analyzing means for transmitting light coded in said first manner to one eye only of said observer and for transmitting light coded in said second manner to the other eye only of said observer, wherein said first and second points are right and left points from the standpoint of an observer facing said other side of said screen and wherein said light-analyzing means includes means for transmitting light originated from said first point to the left eye only of said observer and for transmitting light originated from said second point to the right eye only of said observer whereby said observer perceives said seemingly solid shadow as apparently being situated beyond said screen, support means for supporting said three-dimensional object in the region between said light source means and said screen to intercept light traveling from said first and second points toward said screen, and wherein said object is shaped to impart a predetermined desired configuration to said seemingly solid shadow, the regions of said object which are closest to said screen being of increased distorted proportions relative to the corresponding regions of said desired configuration whereby perspective reversal effects are compensated for.

13. Apparatus for causing at least one observer to perceive a seemingly solid shadow of at least one three-dimensional object comprising:

a screen, light source means for directing light coded in a first manner towards one side of said screen from a first point and for directing light coded in a second manner toward said one side of said screen from a second point which is spaced apart from said first point in a direction parallel to said screen, light-analyzing means for transmitting light coded in said first manner to one eye only of said observer and for transmitting light coded in said second manner to the other eye only of said observer, support means for supporting said three-dimensional object in the region between said light source means and said screen to intercept light traveling from said first and second points toward said screen, and means for projecting a three-dimensionally filmed scene toward said one side of said screen from behind said object whereby said seemingly solid shadow of said object is perceived as being within the context of said filmed three-dimensional scene.

14. The combination defined in claim 13 wherein said light source means comprises a three-dimensional motion picture film projector with said first and second points being defined by the dual spaced-apart objective lenses of said projector.

15. The combination defined in claim 13 wherein said light source means comprises a three-dimensional still image film projector with said first and second points being defined by the dual spaced-apart objective lenses of said projector.

* * * * *

UNITED STATES PATENT OFFICE
CERTIFICATE OF CORRECTION

Patent No. 4,172,632                    Dated October 30, 1979

Inventor(s) Lawrence Holmes, Jr.

It is certified that error appears in the above-identified patent and that said Letters Patent are hereby corrected as shown below:

| | |
|---|---|
| Col. 15, line 21 | "band" should be --bands-- |
| Col. 15, line 51 | "repesented" should be --represented-- |
| Col. 18, line 56 | "artifical" should be --artificial-- |
| Col. 20, line 48 | --72'-- should appear after 71' |
| Col. 22, line 38 | "perpheral" should be --peripheral-- |
| Col. 25, line 53 | "outwardly" should be --upwardly-- |
| Col. 26, line 44 | "flue" should be --blue-- |
| Col. 29, line 53 | "of" should be --on-- |
| Col. 31, line 65 | "rear" should be --real-- |
| Col. 39, line 1 | "to" second occurrence should be -- the --. |
| Col. 49, line 65 | "potentiometers" should be -- potentiometer --. |

Signed and Sealed this

Sixth Day of May 1980

[SEAL]

Attest:

SIDNEY A. DIAMOND

Attesting Officer        Commissioner of Patents and Trademarks